(12) United States Patent
Bagnariol et al.

(10) Patent No.: US 12,246,790 B2
(45) Date of Patent: Mar. 11, 2025

(54) TWO-WHEELED VEHICLE

(71) Applicant: Indian Motorcycle International, LLC, Medina, MN (US)

(72) Inventors: David L. Bagnariol, Shafer, MN (US); Matthew R. Fronk, Stillwater Township, MN (US); Jason A. Warns, Blaine, MN (US); Benjamin M. Comana, Bern (CH); Matthias Botta, Biel (CH); Richard J. Christoph, Minnetrista, MN (US); Philippe Gasdia, Rothrist (CH); Hans-Rudolf Jenni, Grasswil (CH); Martin Pelz, Burgdorf (CH); Clark D. Davis, Shoreview, MN (US); Kory J. Schuhmacher, Center City, MN (US)

(73) Assignee: Indian Motorcycle International, LLC, Medina, MN (US)

(*) Notice: Subject to any disclaimer, the term of this patent is extended or adjusted under 35 U.S.C. 154(b) by 0 days.

(21) Appl. No.: 18/203,842

(22) Filed: May 31, 2023

(65) Prior Publication Data

US 2023/0303196 A1  Sep. 28, 2023

Related U.S. Application Data

(62) Division of application No. 17/201,774, filed on Mar. 15, 2021, now Pat. No. 11,702,166, which is a
(Continued)

(51) Int. Cl.
*B62J 35/00* (2006.01)
*B62K 11/00* (2006.01)
(Continued)

(52) U.S. Cl.
CPC .............. *B62J 35/00* (2013.01); *B62K 11/00* (2013.01); *B62K 11/04* (2013.01); *B62K 25/283* (2013.01);
(Continued)

(58) Field of Classification Search
CPC ..... B62J 35/00; B62J 1/12; B62J 43/28; B62J 40/00; B62K 11/00; B62K 11/04;
(Continued)

(56) References Cited

U.S. PATENT DOCUMENTS

| 4,168,098 A | 9/1979 | Willey |
| 4,638,881 A | 1/1987 | Morioka et al. |

(Continued)

FOREIGN PATENT DOCUMENTS

| AU | 03544/55 S | 3/2014 |
| AU | 03546/39 S | 3/2014 |

(Continued)

OTHER PUBLICATIONS

Chinese Office Action issued by the State Intellectual Property Office, dated Sep. 18, 2020, for Chinese Patent Application No. 201880024318.X; 9 pages.

(Continued)

*Primary Examiner* — Kevin Hurley
*Assistant Examiner* — Marlon A Arce
(74) *Attorney, Agent, or Firm* — Faegre Drinker Biddle & Reath LLP

(57) ABSTRACT

A two-wheeled vehicle includes a frame assembly having a front end and a rear end extending along a longitudinally-extending centerline, a front ground-engaging member operably coupled to the front end of the frame assembly at a front rotational axis, and a rear ground-engaging member operably coupled to the rear end of the frame assembly at a rear rotational axis. A wheel base is defined between the front
(Continued)

and rear rotational axes and a vertically-extending centerline of the vehicle extends vertically at the midpoint of the wheel base and is perpendicular to the longitudinally-extending centerline. The vehicle also includes a fuel tank, an airbox assembly, and a battery all positioned relative to the vertically-extending centerline of the vehicle.

19 Claims, 59 Drawing Sheets

Related U.S. Application Data division of application No. 15/911,343, filed on Mar. 5, 2018, now Pat. No. 10,974,784.

(60) Provisional application No. 62/469,988, filed on Mar. 10, 2017.

(51) Int. Cl.
  *B62K 11/04* (2006.01)
  *B62K 25/28* (2006.01)
  *B62M 7/02* (2006.01)
  *B62M 7/04* (2006.01)
  *B62J 1/12* (2006.01)
  *B62J 43/28* (2020.01)

(52) U.S. Cl.
  CPC ............... *B62M 7/02* (2013.01); *B62M 7/04* (2013.01); *B62J 1/12* (2013.01); *B62J 43/28* (2020.02)

(58) Field of Classification Search
  CPC ........ B62K 25/283; B62K 25/28; B62M 7/02; B62M 7/04
  See application file for complete search history.

(56) References Cited

U.S. PATENT DOCUMENTS

| | | | |
|---|---|---|---|
| 5,299,832 A | 4/1994 | Price, Sr. | |
| 5,658,035 A | 8/1997 | Armstrong | |
| D403,277 S | 12/1998 | Kokubu et al. | |
| 5,853,217 A | 12/1998 | Armstrong | |
| 5,857,727 A | 1/1999 | Vetter | |
| 5,876,013 A | 3/1999 | Ott | |
| 6,293,606 B1 | 9/2001 | Jarosz et al. | |
| D496,309 S | 9/2004 | Fukumoto et al. | |
| 6,877,788 B2 | 4/2005 | Graham | |
| D504,844 S | 5/2005 | Sasanami | |
| D548,649 S | 8/2007 | Heinrich et al. | |
| D549,137 S | 8/2007 | Heinrich et al. | |
| D551,129 S | 9/2007 | Takeda | |
| D567,717 S | 4/2008 | Hishiki | |
| 7,438,149 B2 | 10/2008 | Ishida et al. | |
| D581,839 S | 12/2008 | Sasanami | |
| D582,316 S | 12/2008 | Stenegard et al. | |
| D582,320 S | 12/2008 | Tanaka et al. | |
| D588,961 S | 3/2009 | Tanaka et al. | |
| D591,204 S | 4/2009 | Matsuzawa | |
| D591,205 S | 4/2009 | Heinrich et al. | |
| D594,786 S | 6/2009 | Sakata | |
| D596,082 S | 7/2009 | Ueno et al. | |
| D597,449 S | 8/2009 | Nagao | |
| D601,458 S | 10/2009 | Nagao | |
| D605,089 S | 12/2009 | Tanaka et al. | |
| D605,090 S | 12/2009 | Tanaka et al. | |
| D606,457 S | 12/2009 | Tanaka et al. | |
| 7,661,714 B2 | 2/2010 | Kubota | |
| D611,390 S | 3/2010 | Toriyama et al. | |
| 7,712,786 B2 | 5/2010 | Koike | |
| D638,756 S | 5/2011 | Kouchi et al. | |
| 7,934,741 B1 | 5/2011 | Wright | |
| D643,341 S | 8/2011 | Shigeru | |
| D647,824 S | 11/2011 | Kouchi et al. | |
| D647,825 S | 11/2011 | Shibuta et al. | |
| 8,105,406 B2 * | 1/2012 | Nishizawa | B01D 46/0005 55/482 |
| 8,146,693 B2 * | 4/2012 | Oohashi | B62M 7/02 180/68.3 |
| 8,156,912 B2 | 4/2012 | Kubo | |
| D669,397 S | 10/2012 | Satoshi | |
| D669,821 S | 10/2012 | Nishihara et al. | |
| D670,204 S | 11/2012 | Yasuhara et al. | |
| D686,538 S | 7/2013 | Nagao | |
| 8,522,141 B2 | 8/2013 | Yoon et al. | |
| D688,982 S | 9/2013 | Oyanagi et al. | |
| D688,983 S | 9/2013 | Shibuta et al. | |
| D689,406 S | 9/2013 | Yasuhara et al. | |
| 8,522,741 B2 | 9/2013 | Matsuda et al. | |
| D694,673 S | 12/2013 | Katagiri et al. | |
| 8,651,551 B2 | 2/2014 | Fukuda et al. | |
| 8,807,259 B2 | 8/2014 | Tominaga et al. | |
| 8,827,024 B1 | 9/2014 | Sumi et al. | |
| 8,839,756 B2 | 9/2014 | Ozaki et al. | |
| D718,669 S | 12/2014 | Kiska | |
| D723,431 S | 3/2015 | Noguchi et al. | |
| 8,985,416 B2 | 3/2015 | Schanz et al. | |
| D735,085 S | 7/2015 | Buckan | |
| D736,677 S | 8/2015 | Takeshi | |
| 9,194,278 B2 | 11/2015 | Fronk et al. | |
| D744,906 S | 12/2015 | Song et al. | |
| 9,255,554 B2 | 2/2016 | Kawata | |
| D755,084 S | 5/2016 | Sakata | |
| D755,680 S | 5/2016 | Yashuhara et al. | |
| D755,681 S | 5/2016 | Martin | |
| D755,682 S | 5/2016 | Hahn-Woernle | |
| D756,268 S | 5/2016 | Yamada et al. | |
| D758,923 S | 6/2016 | Yamada et al. | |
| D758,924 S | 6/2016 | Tamura | |
| 9,421,860 B2 | 8/2016 | Schuhmacher et al. | |
| 9,440,504 B2 | 9/2016 | Bagnariol et al. | |
| D795,746 S | 8/2017 | Akita et al. | |
| D797,002 S | 9/2017 | Toyama et al. | |
| D801,230 S | 10/2017 | Endo | |
| 9,803,522 B2 | 10/2017 | Kinoshita et al. | |
| 11,077,910 B2 | 8/2021 | Pelz et al. | |
| 11,702,166 B2 | 7/2023 | Bagnariol et al. | |
| 11,904,867 B2 * | 2/2024 | Atsushi | B60W 40/09 |
| 2004/0140686 A1 | 7/2004 | Graham | |
| 2005/0051374 A1 | 3/2005 | Nakano et al. | |
| 2007/0199754 A1 | 8/2007 | Okuma et al. | |
| 2008/0000707 A1 | 1/2008 | Gruber et al. | |
| 2008/0169149 A1 | 7/2008 | Holroyd et al. | |
| 2008/0190683 A1 | 8/2008 | Hoeve | |
| 2008/0308331 A1 | 12/2008 | Trunkenpolz et al. | |
| 2008/0314669 A1 | 12/2008 | Buell | |
| 2009/0090576 A1 | 4/2009 | Nishizawa et al. | |
| 2009/0242313 A1 | 10/2009 | Morita et al. | |
| 2009/0322069 A1 | 12/2009 | Koike | |
| 2010/0243691 A1 | 9/2010 | Salisbury | |
| 2012/0248812 A1 | 10/2012 | Fukuda et al. | |
| 2012/0318598 A1 | 12/2012 | Fujiyama et al. | |
| 2013/0068812 A1 | 3/2013 | St. Georges | |
| 2014/0048347 A1 | 2/2014 | Munzel et al. | |
| 2014/0084565 A1 | 3/2014 | Nakamura et al. | |
| 2014/0136076 A1 | 5/2014 | Novak et al. | |
| 2014/0262580 A1 | 9/2014 | Bagnariol | |
| 2014/0360797 A1 | 12/2014 | Kawata | |
| 2015/0083513 A1 | 3/2015 | Ito et al. | |
| 2015/0090512 A1 * | 4/2015 | Inoue | F02M 37/103 180/219 |
| 2015/0101875 A1 | 4/2015 | Inayama et al. | |
| 2015/0274239 A1 | 10/2015 | Kontani | |
| 2015/0275717 A1 | 10/2015 | Kontani et al. | |
| 2016/0339754 A1 | 11/2016 | Teachout et al. | |
| 2017/0089308 A1 | 3/2017 | Yamashita et al. | |
| 2017/0334500 A1 | 11/2017 | Jarek et al. | |
| 2018/0257726 A1 | 9/2018 | Bagnariol et al. | |
| 2019/0242335 A1 | 8/2019 | Diehl et al. | |
| 2020/0102041 A1 | 4/2020 | Pelz et al. | |
| 2021/0221460 A1 | 7/2021 | Bagnariol et al. | |
| 2021/0229771 A1 | 7/2021 | Pelz et al. | |

(56) References Cited

U.S. PATENT DOCUMENTS

FOREIGN PATENT DOCUMENTS

| | | |
|---|---|---|
| AU | 03546/47 S | 3/2014 |
| AU | 2014227761 A1 | 10/2015 |
| AU | 2016210752 A1 | 8/2016 |
| AU | 2017225088 A1 | 9/2017 |
| CA | 155479 S | 11/2014 |
| CN | 1245126 A | 2/2000 |
| CN | 1537750 A | 10/2004 |
| CN | 101028846 A | 9/2007 |
| CN | 101618751 A | 1/2010 |
| CN | 102126539 A | 7/2011 |
| CN | 102874344 A | 1/2013 |
| CN | 103502087 A | 1/2014 |
| CN | 303031398 S | 12/2014 |
| CN | 204341290 U | 5/2015 |
| CN | 104781138 A | 7/2015 |
| CN | 105579336 A | 5/2016 |
| CN | 105143028 B | 2/2018 |
| CN | 108100128 A | 6/2018 |
| CN | 108100129 A | 6/2018 |
| EP | 0879755 A2 | 11/1998 |
| EP | 2045461 A2 | 4/2009 |
| EP | 2045462 A2 | 4/2009 |
| EP | 2141067 A1 | 1/2010 |
| EP | 2835308 A1 | 2/2015 |
| EP | 2969724 A1 | 1/2016 |
| GB | 2202276 A | 9/1988 |
| JP | 55-068483 A | 3/1980 |
| JP | 56-082677 A | 7/1981 |
| JP | 58-047220 Y2 | 10/1983 |
| JP | 61-268579 A | 11/1986 |
| JP | 62-051196 B2 | 10/1987 |
| JP | 02-031990 A | 2/1990 |
| JP | 05-310165 A | 11/1993 |
| JP | 05-310167 A | 11/1993 |
| JP | 10-316068 A | 12/1998 |
| JP | 11-192988 A | 7/1999 |
| JP | 3204536 B2 | 9/2001 |
| JP | 2002-205675 A | 7/2002 |
| JP | 2006-315465 A | 11/2006 |
| JP | 2006-347450 A | 12/2006 |
| JP | 2007-230301 A | 9/2007 |
| JP | 2007-230351 A | 9/2007 |
| JP | 2010-030584 A | 2/2010 |
| JP | 2013-071596 A | 4/2013 |
| JP | 5310165 B2 | 10/2013 |
| JP | 2014-238025 A | 12/2014 |
| JP | 2015-186940 A | 10/2015 |
| JP | 2016-515971 A | 6/2016 |
| JP | 2019-048554 A | 3/2019 |
| WO | 2014/033953 A1 | 3/2014 |
| WO | 2014/144224 A1 | 9/2014 |
| WO | 2018/164998 A1 | 9/2018 |

OTHER PUBLICATIONS

Communication pursuant to Article 94(3) EPC issued by the European Patent Office, dated Sep. 23, 2020, for European Patent Application No. 18712361.7; 6 pages.
International Preliminary Report on Patentability issued by the European Patent Office, dated May 22, 2019, for International Patent Application No. PCT/US2018/020865; 33 pages.
International Preliminary Report on Patentability issued by the International Searching Authority, dated Mar. 23, 2021, for International Patent Application No. PCT/US2019/053470; 13 pages.
International Preliminary Report on Patentability received for PCT Patent Application No. PCT/US2019/053470, mailed on Apr. 8, 2021, 14 pages.
International Search Report and Written Opinion received for PCT Patent Application No. PCT/US2019/053470, mailed on Feb. 24, 2020, 18 pages.
International Search Report issued by the International Searching Authority, dated Aug. 21, 2018, for related International Patent Application No. PCT/US2018/020865; 6 pages.
International Search Report issued by the International Searching Authority, dated Feb. 24, 2020, for International Patent Application No. PCT/US2019/053470; 6 pages.
Invitation to Pay Additional Fees received for PCT Patent Application No. PCT/US2019/053470, mailed on Jan. 3, 2020, 15 pages.
Written Opinion issued by the International Searching Authority, dated Aug. 21, 2018, for related International Patent Application No. PCT/US2018/020865; 17 pages.
Written Opinion of the International Searching Authority, dated Feb. 24, 2020, for International Patent Application No. PCT/US2019/053470; 12 pages.
Yamaha Supplementary Service Manual, available at http://bergall.org/temp/venture/pdf./1983-1985-yamaha-venture-manual-complete-with-wiring-diagrams.pdf; copyright 1983; 452 pages.

* cited by examiner

TWO-WHEELED VEHICLE

CROSS-REFERENCE TO RELATED APPLICATIONS

The present application is a divisional of U.S. patent application Ser. No. 17/201,774, filed Mar. 15, 2021, which is a divisional of U.S. patent application Ser. No. 15/911,343, filed Mar. 5, 2018, now U.S. Pat. No. 10,974,784, which claims priority to U.S. Provisional Patent Application Ser. No. 62/469,988, filed Mar. 10, 2017, entitled "TWO-WHEELED VEHICLE," the complete disclosures of which are expressly incorporated by reference herein.

BACKGROUND OF THE DISCLOSURE

The present disclosure relates to a two-wheeled vehicle and, more particularly, to a motorcycle having a compact and modular configuration.

Various motorcycles may be configured for different applications and different preferences of riders. For example, a cruiser-type motorcycle may be suited for a rider that prefers comfort when traveling long distances rather than speed, whereas a sport or standard-type motorcycle may be preferred by riders who prefer enhanced speed capabilities. Typically, a sport or standard-type motorcycles are smaller in overall size than other types of motorcycles and, as such, the configuration of the various components on the bike are important. For example, a sport or standard-type motorcycle requires a fuel tank and airbox large enough to sustain the powertrain performance but able to be packaged with the other components of the motorcycle without increasing the size of the vehicle.

Additionally, because there are various vehicle platforms, it can be expensive and time-consuming to produce multiple motorcycles, each with unique components. For example, it can be expensive to require each vehicle platform to have a unique frame, powertrain assembly, and overall layout. Yet, because each individual type of vehicle has different ride, handling, powertrain, and ergonomic requirements to best meet the preferences of the rider, it may be necessary to uniquely design the overall layout for each vehicle.

As such, there is a need for a vehicle that may be applicable to multiple vehicle platforms to reduce manufacturing time and expense. For example, there is a need for a sport or standard-type vehicle platform that is modularly configured with a fuel tank and airbox capable of meeting the necessary power requirements while still maintaining an overall reduced size of the vehicle, such that several different sport or standard-type vehicle platforms may use similar components but have the necessary components and systems for the desired performance.

SUMMARY OF THE DISCLOSURE

In an exemplary embodiment of the present invention, a two-wheeled vehicle comprises a frame assembly having a front end and a rear end extending along a longitudinally-extending centerline, a front ground-engaging member operably coupled to the front end of the frame assembly at a front rotational axis, and a rear ground-engaging member operably coupled to the rear end of the frame assembly at a rear rotational axis. A wheel base is defined between the front and rear rotational axes and a vertically-extending centerline of the vehicle extends vertically at a midpoint of the wheel base and is perpendicular to the longitudinally-extending centerline. The vehicle also comprises a fuel tank supported by the frame and a forward portion of the fuel tank is approximately vertically aligned with the vertically-extending centerline. Additionally, an airbox assembly is supported by the frame and a rearward portion of the airbox is approximately vertically aligned with the vertically-extending centerline. Also, a battery is supported by the frame and positioned longitudinally forward of the vertically-extending centerline.

A further exemplary embodiment of the present invention includes a two-wheeled vehicle comprising a frame assembly having a front end and a rear end extending along a longitudinally-extending centerline, a front ground-engaging member operably coupled to the front end of the frame assembly at a front rotational axis, a rear ground-engaging member operably coupled to the rear end of the frame assembly at a rear rotational axis, and a straddle seat supported on the frame and configured to support at least an operator of the vehicle. The vehicle further comprises a fuel tank supported by the frame and positioned under the straddle seat. The fuel tank includes a fill cap positioned forward of the straddle seat. Additionally, the vehicle comprises an airbox assembly supported by the frame and extending upwardly from the fuel tank.

A further exemplary embodiment of the present invention includes a two-wheeled vehicle comprising a frame assembly having a front end and a rear end extending along a longitudinally-extending centerline, a front ground-engaging member operably coupled to the front end of the frame assembly at a front rotational axis, a rear ground-engaging member operably coupled to the rear end of the frame assembly at a rear rotational axis, and an engine supported by the frame and operably coupled to at least one of the front ground-engaging member and the rear ground-engaging member. The engine includes a front cylinder having a front cylinder head, a rear cylinder having a rear cylinder head, and a crankshaft operably coupled to the front and rear cylinders. The vehicle further comprises a straddle seat supported on the frame and configured to support at least an operator of the vehicle and a fuel tank supported by the frame and positioned under the straddle seat. A forward end of the fuel tank is approximately vertically aligned with the crankshaft.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a motorcycle, it should be understood, that the invention may have application to other types of vehicles such as all-terrain vehicles, watercraft, utility vehicles, snowmobiles, scooters, golf carts, and mopeds, as well as all types of motorcycles or other two-wheeled vehicles.

Figure 1:
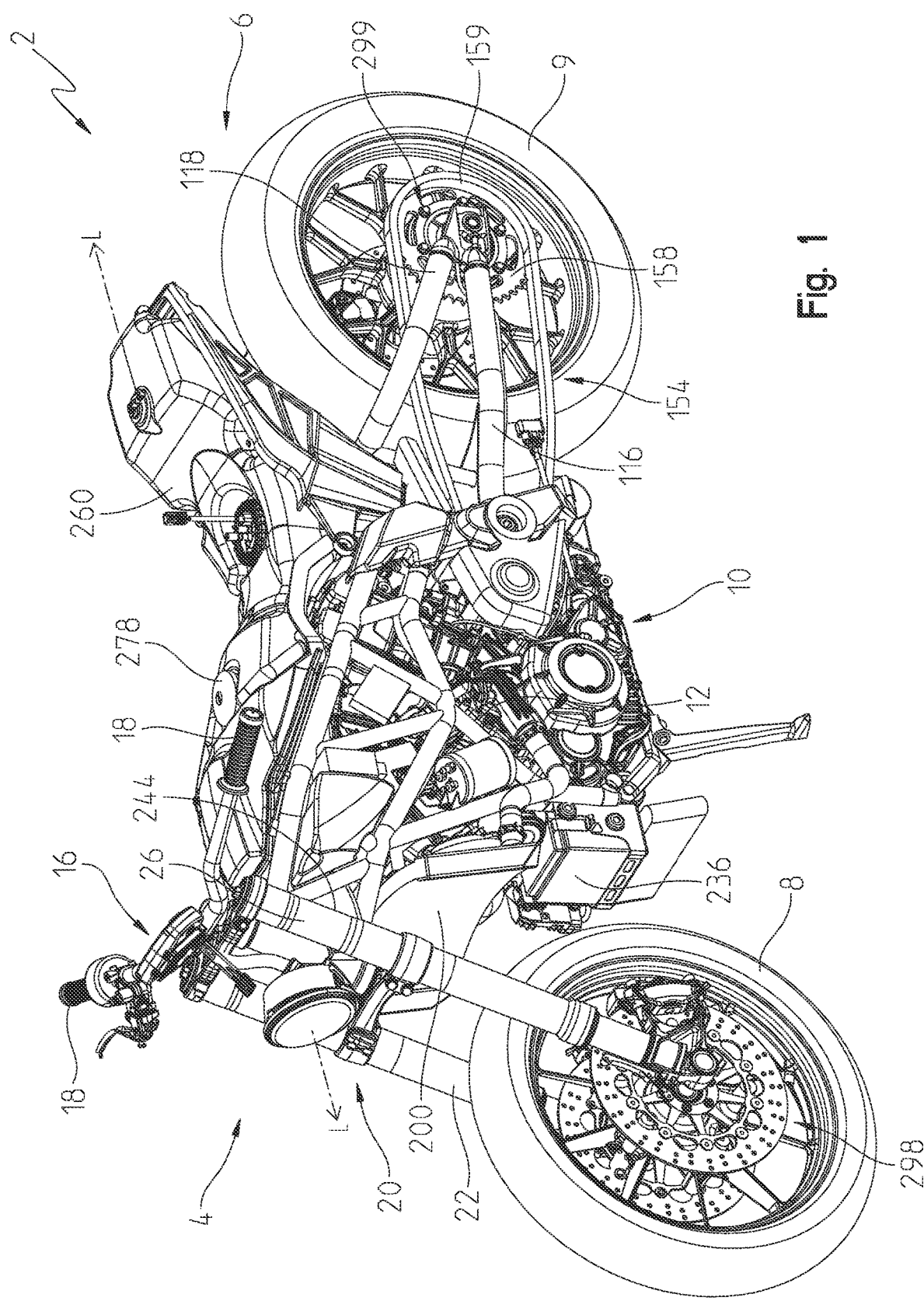
FIG. 1 is a front left perspective view of a vehicle of the present disclosure.
Figure 2:
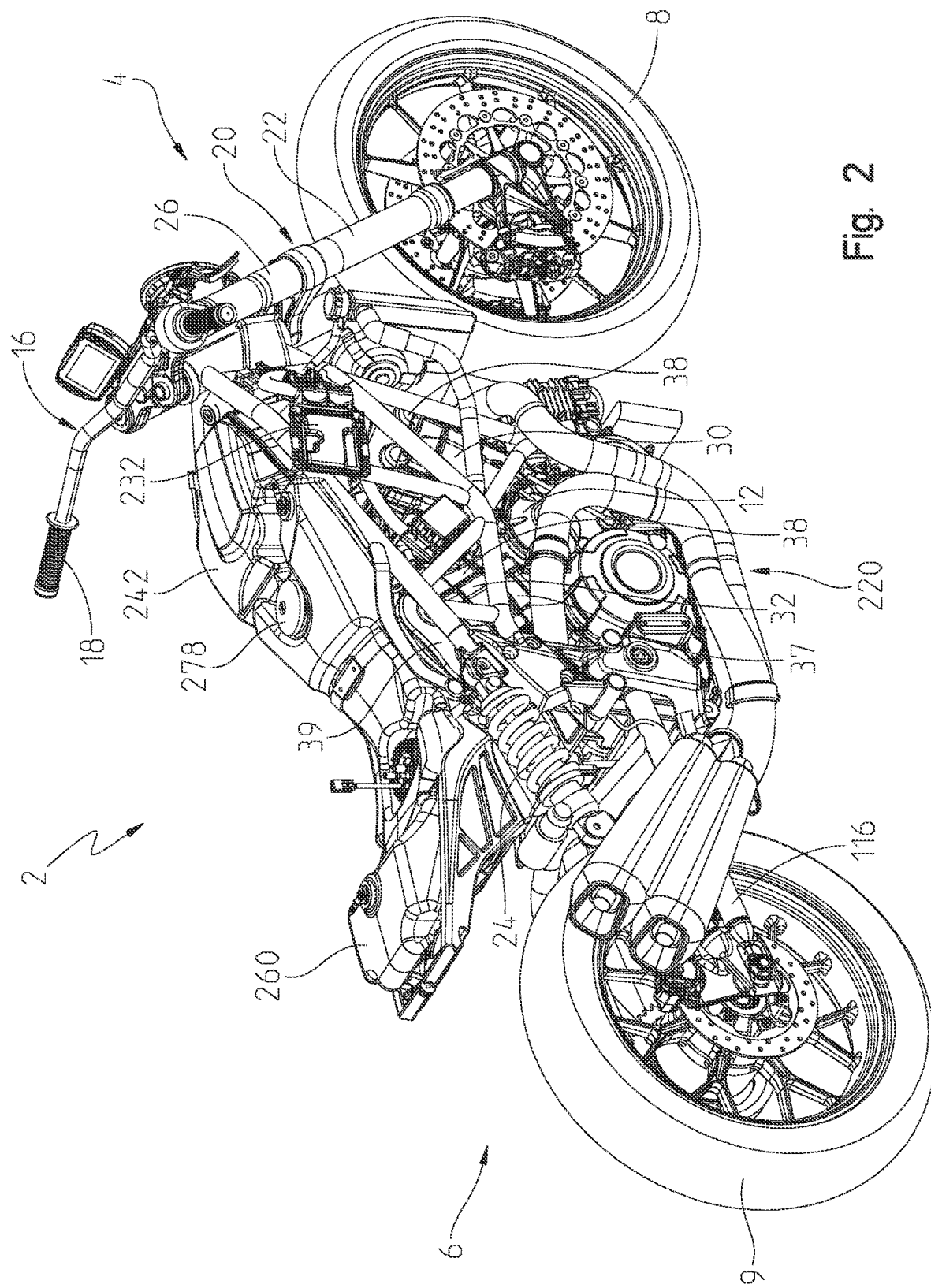
FIG. 2 is a rear right perspective view of the vehicle of FIG. 1.
Figure 3:
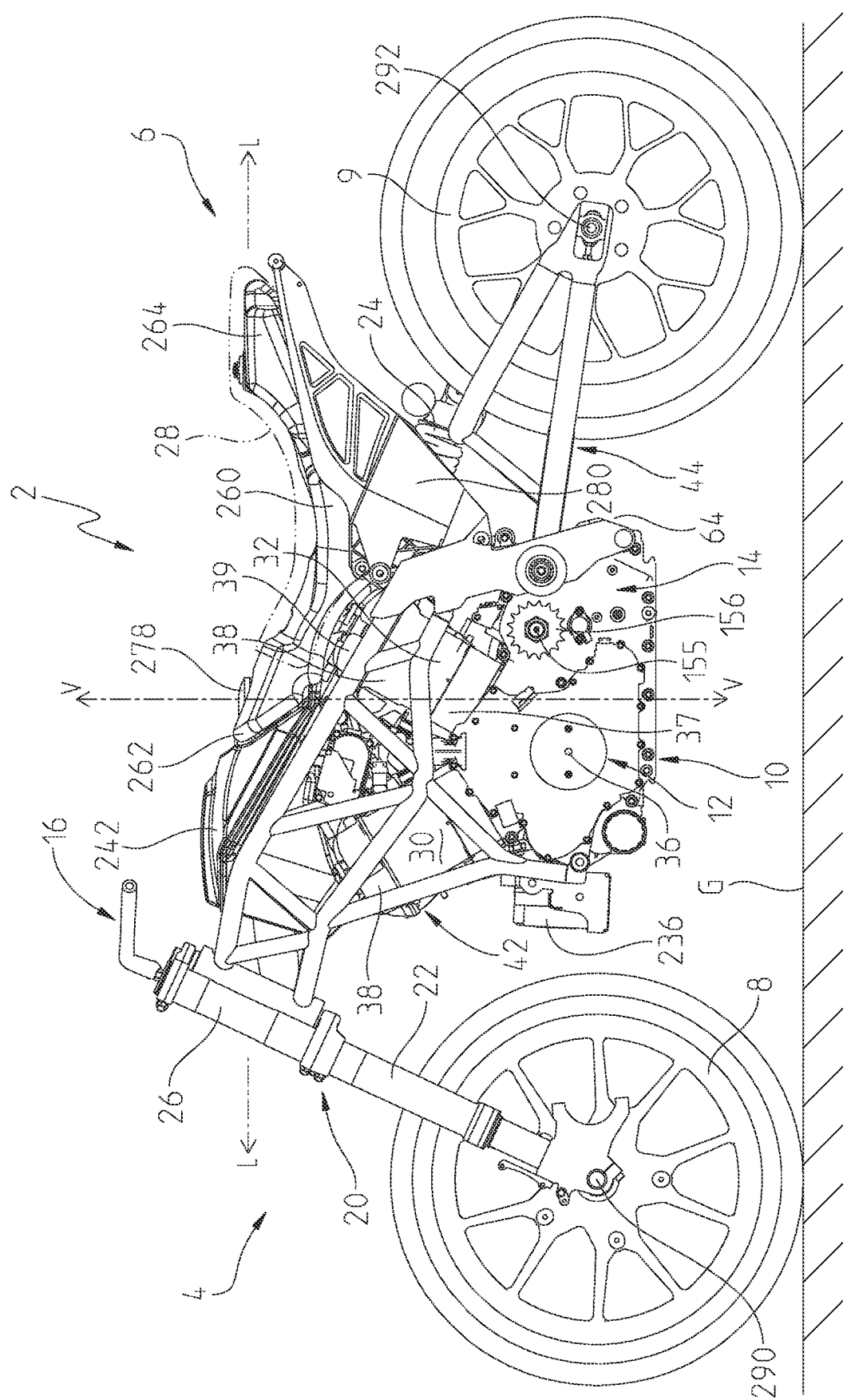
FIG. 3 is a left side view of the vehicle of FIG. 1.

With reference to FIGS. 1-3, an illustrative embodiment of a two-wheeled vehicle 2 is shown. Vehicle 2 may be configured as any type of motorcycle, such as a sport or standard-type motorcycle, a touring motorcycle, a cruiser motorcycle, and other embodiments of a motorcycle-type vehicle. Vehicle 2 extends from a front end 4 to a rear end 6 along a longitudinal centerline L. Front end 4 of vehicle 2 includes at least one ground engaging member, namely a front wheel 8 configured to rotate about a front wheel rotational axis 290, and rear end 6 of vehicle 2 includes at least one rear ground engaging member, illustratively a rear wheel 9 configured to rotate about a rear wheel rotational axis 292 (FIG. 3). Vehicle 2 travels relative to a ground surface G (FIG. 3) on front wheel 8 and rear wheel 9. It will be appreciated that while the vehicle 2 is illustrated as a two-wheel vehicle, various embodiments of the present teachings are also operable with three, four, six etc. wheeled vehicles.

Referring still to FIGS. 1-3, rear wheel 9 is coupled to a powertrain assembly 10, through a drive assembly 154, to propel vehicle 2 through rear wheel 9, as is disclosed further herein. Drive assembly 154 includes a drive shaft 155, a drive sprocket 156 operably coupled to drive shaft 155, and a driven sprocket 158 operably coupled to drive sprocket 156 through a belt or chain 159 (FIG. 1).

Powertrain assembly 10 includes both an engine 12 and transmission 14. Transmission 14 is coupled to engine 12 which provides power to rear wheel 9 through drive shaft 155. In the illustrated embodiment, engine 12 is a V-twin, gasoline engine that includes a first or front cylinder 30 and a second or rear cylinder 32 operably coupled together with a crankshaft 34 (FIG. 36) configured to rotate about a rotation axis 36. First and second cylinders 30, 32 and crankshaft 34 are generally supported on a crankcase 60 of engine 12. Illustratively, first and second cylinders 30, 32 define a 60-degree V configuration. In other embodiments, engine 12 includes any number of cylinders arranged in any configuration (e.g., 90-degree). Each of cylinders 30, 32 includes a valve cover 39, a cylinder head 38, a cylinder 37, and a piston (not shown) is configured to reciprocate within each cylinder 30, 32, thereby causing rotation of crankshaft 34. Additional details of engine 12 may be disclosed in U.S. patent application Ser. No. 14/213,161, filed Mar. 14, 2014, and entitled "TWO-WHEELED VEHICLE", and U.S. patent application Ser. No. 14/214,033, filed Mar. 14, 2014, and entitled "ENGINE", the complete disclosures of which are expressly incorporated by reference herein. It also will be appreciated that while engine 12 is illustrated as a gasoline engine, electric motors and other suitable torque-generating machines are operable with various embodiments of the present disclosure. Additionally, in one embodiment, powertrain assembly 10 includes a continuous variable transmission.

Referring still to FIGS. 1-3, vehicle 2 also generally includes a steering assembly 16, illustratively handlebars with gripping surfaces 18 for the operator's hands. The handlebars may include operator controls, such as throttle and braking inputs, for operating vehicle 2. Additionally, vehicle 2 may include foot controls for braking and/or throttle control. Steering assembly 16 may be operably coupled to a triple clamp 26 and front forks 20 which may include a front suspension assembly 22. Additionally, vehicle 2 includes a rear suspension assembly 24 (FIG. 2). As shown in FIG. 3, a seat 28 may be at least partially positioned above a portion of rear suspension assembly 24 and, illustratively, is configured as a straddle seat to support at least the operator but also may be configured to support at least one passenger rearward of the operator. A cargo or storage container (not shown) also may be included on vehicle 2, either forward or rearward of seat 28.

Referring to FIGS. 4-16, vehicle 2 includes a frame assembly 40 supported by front and rear wheels 8, 9 (FIG. 1). Frame assembly 40 includes a main frame 42 and a rear frame 44 (FIG. 13) coupled together. As shown in FIGS. 4-12, various portions of main frame 42 may be comprised of a metallic material, for example steel, and main frame 42 includes upper longitudinally-extending members 46 and lower longitudinally-extending members 48. Both upper and lower longitudinally-extending members 46, 48 are coupled to a head tube 50 which is configured to receive a portion of steering assembly 16 (FIG. 1). Upper and lower longitudinally-extending frame members 46, 48 are coupled together through a plurality of cross-members 52. Additionally, main frame 42 includes upstanding members 54 which extend generally vertically from lower longitudinally-extending members 48. Upstanding members 54 may be further coupled to lower longitudinally-extending members 48 through diagonal frame members 56.

Figure 4:
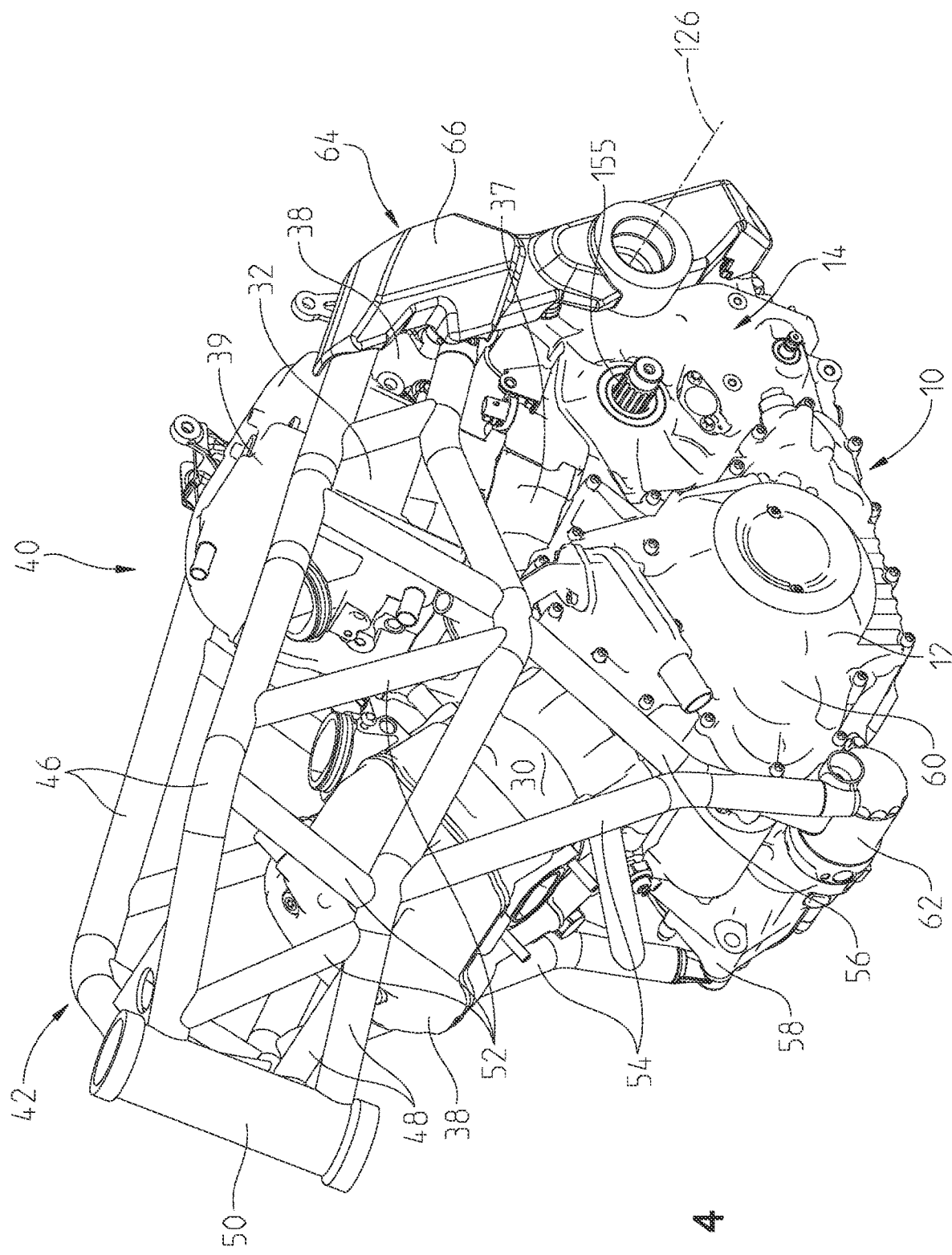
FIG. 4 is a front left perspective view of a portion of a frame assembly and an engine of the vehicle of FIG. 1.

Illustratively, main frame 42 generally surrounds powertrain assembly 10 and, more particularly, extends over and forward of engine 12 and transmission 14. Main frame 42 may be coupled to engine 12 through upstanding members 54. As shown in FIG. 4, for example, upstanding members 54 may be coupled to brackets or mounting flanges 58 on crankcase 60 of engine 12. Mounting flanges 58 may be integral with crankcase 60 or may be coupled thereto with conventional fasteners, such as bolts, welds, rivets, or other similar fasteners. In one embodiment, and as shown in FIG. 4, mounting flanges 58 are positioned forward of crankcase 60 such that upstanding members 54 also are positioned forward of crankcase 60. Further, mounting flanges 58 may be positioned adjacent an oil filter 62 for engine 12 such that main frame 42 is coupled to crankcase 60 at a positioned approximately adjacent oil filter 62. Because portions of frame assembly 40 are supported on crankcase 60, crankcase 60 defines a structural member of vehicle 2 configured to receive an external load from frame assembly 40.

Figure 5:
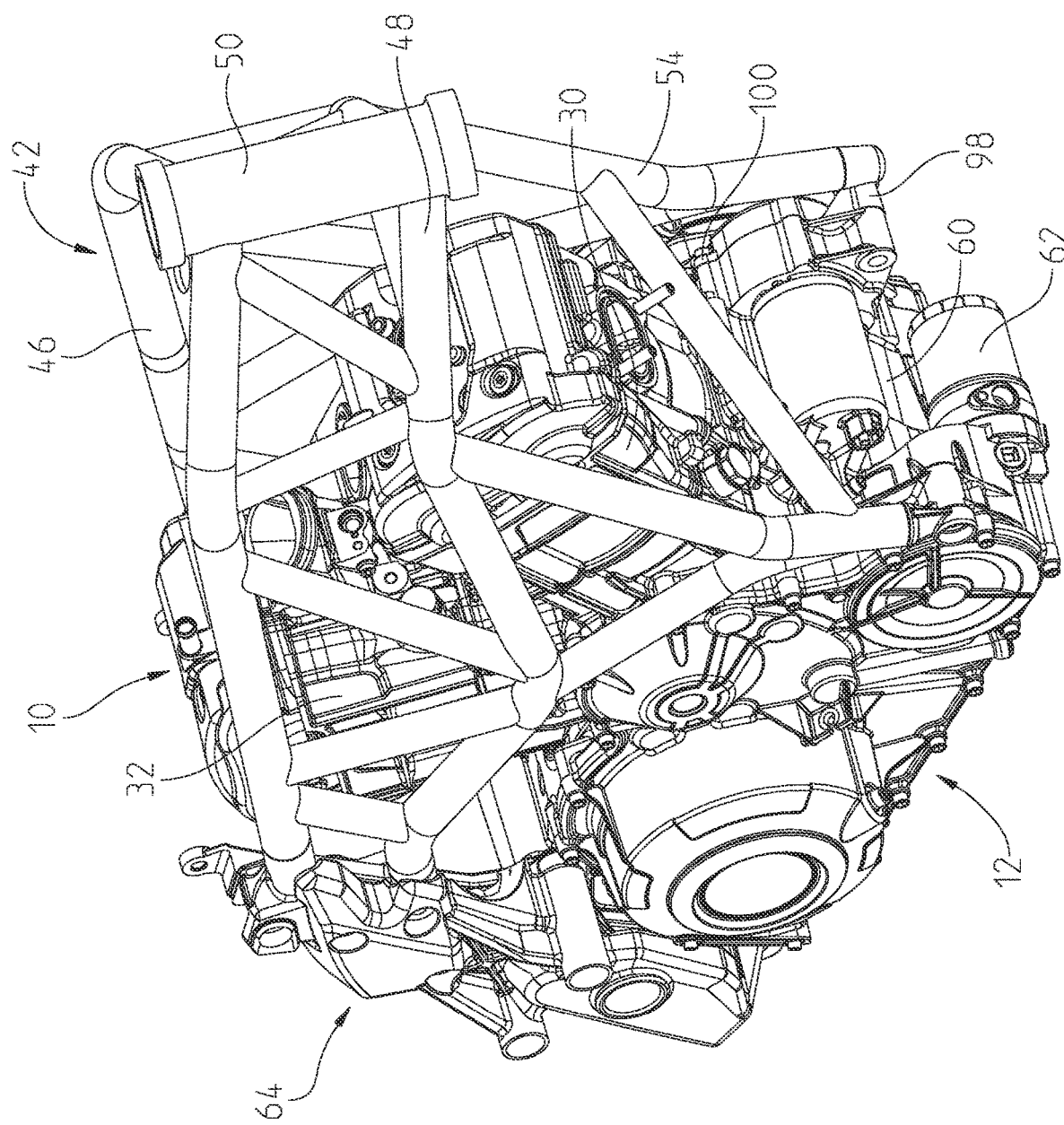
FIG. 5 is a front right perspective view of the frame assembly coupled to the engine of FIG. 4.

In an alternative embodiment, as shown in FIG. 5, additional mounting brackets or flanges 98 may be removably coupled to crankcase 60 for coupling with upstanding members 54 of main frame 42. Flanges 98 may be coupled to existing flanges 58 on crankcase 60 or may be coupled to directly to crankcase 60 with bolts 100. Flanges 98 may be positioned approximately adjacent oil filter 62. In this way, the lower ends of upstanding members 54 may be coupled with flanges 98 at a position adjacent oil filter 62 to couple together frame assembly 40 and powertrain assembly 10.

Figure 6:
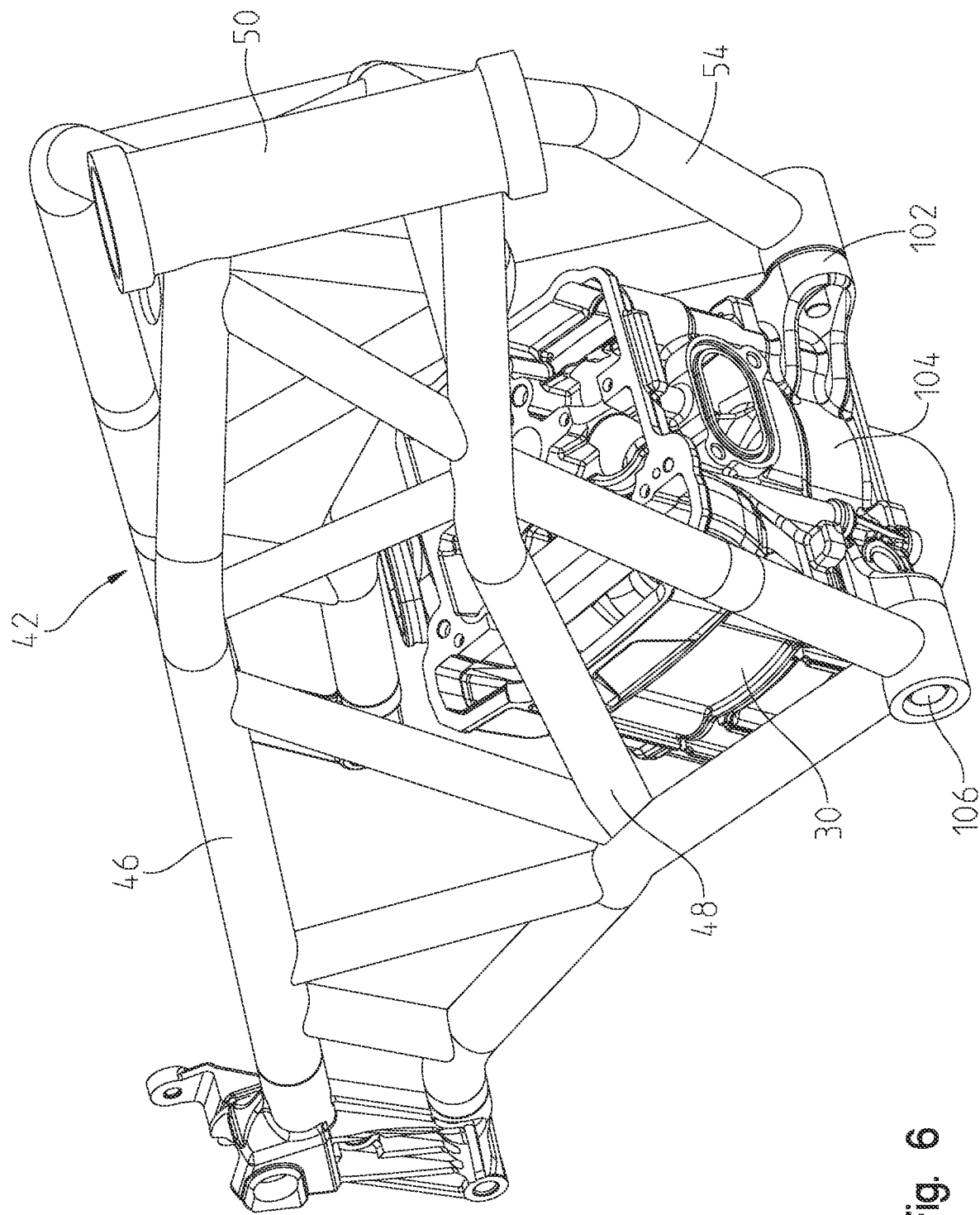
FIG. 6 is a front right perspective view of the frame assembly of FIG. 4 coupled to a portion of the engine at a first alternative location.

In a further embodiment, and as shown in FIG. 6, upstanding members 54 of main frame 42 may be coupled to a portion of first cylinder 30 of engine 12, rather than crankcase 60. Illustratively, first cylinder 30 may include mounting flanges 102 which may be removably coupled to an outer housing 104 of first cylinder 30 and/or may be integrally formed on outer housing 104. Flanges 102 may extend forwardly from an intermediate portion of outer housing 104 to couple with the lower ends of upstanding members 54 using fasteners, such as bolts 106, thereby coupling together main frame 42 and engine 12.

Figure 7:
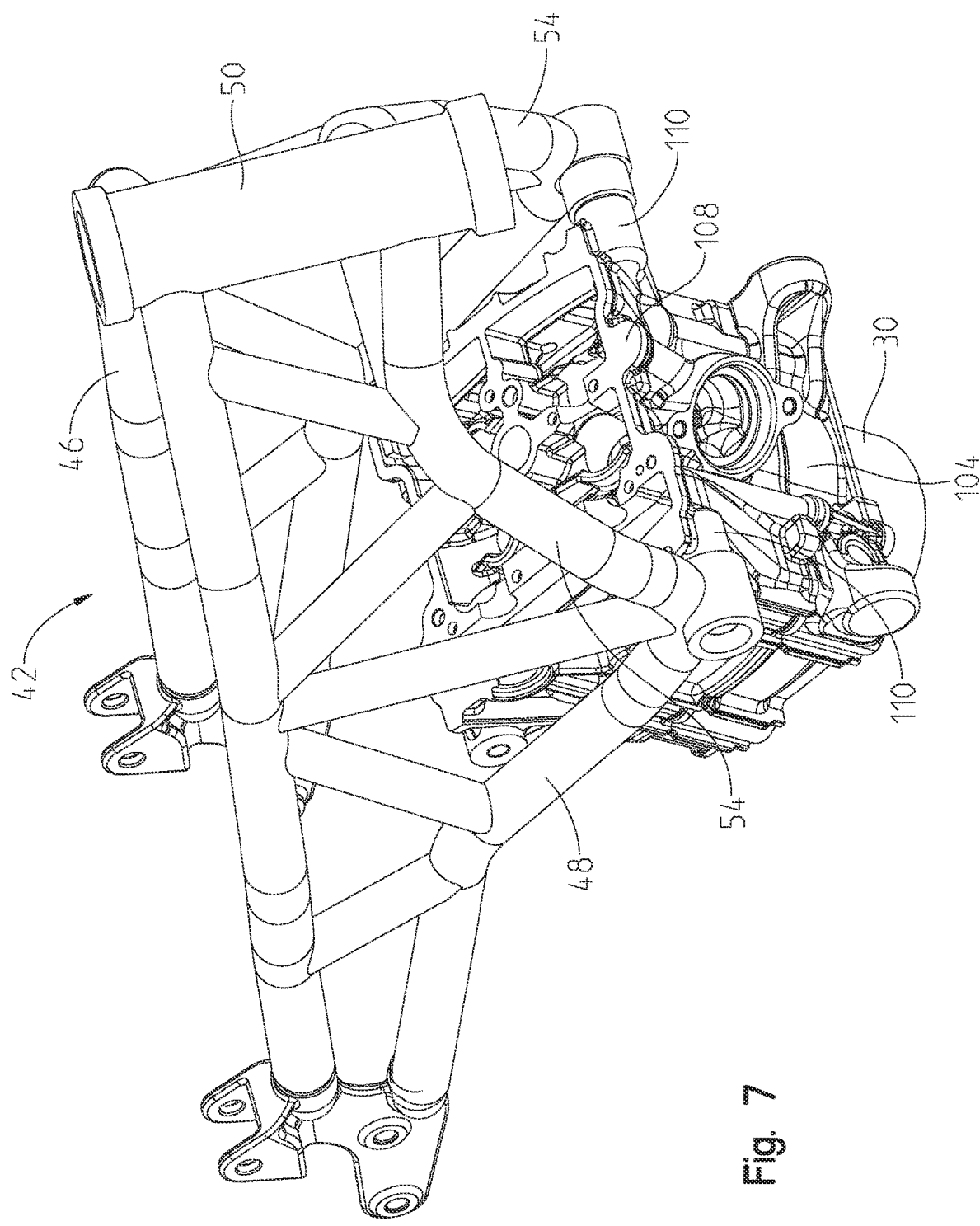
FIG. 7 is a front right perspective view of the frame assembly of FIG. 4 coupled to the engine at a second alternative location.

In another embodiment, and referring to FIG. 7, main frame 42 also may be coupled to first cylinder 30 of engine 12 at a position adjacent an upper end 108 of cylinder 30. More particularly, upper end 108 of first cylinder 30, which couples with cylinder head 38 (FIG. 2), may include removable or integral mounting brackets or flanges 110 which extend laterally outwardly from outer housing 104 thereof. The lower ends of upstanding members 54 are configured to couple with flanges 110 to join main frame 42 to upper end 108 of first cylinder 30.

Figure 8:
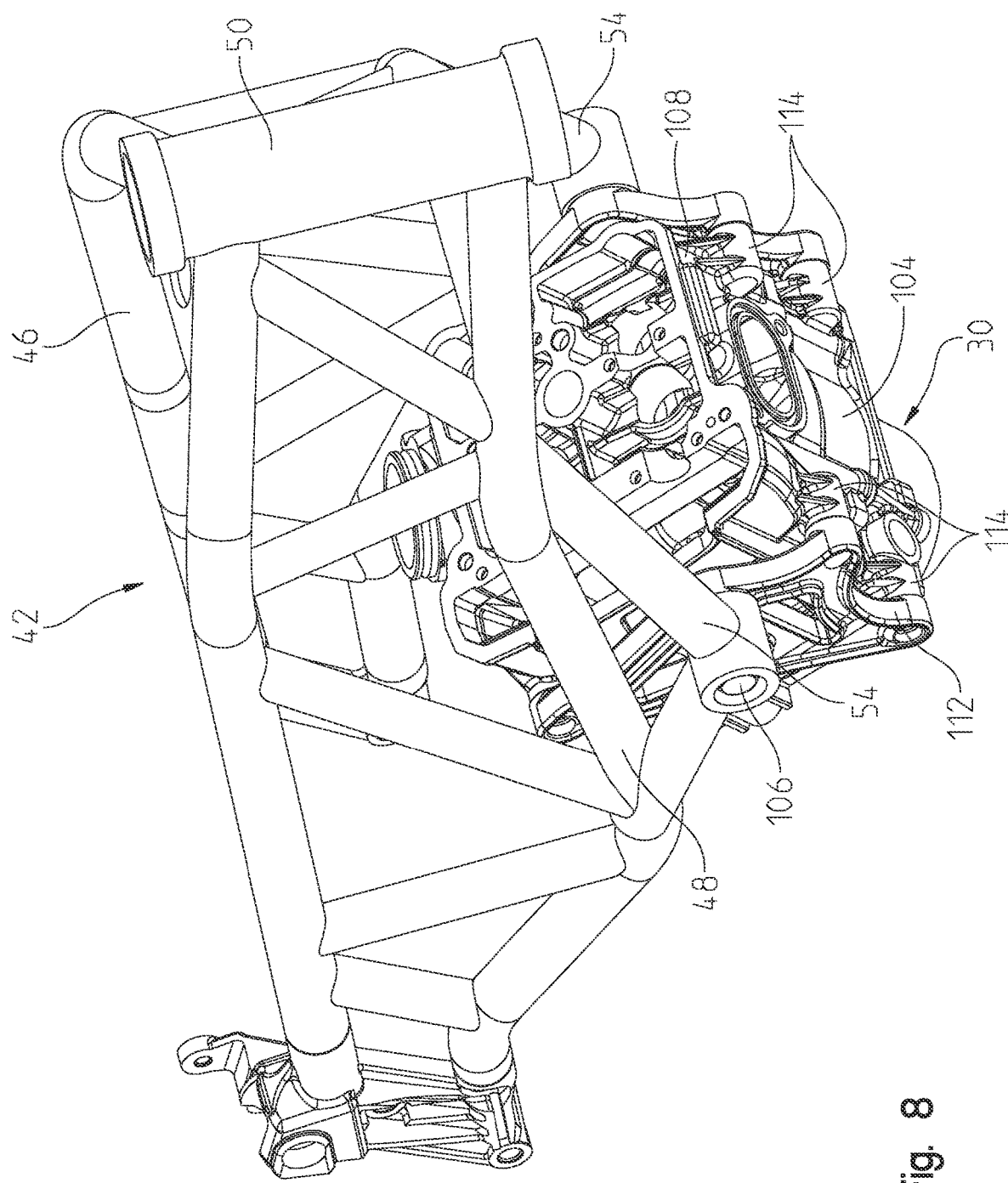
FIG. 8 is a front right perspective view of the frame assembly of FIG. 4 coupled to the engine at a third alternative location.

In a further alternative embodiment, and referring to FIG. 8, mounting brackets 112 may be removably coupled to first cylinder 30 and upstanding members 54 of main frame 42 to join together frame assembly 40 and engine 12. More particularly, mounting brackets 112 align with mounting bores 114 on outer housing 104 of first cylinder 30 and fasteners, such as bolts, are received through mounting bracket 112 and into mounting bores 114 to couple mounting brackets 112 to first cylinder 30. The lower ends of upstanding members 54 couple with mounting brackets 112, using fasteners 106, such that main frame 42 is coupled to engine 12 through mounting brackets 112, rather than coupling directly with outer housing 104 of first cylinder 30 or crankcase 60 (FIG. 4).

Figure 9:
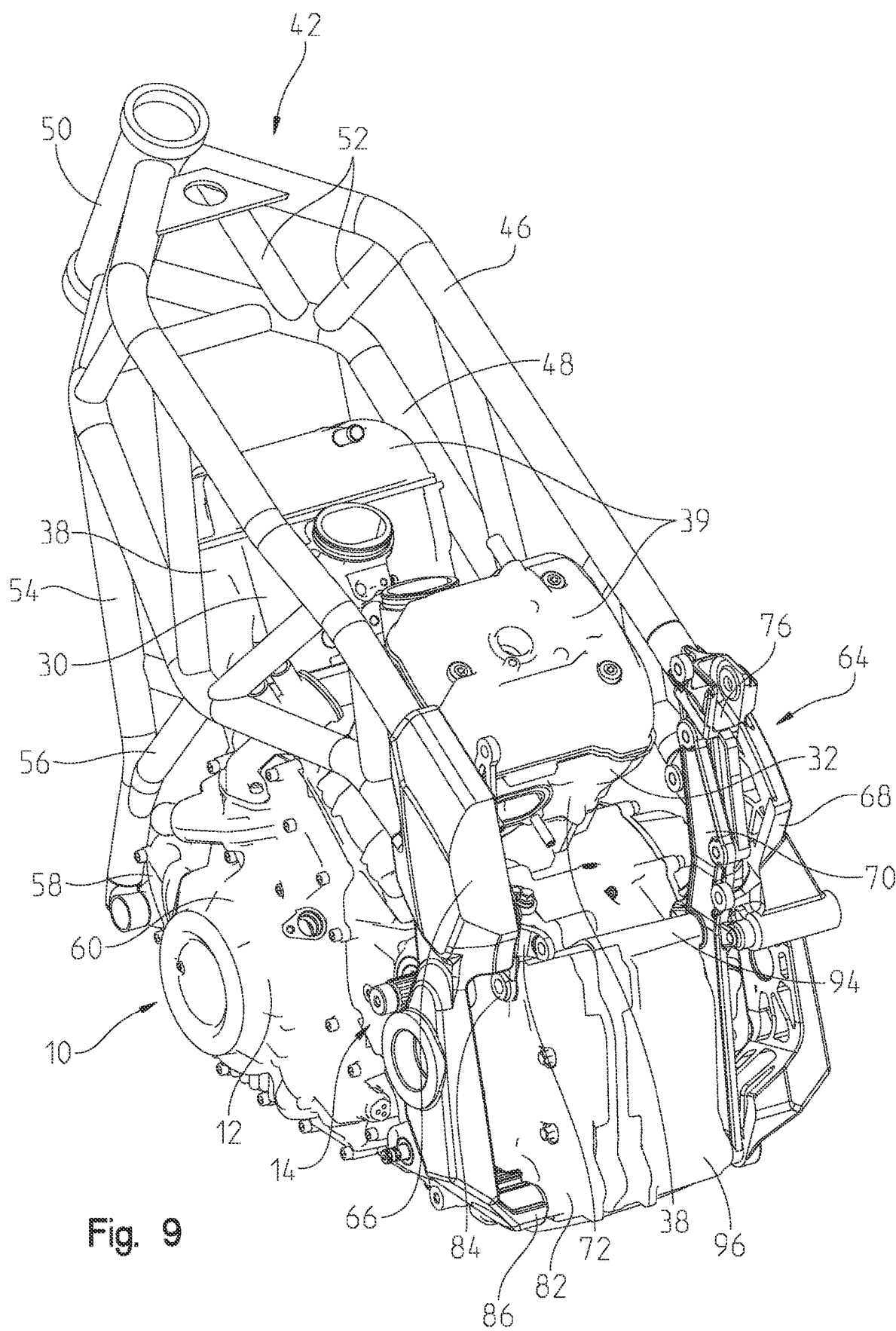
FIG. 9 is a rear left perspective view of the frame assembly and engine of FIG. 4.
Figure 10:
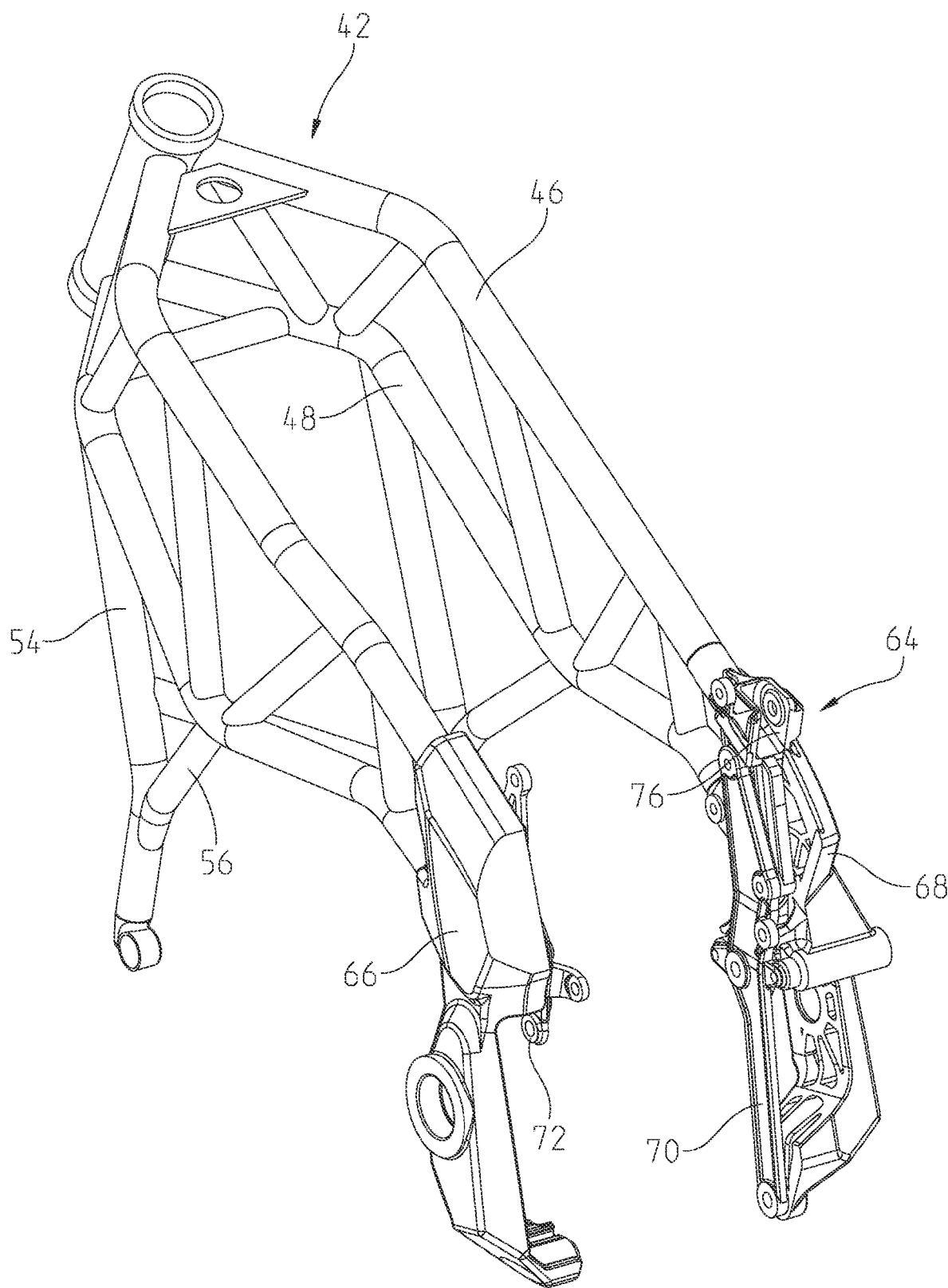
FIG. 10 is a rear left perspective view of the frame assembly of FIG. 4, including a main frame and an intermediate frame portion.
Figure 11:
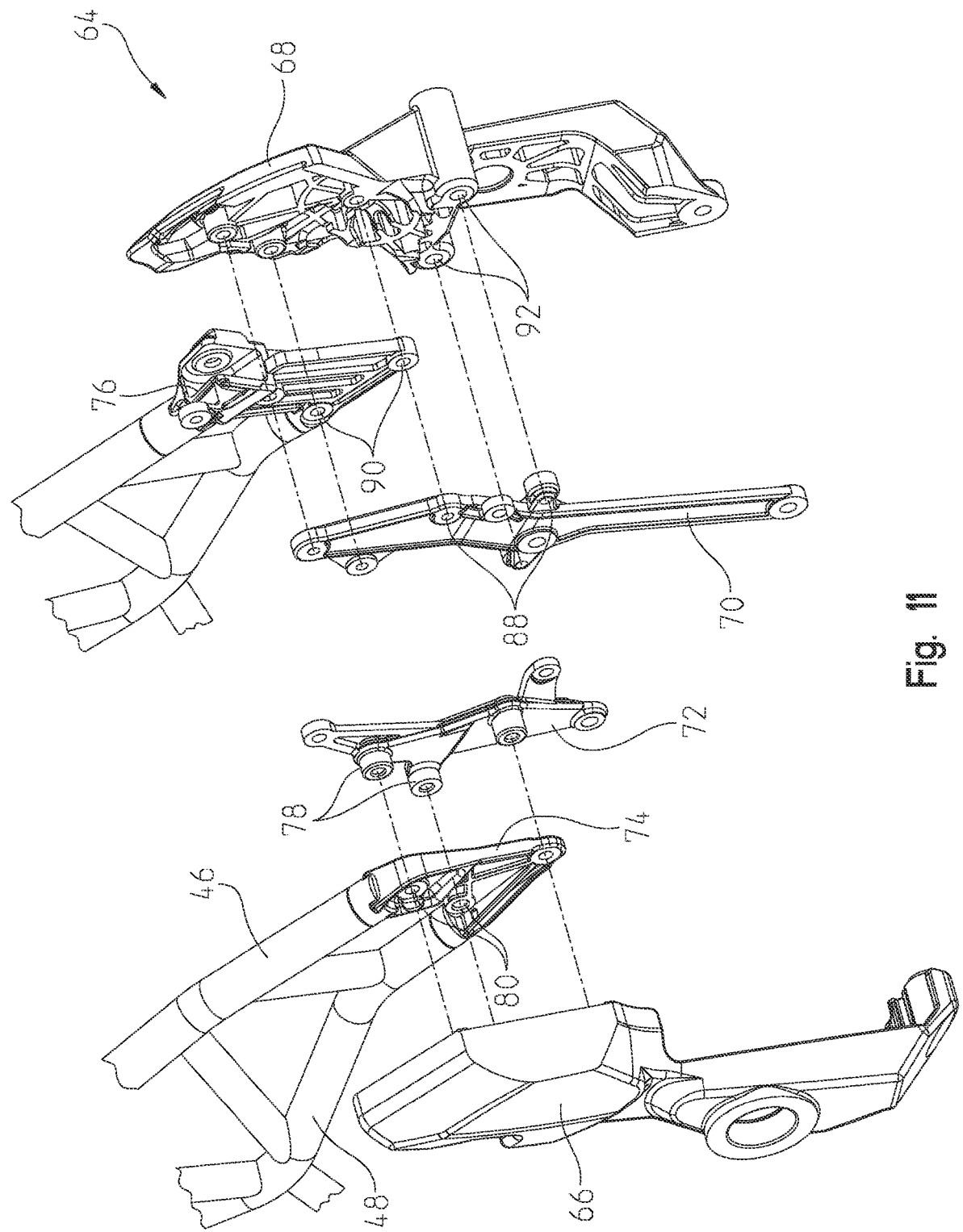
FIG. 11 is an exploded view of the intermediate portion of FIG. 10.

Referring to FIGS. 9-11, main frame 42 also extends rearwardly of engine 12 and over a portion of transmission 14. Illustratively, longitudinally-extending members 46, 48 may be coupled to an intermediate frame portion 64 of frame assembly 40. Intermediate frame portion 64 may include a first or left side member 66 and a second or right side member 68. In one embodiment, first and second members 66, 68 may be comprised of cast aluminum, which may reduce the overall weight of vehicle 2 and/or adjust the position of the center of gravity of vehicle 2. Additionally, by casting first and second members 66, 68 from aluminum, the overall configuration of first and second members 66, 68 can be formed into a complex or desired shape to fit with the various mounting surfaces on main frame 42, rear frame 44, and/or powertrain assembly 10. First and second members 66, 68 are configured to couple with the rear ends of upper and lower longitudinally-extending members 46, 48 and, as shown in FIGS. 9-11, first and second members 66, 68 are positioned laterally outward from the rear ends of upper and lower longitudinally-extending members 46, 48.

Referring to FIGS. 9-11, intermediate frame portion 64 includes first and second members 66, 68 and also includes a mounting arm 70 and a mounting bracket 72. Mounting arm 70 and mounting bracket 72 may be comprised of a high-strength metallic material, such as steel, thereby providing rigidity and increased strength to frame assembly 40 at intermediate frame portion 64. Mounting arm 70 and mounting bracket 72 are configured to couple with main frame 42 and powertrain assembly 10. More particularly, mounting bracket 72 includes a plurality of apertures 78 which are configured to align with mounting apertures 80 on a coupler 74 of main frame 42. Illustratively, coupler 74 couples together the rear ends of longitudinally-extending members 46, 48 and may be comprised of a metallic material (e.g., steel). Apertures 78 of mounting bracket 72 and apertures 80 of coupler 74 are configured to align with mounting apertures (not shown) on first member 66 and are configured to receive fasteners, such as bolts, for coupling together first member 66, longitudinally-extending members 46, 48, and mounting bracket 72. Additionally, mounting bracket 72 is configured to mount with a portion of powertrain assembly 10, illustratively a rear end 82 of crankcase 60, at a position 84 on crankcase 60. In this way, mounting bracket 72 couples the rear ends of longitudinally-extending members 46, 48 and first member 66 of intermediate frame portion 64 to powertrain assembly 10. First member 66 of intermediate frame portion 64 also may be configured to couple with rear end 82 of crankcase 60 at a position 86.

Similarly, mounting arm 70 also is configured to couple with the rear ends of longitudinally-extending members 46, 48, second member 68 of intermediate frame portion 64, and a portion of rear end 82 of crankcase 60. More particularly, as shown in FIGS. 9-11, mounting arm 70 includes a plurality of apertures 88 which are configured to align with mounting apertures 90 on a second coupler 76 of main frame 42. Illustratively, second coupler 76 couples together the rear ends of longitudinally-extending members 46, 48 on the right side of vehicle 2 and also may be comprised of a metallic material, such as steel. Apertures 88 of mounting arm 70 and apertures 90 of second coupler 76 are configured to align with mounting apertures 92 on second member 68 and are configured to receive fasteners, such as bolts, for coupling together second member 68, longitudinally-extending members 46, 48, and mounting arm 70. Additionally, mounting arm 70 is configured to couple with a portion of rear end 82 of crankcase 60 at positions 94, 96 on crankcase 60. In this way, mounting arm 70 couples the rear ends of longitudinally-extending members 46, 48 and second member 68 of intermediate frame portion 64 to powertrain assembly 10.

Mounting arm 70 and mounting bracket 72 each may include any number and configuration of apertures 88, 78, respectively, in order to align with predetermined apertures on rear end 82 of crankcase 60, couplers 74, 76, and/or first and second members 66, 68. In this way, if the configuration of powertrain assembly 10, frame assembly 40, and/or other components of vehicle 2 does not allow for directly coupling main frame 42 and/or first and second members 66, 68 of intermediate frame portion 64 to powertrain assembly 10, mounting arm 70 and mounting bracket 72 facilitate the coupling therebetween by including apertures 88, 78, respectively, that align with the predetermined apertures 80, 90 on couplers 74, 76, the predetermined apertures on first and second members 66, 68, and the predetermined apertures at positions 84, 94, 96 on rear end 82 of crankcase 60. Additionally, mounting arm 70 and mounting bracket 72 allow for a modular configuration of various components or systems of vehicle 2. For example, if vehicle 2 includes a different powertrain configuration which does not naturally align with the mounting apertures on frame assembly 40, mounting arm 70 and mounting bracket 72 are configured to couple with portions of frame assembly 40, as disclosed herein, and can be configured to align with the mounting apertures or bores on the new powertrain configuration. As such, mounting arm 70 and mounting bracket 72 allow for flexibility in the overall vehicle configuration and also can be used to assemble different vehicle platforms without the need to replace or redesign existing frame components or powertrain housings.

Referring to FIGS. 12-16, frame assembly 40 further includes rear frame 44 which extends rearwardly from intermediate frame portion 64 and includes rear suspension assembly 24, a swing arm 116, a first rear frame member 118, and a second rear frame member 120. First rear frame member 118 extends above swing arm 116 and is coupled to swing arm 116 at bracket 150 and second rear frame member 120 also extends above swing arm 116 and is coupled to swing arm 116 at bracket 152. Swing arm 116 is configured to couple with rear wheel 9 at brackets 150, 152 such that the rear axle of rear wheel 9 is configured to pivot at brackets 150, 152 during rotation of rear wheel 9 about rear wheel rotational axis 292 (FIG. 3).

Swing arm 116 is pivotally coupled to intermediate frame portion 64 and, more particularly, to first and second members 66, 68 through pivot members 122, 124, illustratively pivot shafts. Illustratively, swing arm 116 does not include a single pivot shaft or arm that extends continuously from the left side to the right side of vehicle 2 because rear end 82 of crankcase 60 is positioned at the front of swing arm 116. As such, illustrative swing arm 116 instead utilizes two pivot members 122, 124 configured as stub shafts for pivotally coupling swing arm 116 to intermediate frame portion 64 at right and left sides of vehicle 2. Pivot members 122, 124 extend inwardly but terminate before contact with rear end 82 of crankcase 80 such that pivot members 122, 124 are spaced apart from each other by crankcase 60.

Figure 12:
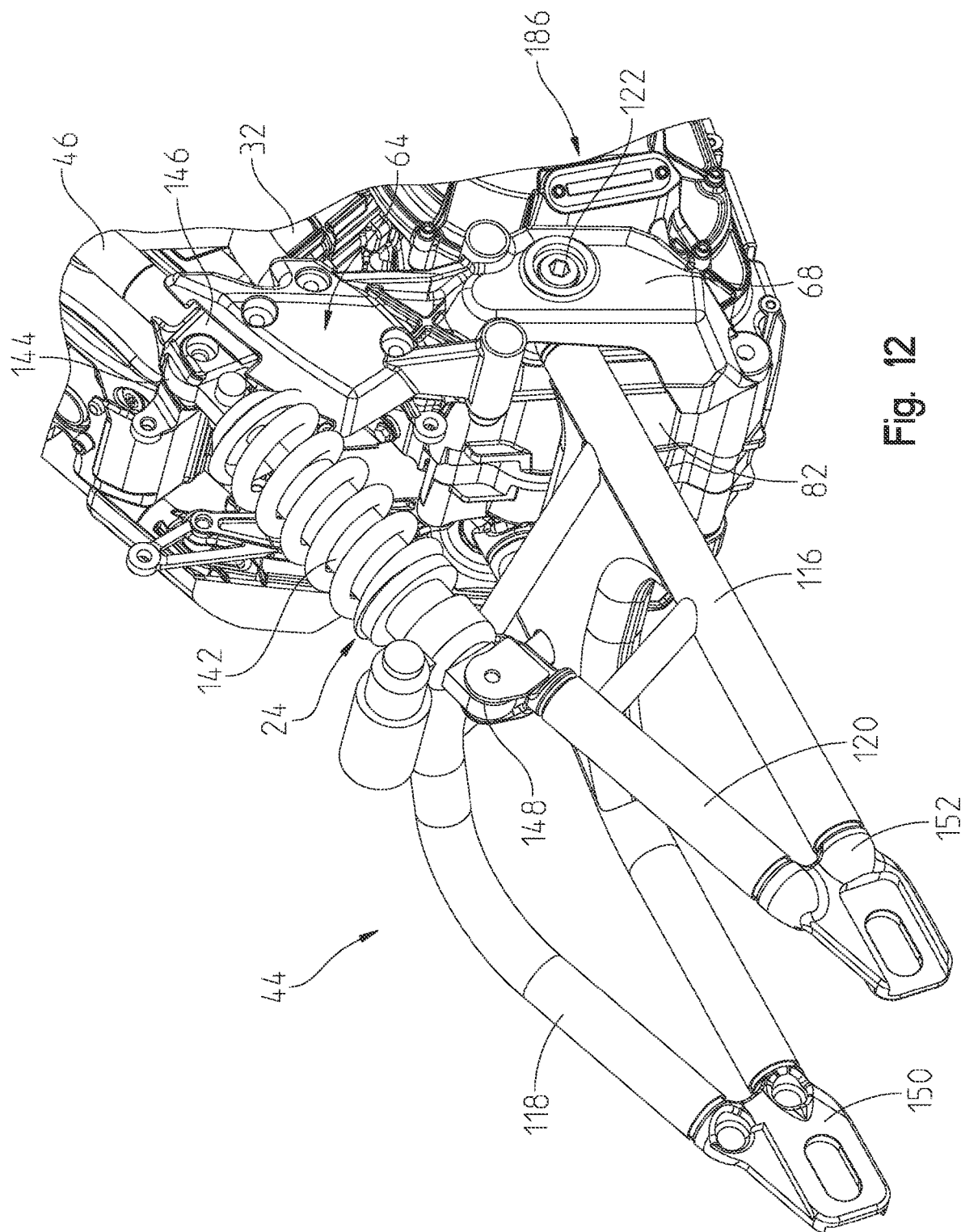
FIG. 12 is a rear right perspective view of a rear frame portion and a rear suspension assembly positioned rearward of the engine.
Figure 13:
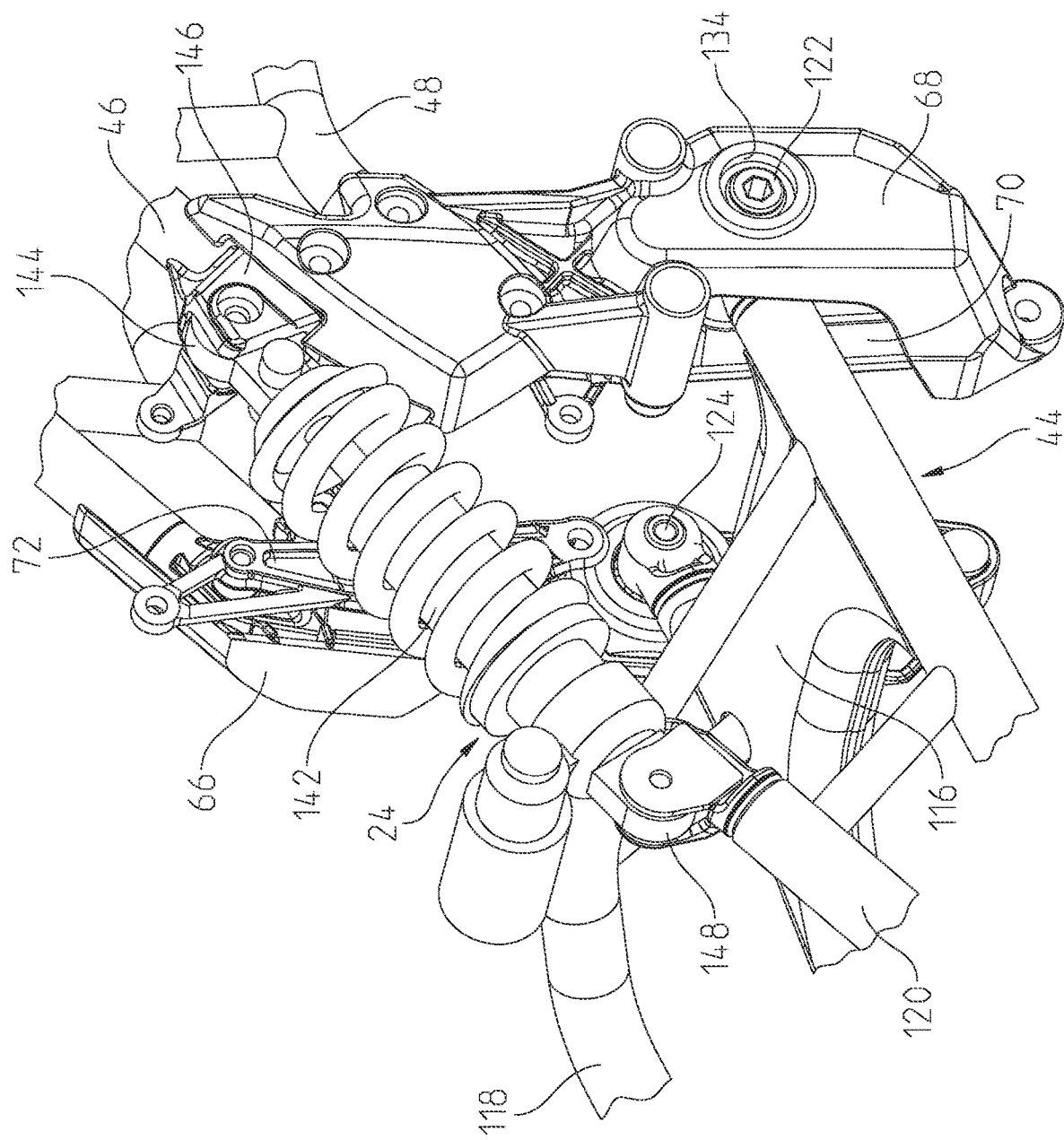
FIG. 13 is a further rear right perspective view of the rear frame portion and the rear suspension assembly of FIG. 12.
Figure 14:
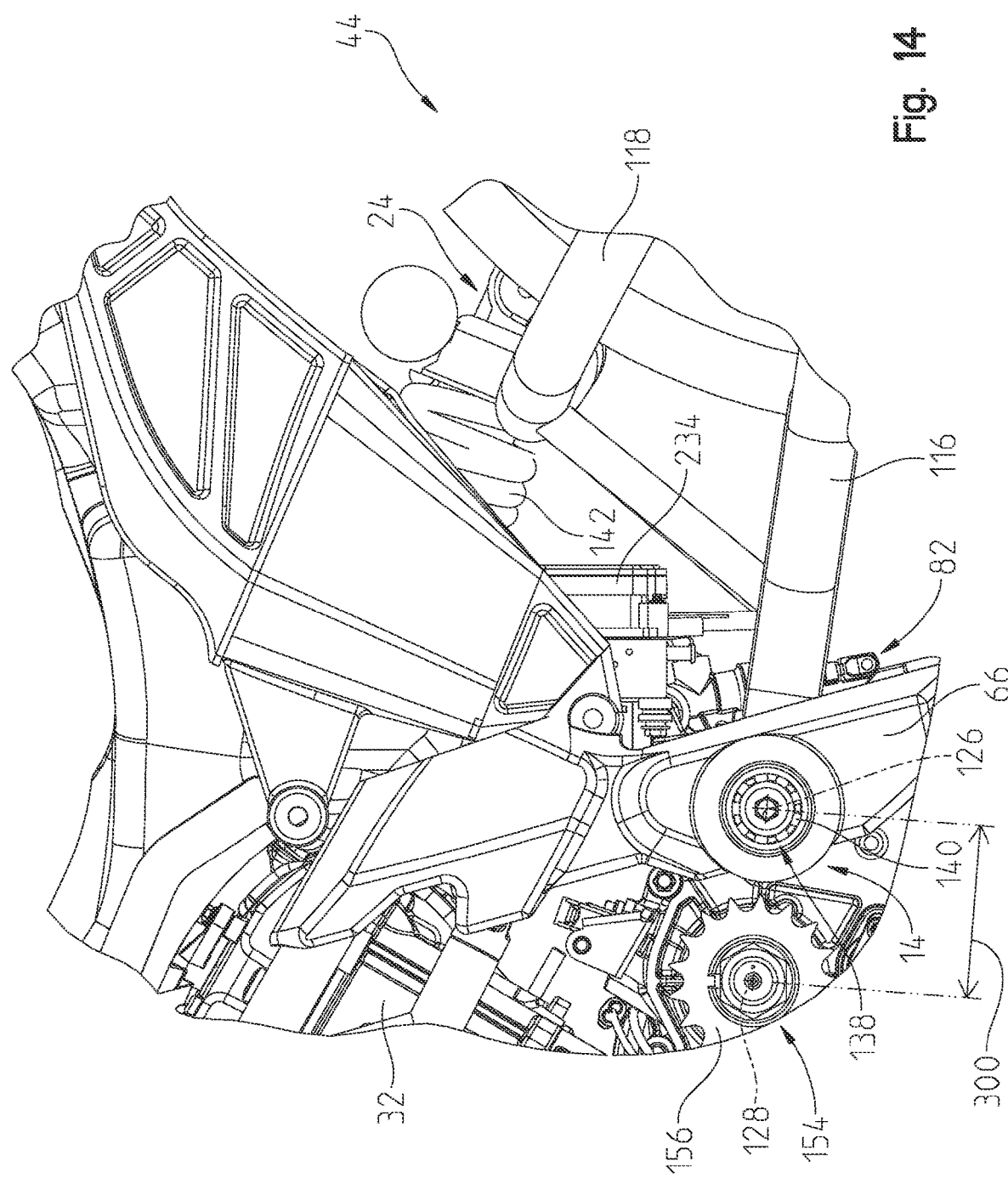
FIG. 14 is a left side view of the rear frame portion of FIG. 12.

Swing arm 116 is configured to generally straddle rear end 82 of crankcase 60, as shown in FIG. 12, which is possible because swing arm 116 does not utilize is single pivot shaft extending continuously between first and second members 66, 68 of intermediate frame portion 64. Rather, by using pivot members 122, 124, which are only positioned at the right and left sides of vehicle 2, respectively, swing arm 116 is configured to receive rear end 82 of crankcase 60. In this way, swing arm 116 is positioned adjacent and in close proximity to powertrain assembly 10. By positioning swing arm 116, including pivot axis 126 of swing arm 116, in close proximity to powertrain assembly 10, swing arm 116 may pivot about pivot axis 126 at a position adjacent a drive axis 128 of drive shaft 155 of transmission 14 (FIGS. 4 and 14). In one embodiment, as shown in FIG. 14, a horizontal distance between drive axis 128 and pivot axis 126 is defined as 300 and is approximately 75-110 mm. Illustratively, distance 300 is approximately 900-100 mm, and more particularly, is approximately 93.6 mm. This close proximity of pivot axis 126 of swing arm 116 relative to drive axis 128 helps to keep the length of drive belt 159 (FIG. 1) consistent throughout the travel of rear suspension assembly 24.

Figure 15:
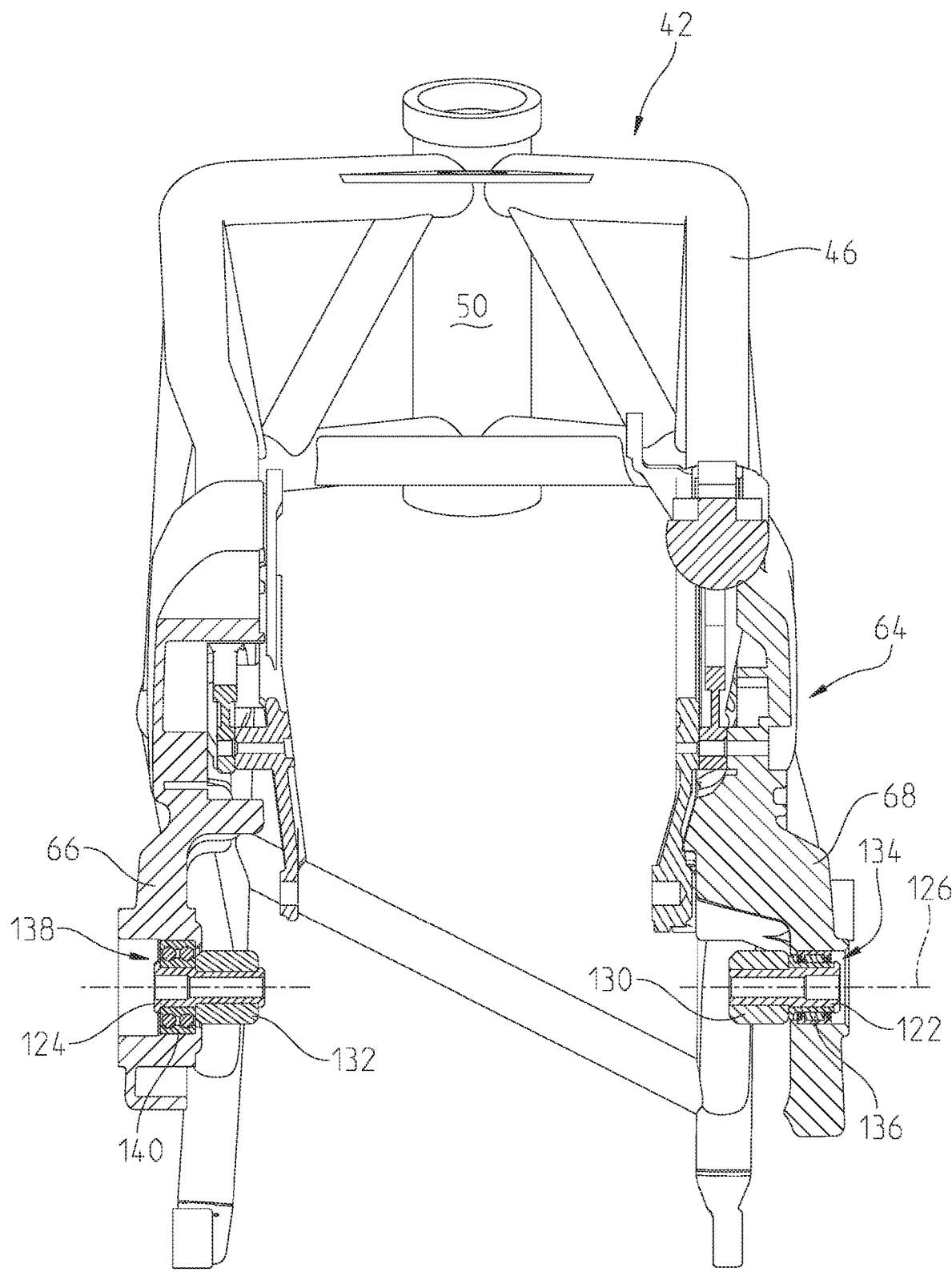
FIG. 15 is a rear view of the frame assembly of FIG. 10.
Figure 16:
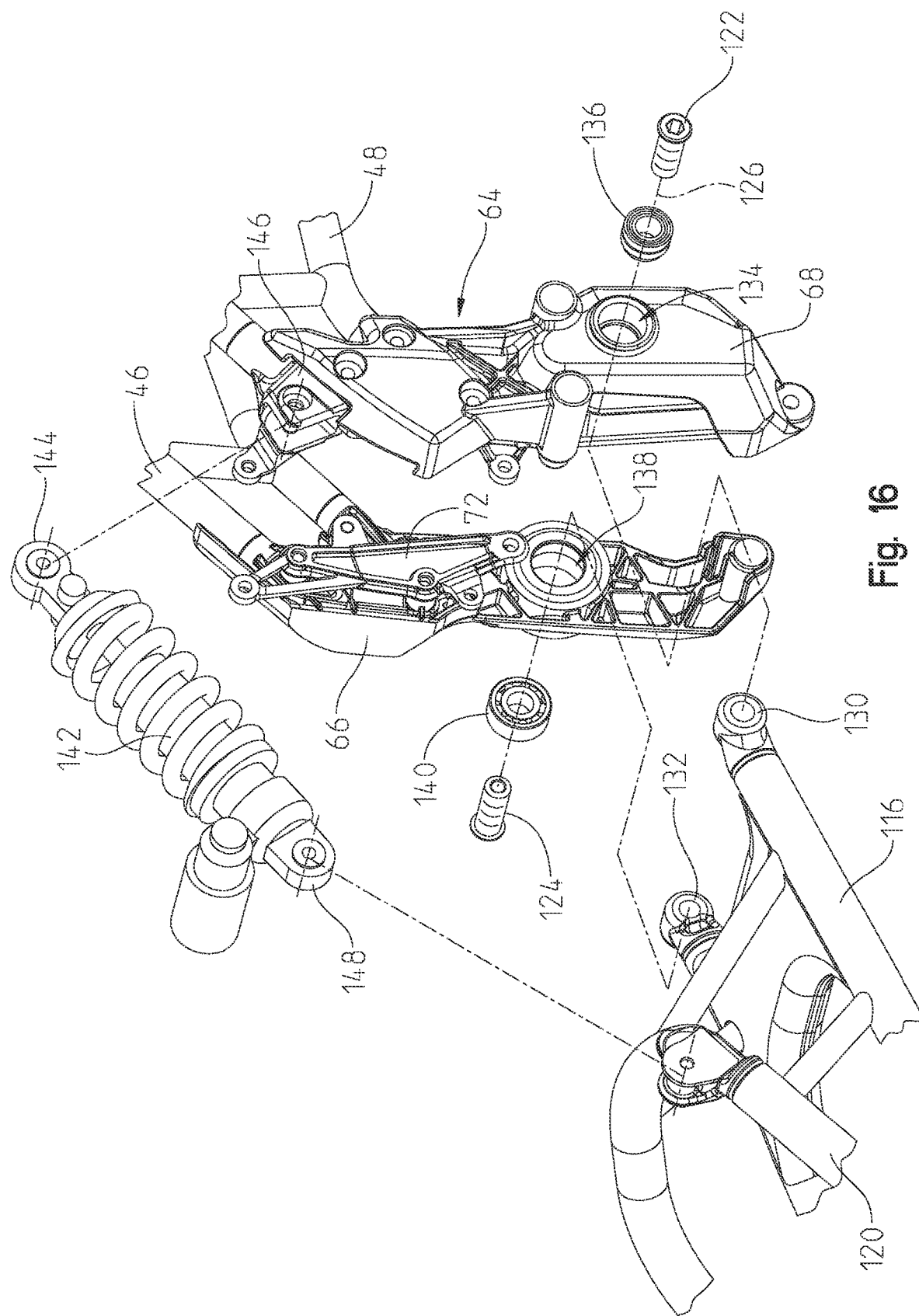
FIG. 16 is an exploded view of the rear frame assembly and rear suspension assembly of FIG. 12.
Figure 17:
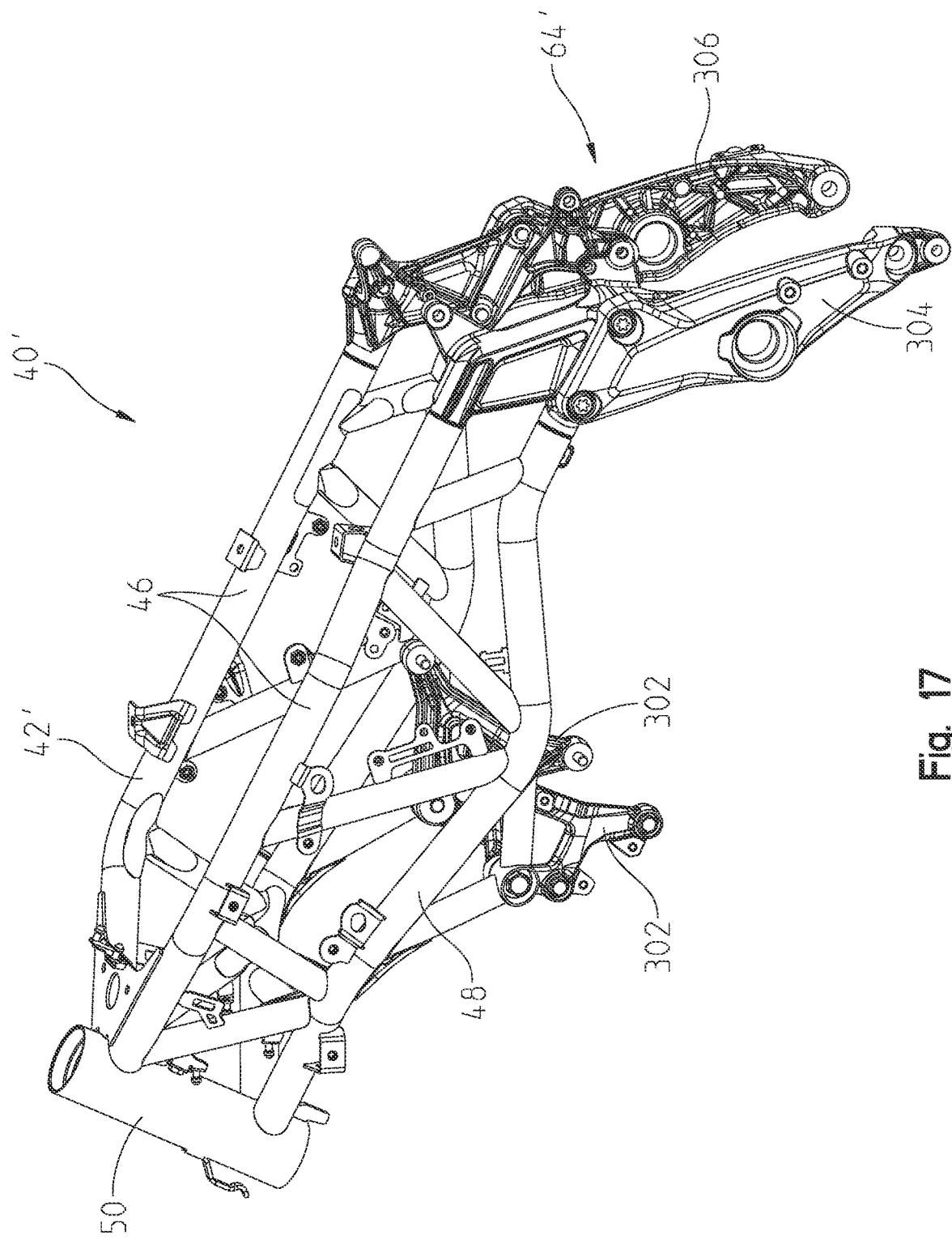
FIG. 17 is a rear left perspective view of an alternative frame assembly of the vehicle of FIG. 1.

Swing arm 116 is configured to pivot relative to intermediate frame portion 64 in response to movement of rear wheel 9. More particularly, as shown best in FIGS. 15 and 16, swing arm 116 includes mounting members 130, 132 which are configured to be received on pivot members 122, 124, respectively. As shown in FIGS. 15 and 16, pivot member 122 extends through a mounting bore 134 on second member 68 of intermediate frame portion 64, through a bearing member 136, illustratively a roller bearing, and extends into mounting member 130 of swing arm 116. Additionally, pivot member 124 extends through a mounting bore 138 on first member 66 of intermediate frame portion 64, through a bearing member 140, illustratively a ball bearing, and extends into mounting member 132 of swing arm 116. In this way, swing arm 116 is configured to pivot within mounting bores 134, 138 of intermediate frame portion 64 to pivot about a pivot axis 126 which extends through both pivot members 122, 124.

As is shown best in FIG. 16, the right side of vehicle 2 may include bearing member 136, illustratively a roller bearing, rather than bearing member 140 on the left side, which is configured as a ball bearing, because a shock absorber 142 of rear suspension assembly 24 is positioned on the right side of vehicle 2 and, as such, is offset and positioned laterally outward from longitudinally-extending centerline L (FIG. 1). Therefore, to support the load and movement of shock absorber 142 on the right side of vehicle 2 and prevent increased wear on the right side of vehicle 2 due to the movement of shock absorber 142, the right side of swing arm 116 may be operably coupled to bearing member 136 rather than bearing member 136. Additionally, and as shown in FIGS. 12-16, a forward portion 144 of shock absorber 142 is pivotally coupled to a bracket 146 on second member 68 of intermediate frame portion 64 and a rearward portion 148 of shock absorber 142 is pivotally coupled to second rear frame member 120. In this way, shock absorber 142 reciprocates between forward and rearward portions 144, 148 and is configured to pivot relative to second member 68 during movement of rear wheel 9.

Referring to FIGS. 17-20, an alternative embodiment of frame assembly 40 and rear suspension assembly 24 is shown therein. A main frame 42' of alternative embodiment frame assembly 40' includes upper and lower longitudinally-extending members 46, 48 and head tube 50. Additionally, main frame 42' includes brackets 302 extending downwardly from lower longitudinally-extending members 48 for coupling to a portion of powertrain assembly 10, for example engine 12. Additionally, an alternative embodiment intermediate frame portion 64' includes first and second members 304, 306 coupled to the rear ends of upper and lower longitudinally-extending members 46, 48.

Figure 18:
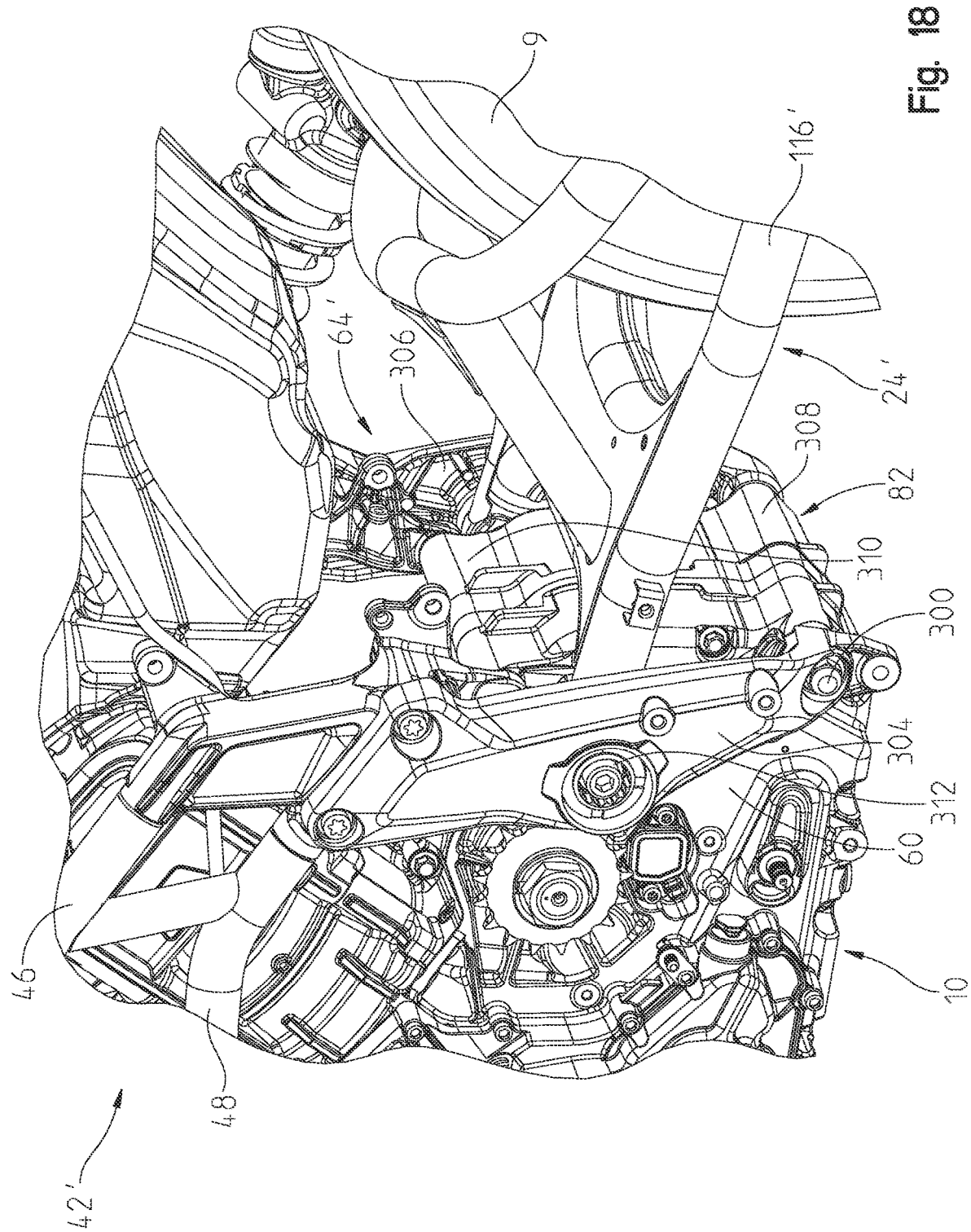
FIG. 18 is a left side view of the alternative frame assembly of FIG. 17 coupled to the powertrain assembly and an alternative embodiment of a rear suspension assembly of the vehicle of FIG. 1.

As shown in FIG. 18, first and second members 304, 306 are configured to couple with rear end 82 of crankcase 60 at positions 308, 310. Additionally, an alternative embodiment rear suspension assembly 24' also is configured to couple with first and second members 304, 306 and crankcase 60 at position 310.

Figure 19:
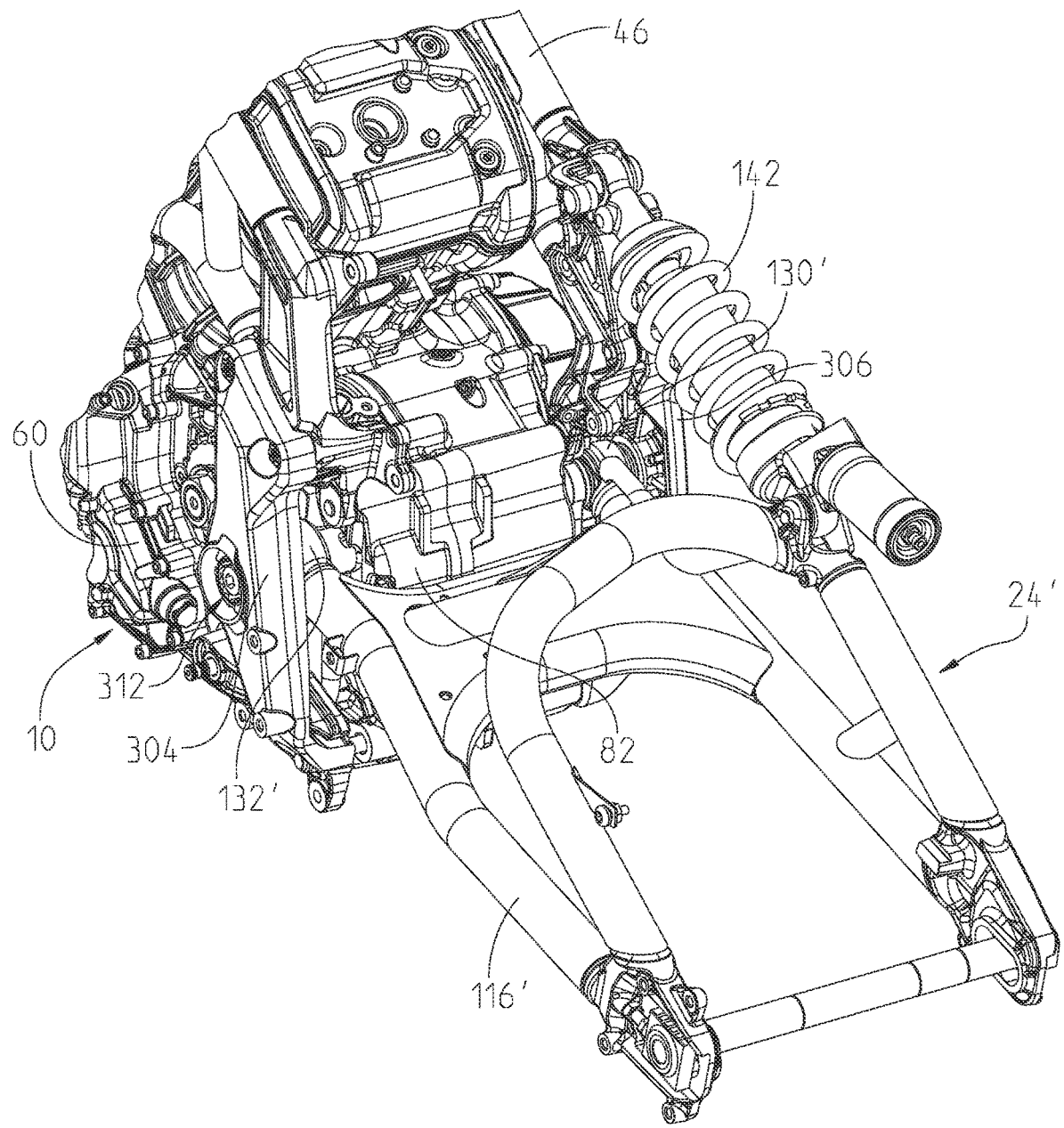
FIG. 19 is a rear left perspective view of a swing arm of the rear suspension assembly of FIG. 18 coupled to the frame assembly of FIG. 17.
Figure 20:
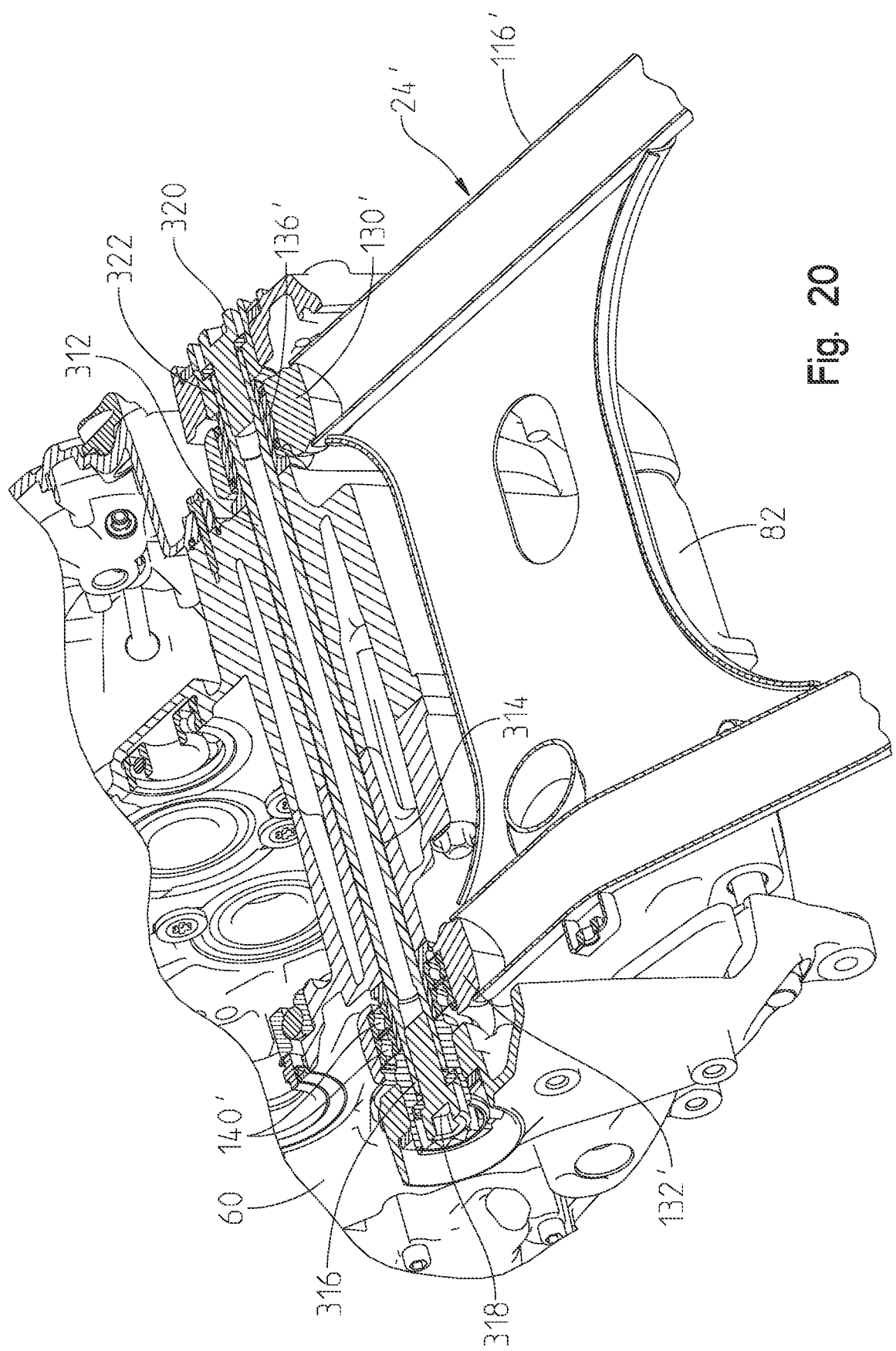
FIG. 20 is a cross-sectional view of a pivot axle of the swing arm of FIG. 19.

More particularly, and as shown in FIGS. 18-20, an alternative embodiment swing arm 116' of rear suspension assembly 24' includes a pivot axle 312 configured to continuously extend through rear end 82 of crankcase 60 such that a left side of pivot axle 312 is positioned within a mounting member 132' of swing arm 116' and a right side of pivot axle 312 is positioned within a mounting member 130' of swing arm 116'. In this way, pivot axle 312 extends continuously through crankcase 60 rather than being positioned rearward of crankcase 60 or laterally outward of crankcase 60. Rear end 82 of crankcase 60 includes a channel 314 configured to receive pivot axle 312, as shown in FIG. 20.

Swing arm 116' is pivotably coupled to pivot axle 312 and bearing members 140' at mounting member 132' and at least one bearing member 136' at mounting member 130' and bearing members 136', 140' are configured to facilitate rotation of swing arm 116' about pivot axle 312. Pivot axle 312 may be retained in channel 314 by a first end 316 of pivot axle 312 which receives a fastener 318. Additionally, a fastener 320 may be positioned at a second end 322 of pivot axle 312. Fasteners 318, 322 are configured to retain pivot axle 312 within channel 314 of crankcase 60.

Figure 21:
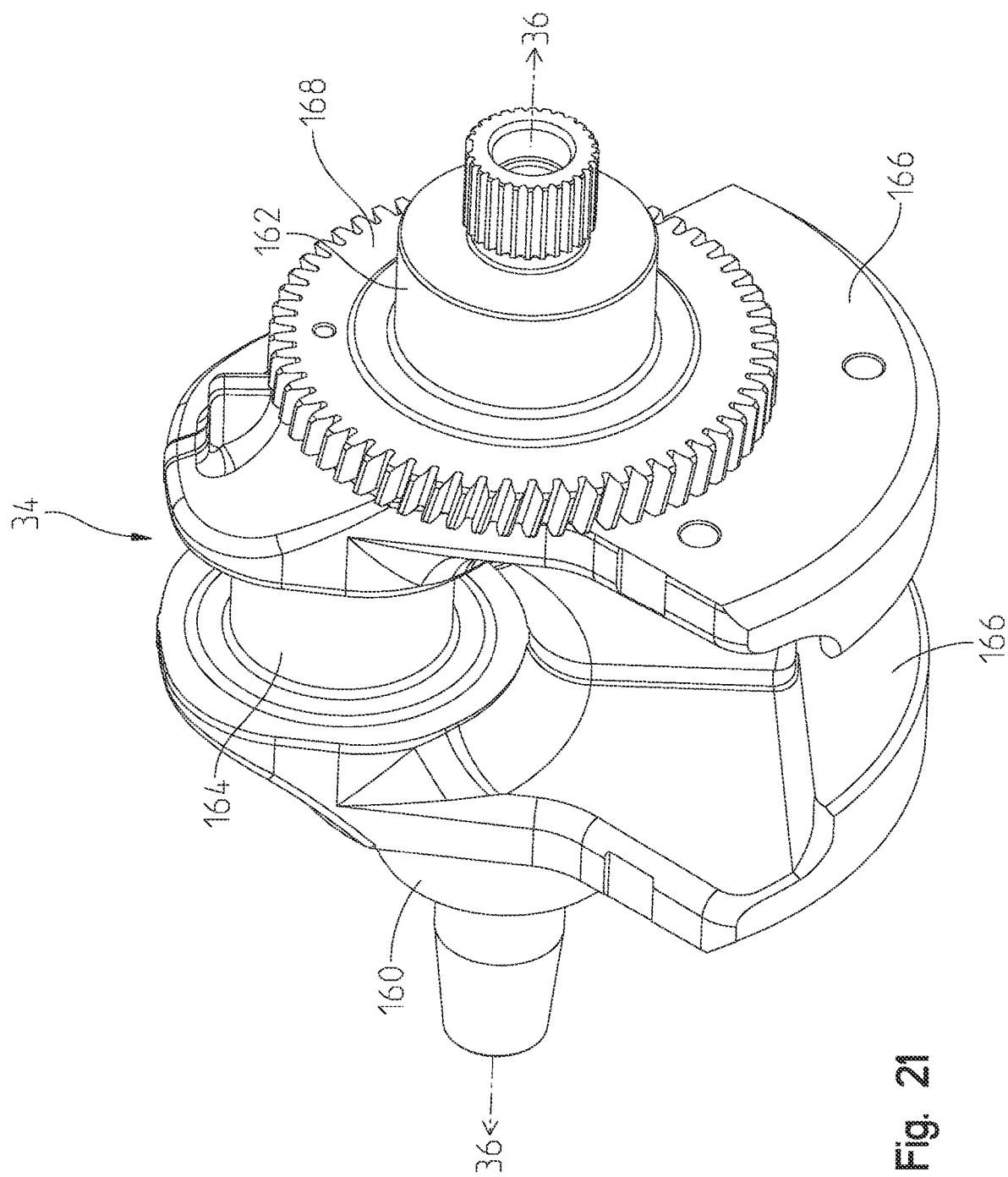
FIG. 21 is a front left perspective view of a crankshaft of the engine of the vehicle of FIG. 1.
Figure 22:
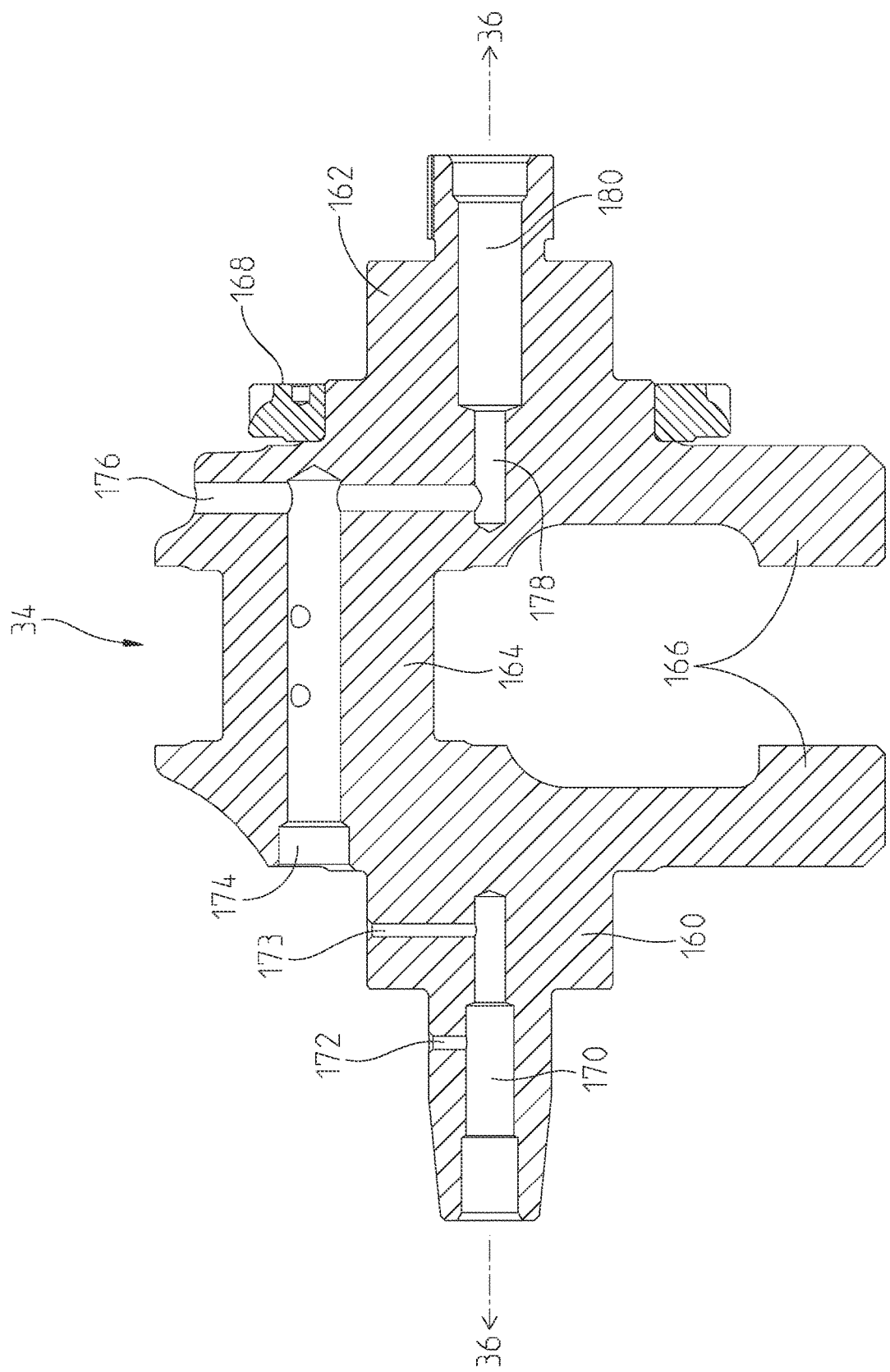
FIG. 22 is a cross-sectional view of the crankshaft of FIG. 21.

Referring to FIGS. 21 and 22, crankshaft 34 of engine 12 is shown. Crankshaft 34 includes a first main bearing journal 160, a second main bearing journal 162, and a connecting rod journal 164. Connecting rod journal 164 is coupled to the connecting rods of the pistons (not shown) and is intermediate counterweights 166. Crankshaft 34 is rotatably coupled to a gear 168, illustratively positioned adjacent second main bearing journal 162.

In operation, crankshaft 34 rotates about rotation axis 36 during operation of the pistons (not shown) in first and second cylinders 30, 32 (FIG. 2). As crankshaft 34 rotates, gear 168 also rotates about rotation axis 36. To ensure sufficient lubrication at crankshaft 34 for rotation thereof and movement of various components of engine 12, oil passages drilled or otherwise formed within portions of crankshaft 34. Illustratively, as shown in FIG. 22, first main bearing journal 160 is fluidly coupled to a first fluid passage 170 which is configured to provide oil or other lubricant to first main bearing journal 160 through a first port 172 and a second port 173. Additionally, crankshaft 34 also includes a second fluid passage 174 within a portion of connecting rod journal 164 which may be configured to provide oil or other lubricant to connecting rod journal 164 through a third port 176. Second fluid passage 174 is fluidly coupled to a third fluid passage 178 which extends through a portion of second main bearing journal 162. Third fluid passage 178 is fluidly coupled to a fourth fluid passage 180. In one embodiment, fourth fluid passage 180 is defined within a gear retainer (not shown) for gear 168, where the gear retainer couples gear 168 to crankshaft 34, for example through a threaded connection with an end of crankshaft 34, and also may include fourth fluid passage 180 to supply oil to portions of crankshaft 34. The oil supplied through fourth fluid passage 180 may be pressurized oil from the oil pump (not shown in FIG. 22) of engine 12.

Figure 23:
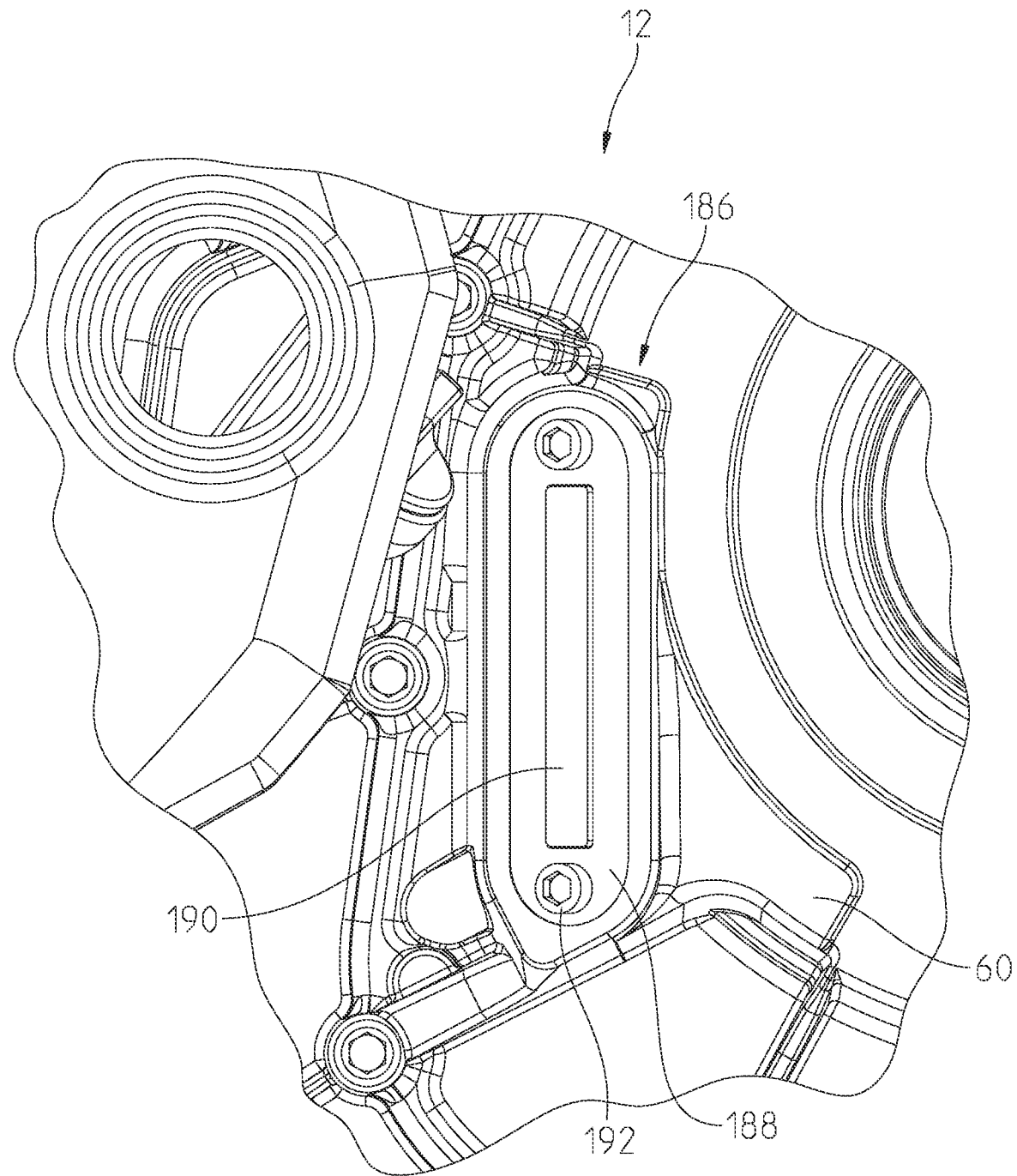
FIG. 23 is a right side view of an oil sight glass for the engine of the vehicle of FIG. 1.
Figure 24:
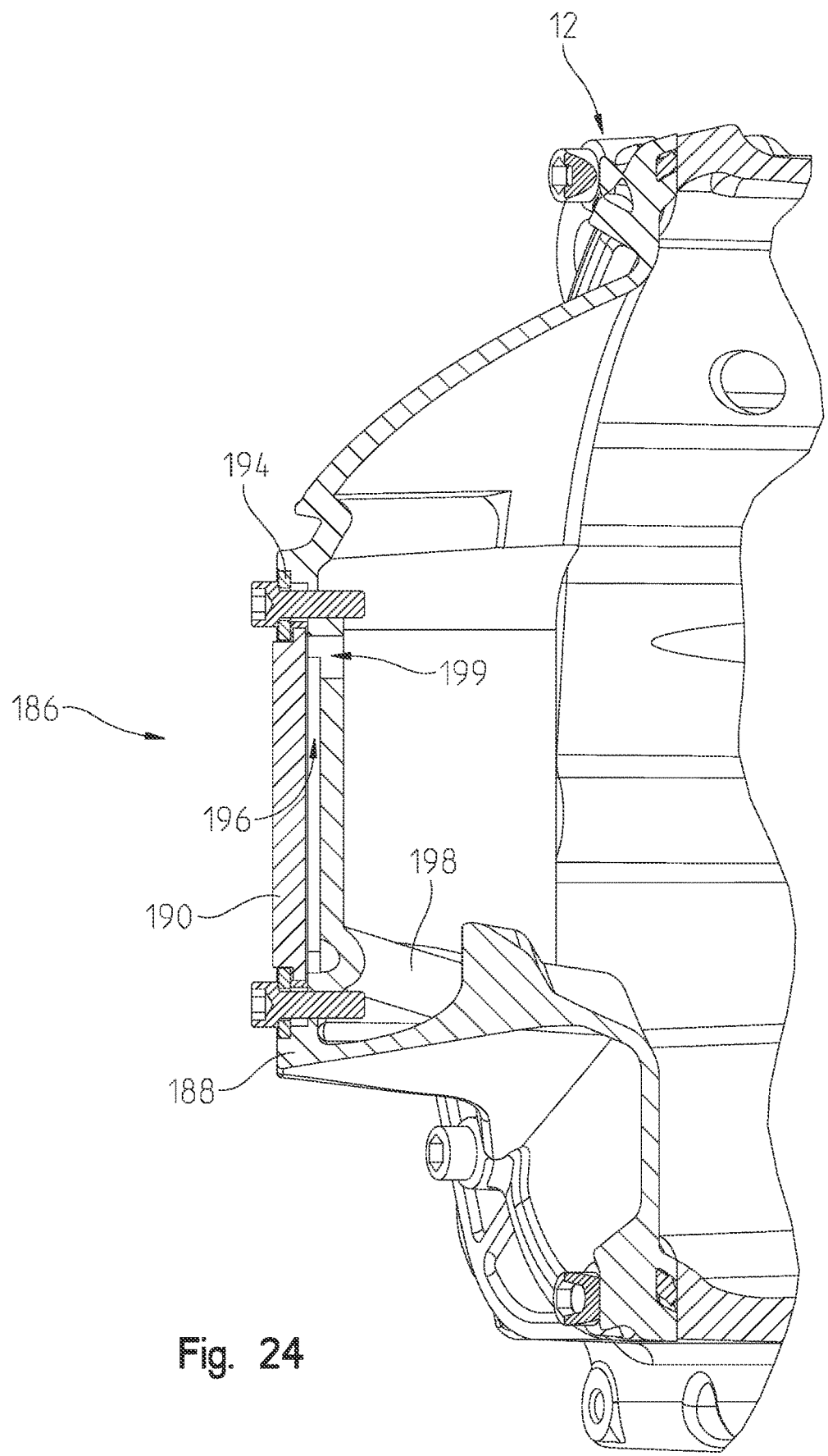
FIG. 24 is a cross-sectional view of the oil sight glass of FIG. 23.
Figure 25:
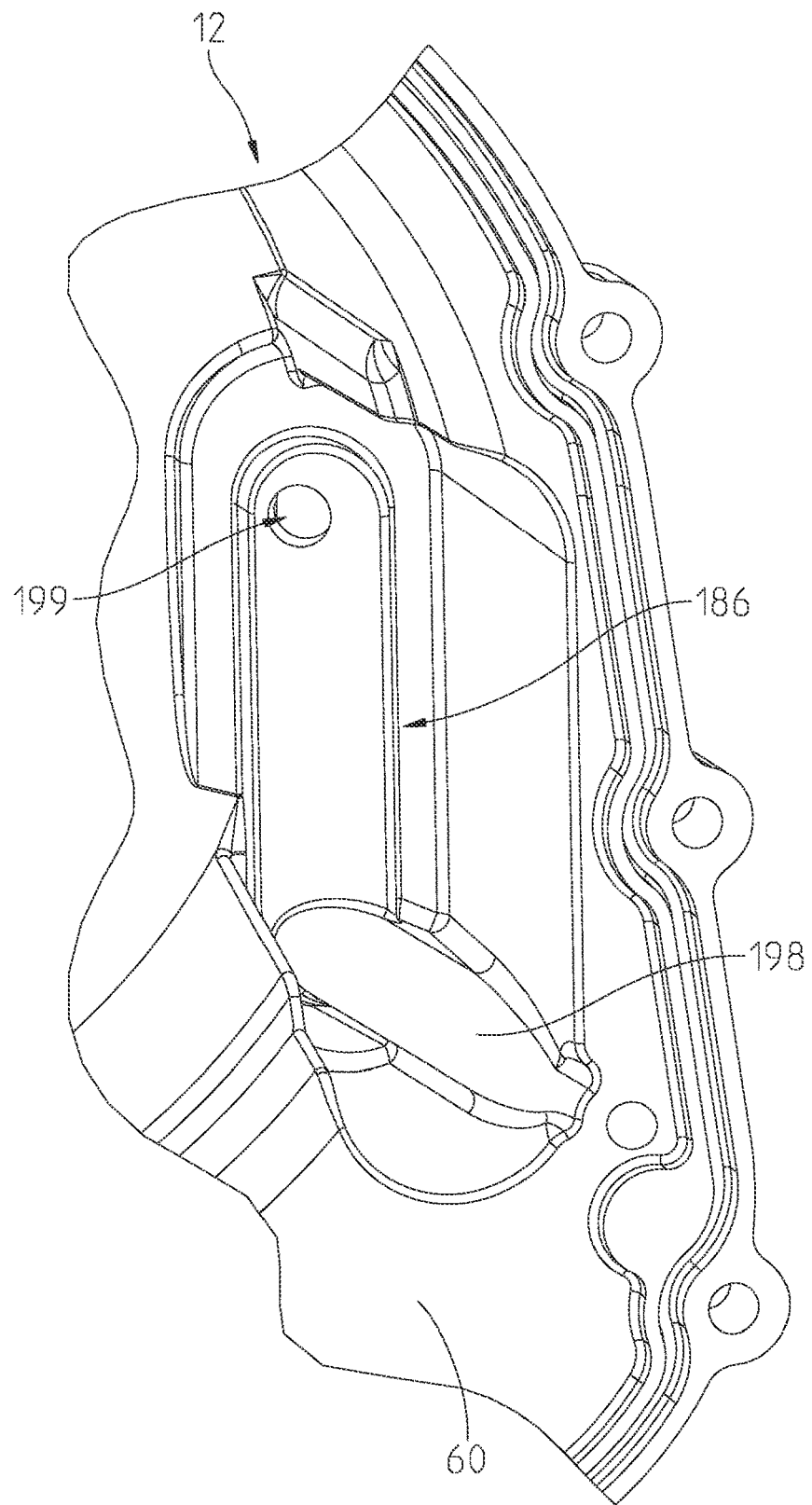
FIG. 25 is a left side view of an inner surface of the oil sight glass of FIG. 23.

Referring now to FIGS. 23-25, because oil may be used in engine 12 as a lubricant, it may be necessary to periodically inspect and/or replace the oil. However, because of the compact configurations of motorcycles, including vehicle 2 of the present disclosure, the dipstick or other access point for the engine oil may be difficult to reach or may require the removal of various components for access thereto. As such, engine 12 of the present disclosure includes an oil sight glass 186 which may display a portion of the oil within engine 12, which allows a user to see the quality of the oil. More particularly, oil sight glass 186 includes a housing 188 which is coupled to a portion of crankcase 60 with fasteners, such as bolts 192. In one embodiment, housing 188 may be integral with crankcase 60 or may be coupled thereto with fasteners. Housing 188 supports a transparent portion 190, such as a window, that allows a user to see the quality of oil in engine 12 and determine if the oil should be changed. Transparent portion 190 may be comprised of glass or transparent plastic and is sealed to housing 188 with seals 194 to prevent oil from leaking at oil sight glass 186.

Oil sight glass 186 is spaced apart from the oil reservoir (not shown) and not positioned therein. As such, it is necessary for oil from the oil reservoir to flow into a sight glass reservoir 196 through a conduit 198. In one embodiment, conduit 198 is drilled, machined, or otherwise formed in a portion of crankcase 60 and is configured to provide pressurized oil from the oil reservoir to sight glass reservoir 196 so that the oil is visible to the user. In one embodiment, as shown in FIG. 12, oil sight glass 186 is positioned on the right side of crankcase 60. Oil sight glass 186 further includes a vent opening or hole 199 positioned at an upper portion of sight glass reservoir 196 to allow air therein to vent from sight glass reservoir 196 as oil flows through conduit 198.

Figure 26:
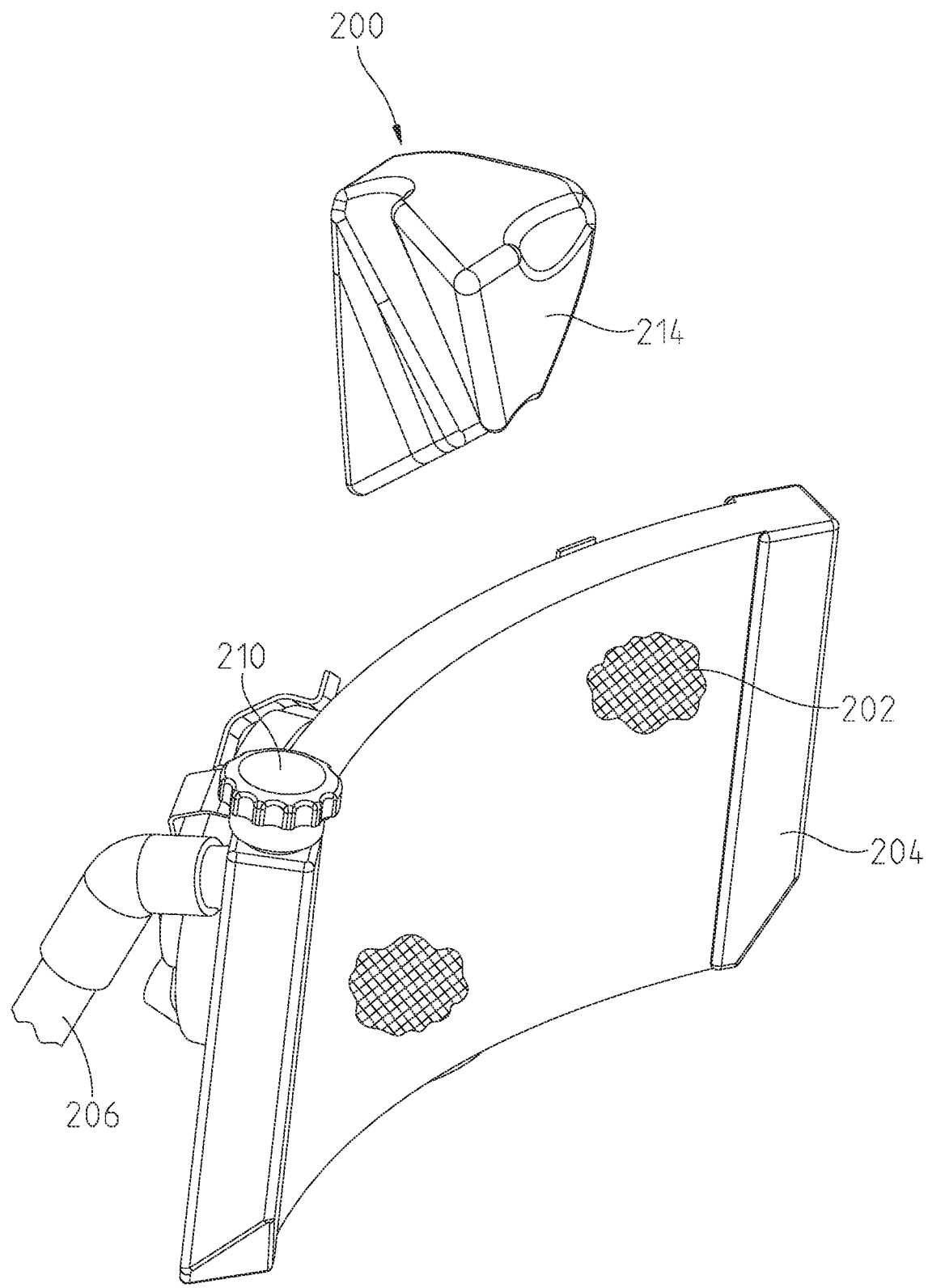
FIG. 26 is a front right perspective view of a cooling assembly, including a radiator, of the vehicle of FIG. 1.
Figure 27:
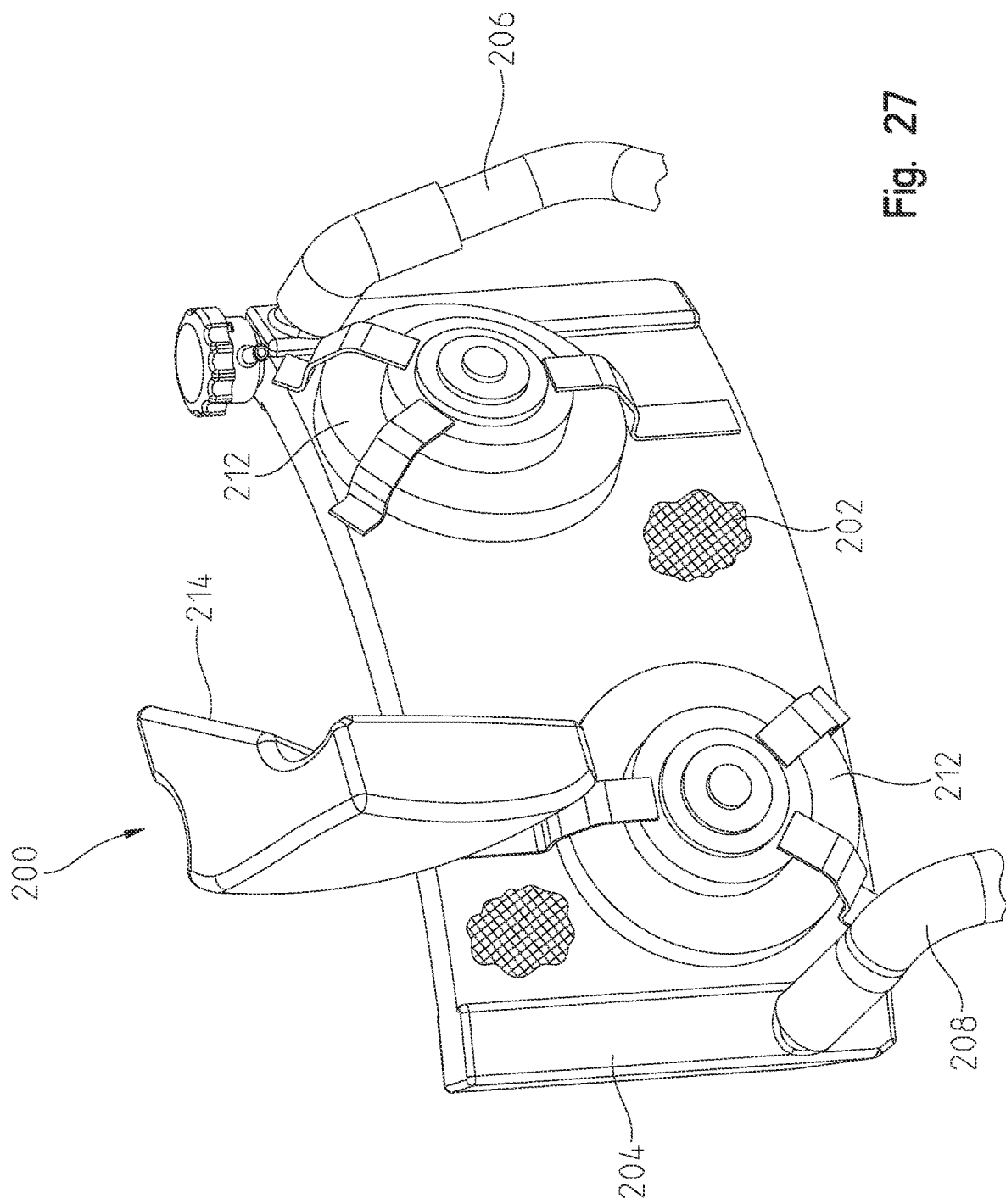
FIG. 27 is a rear left perspective view of the cooling assembly of FIG. 26.

Referring to FIGS. 26 and 27, engine 12 is operably coupled to a cooling assembly 200 which is configured to maintain the engine temperature. Cooling assembly 200 includes a radiator 202, a housing 204 coupled to radiator 202 and supported on a portion of main frame 42 (FIG. 1), an inlet conduit 206, and an outlet conduit 208. As shown in 1, cooling assembly 200 is positioned longitudinally intermediate front forks 20 and powertrain assembly 10. In this way, air flowing rearwardly from the front of vehicle 2 flows into radiator 202 and facilitates cooling of engine 12.

To increase the quantity of air flowing through radiator 202, illustrative radiator 202 has a curved shape. In particular, the outer ends of radiator 202 extend forwardly from a center portion thereof, which may direct air inwardly towards radiator 202 and increase air flow through radiator 202. The curved shape of radiator 202 also has the benefit of allowing other components to occupy space on vehicle 2 that would otherwise be located at a different position if radiator 202 was configured as a flat panel or planar component. For example, various conduits or hoses (e.g., exhaust conduits on engine 12) may extend forwardly on vehicle 2 than other vehicles due to the curved configuration of radiator 202. Additionally, cooling assembly 200 includes at least one fan 212 and, illustratively two fans 212, along a rear surface of radiator 202, which further facilitate air flow through radiator 202 by drawing air rearwardly through radiator 202.

Inlet conduit 206 of cooling assembly 200 is coupled to an upper portion of housing 204 and provides warm cooling fluid (e.g., coolant, water) to radiator 202 after the cooling fluid circulates about engine 12. A fill cap 210 is positioned adjacent inlet conduit 206 which allows a user to add or replace the cooling fluid. As the cooling fluid flows through radiator 202, the temperature thereof decreases such that when the cooling fluid flows out of radiator 202 through outlet conduit 208, the cooling fluid flows towards engine 12 to decrease the temperature thereof. Cooling assembly 200 also includes a coolant overflow/reservoir bottle 214. In one embodiment, bottle 214 is positioned rearwardly of radiator 202.

Figure 28:
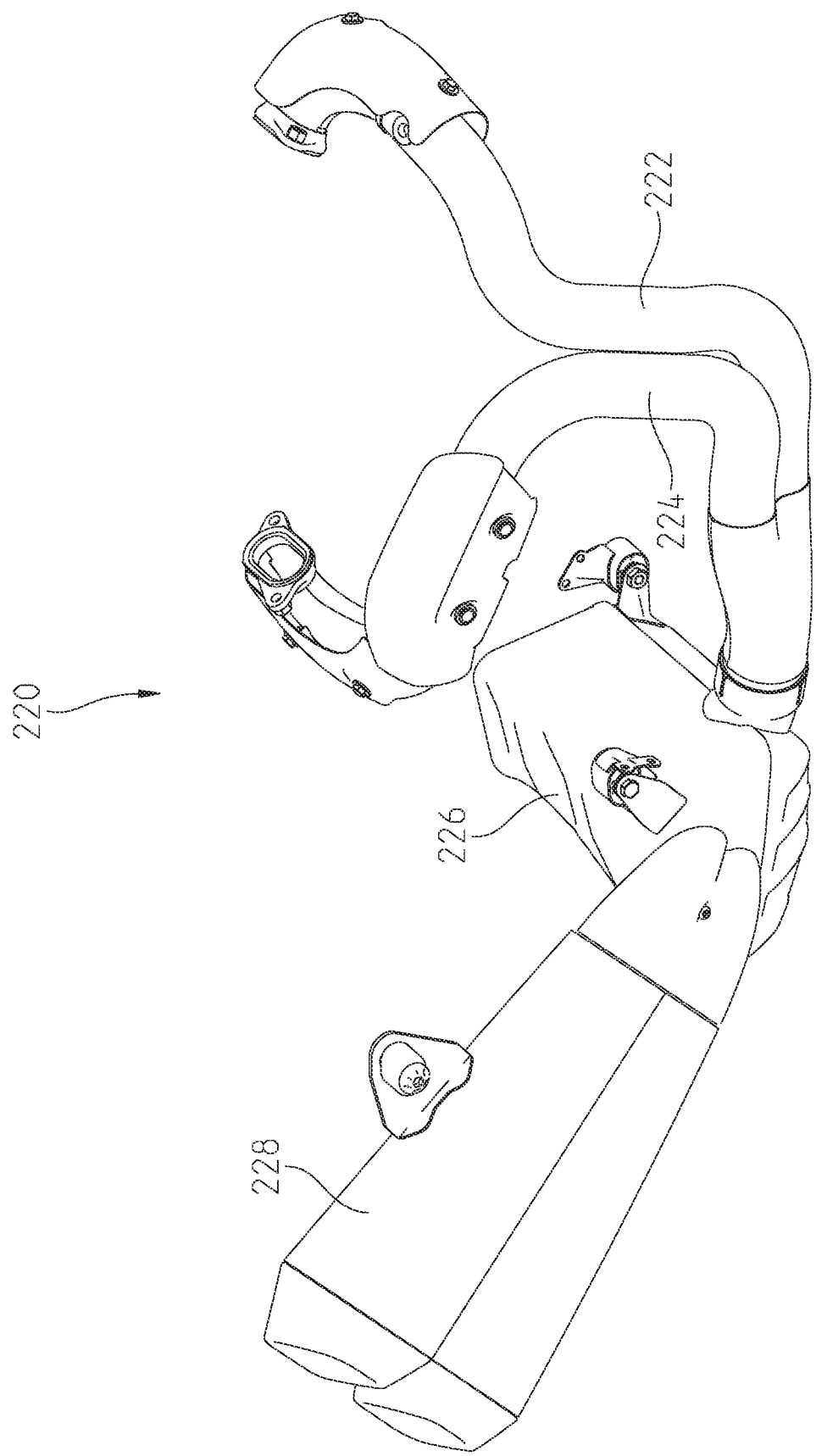
FIG. 28 is a right side view of an exhaust assembly of the vehicle of FIG. 1.

Referring now to FIG. 28, vehicle 2 includes an exhaust assembly 220 fluidly coupled to powertrain assembly 10. Exhaust assembly 220 extends from exhaust manifolds (not shown) of engine 12 and includes a first exhaust conduit 222 fluidly coupled to first cylinder 30 and a second exhaust conduit 224 fluidly coupled to second cylinder 32. First and second exhaust conduits 222, 224 extend rearwardly and are coupled to a collector 226 which is positioned rearward of engine 12. In one embodiment, collector 226 also may be positioned below a portion of swing arm 116 (FIG. 12). The exhaust gases flowing through first and second exhaust conduits 222, 224 are mixed at collector 226 and then flow from collector 226 through tail pipes of a muffler 228 to exit vehicle 2. Collector 226 increases the volume of air flow through exhaust assembly 220 without restricting the flow of exhaust gases toward muffler 228. In this way, by increasing the volume of exhaust assembly 220, collector 226 may contribute to an overall noise reduction of exhaust assembly 220 and also allows powertrain assembly 10 to have the power necessary to propel vehicle 2 because collector 226 does not impinge any exhaust gas flow through exhaust assembly 220.

Figure 29:
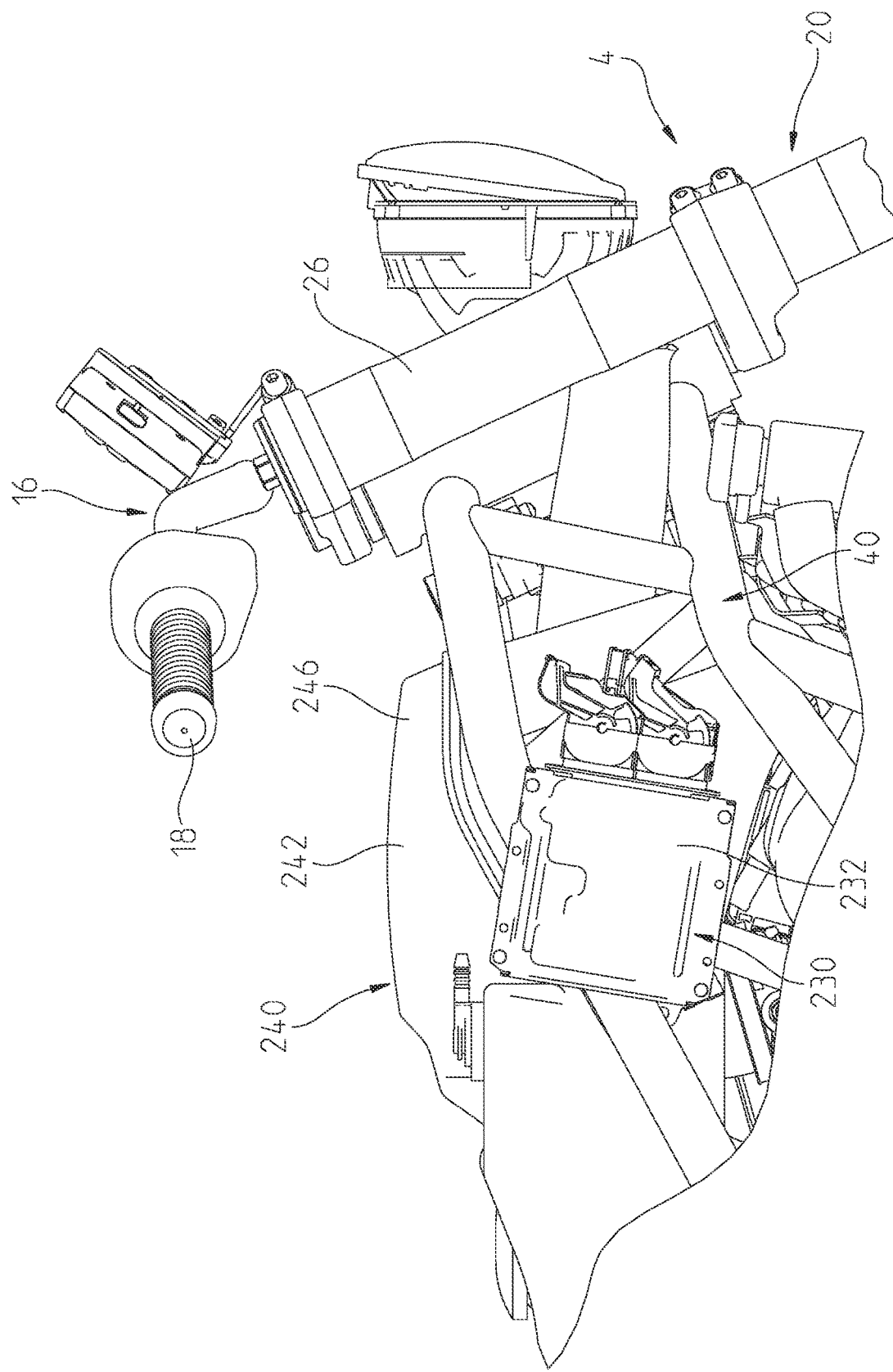
FIG. 29 is a right side view of a front portion of the vehicle supporting a portion of an electrical assembly of the vehicle of FIG. 1, illustratively supporting an engine control unit.

Referring to FIG. 29, vehicle 2 includes an electrical assembly 230 which may include various electrical components. In one embodiment, electrical assembly 230 includes an engine control unit ("ECU") 232 supported on a portion of frame assembly 40. More particularly, ECU 232 may be supported on a portion of upper longitudinally-extending member 46 of main frame 42 along a right side of vehicle 2, although other orientations and positions of ECU 232 are contemplated. Additionally, electrical assembly 230 may include an anti-lock brake system or assembly ("ABS") module 234 also supported on a portion of frame assembly 40, as shown in FIG. 14. As shown therein, ABS module 234 is positioned directly above a portion of swing arm 116 and rearward of rear end 82 of crankcase 60. ABS module 234 is operably coupled to brakes 298, 299 (FIG. 1) on front and/or rear wheels 8, 9, respectively, to facilitate braking in response to an operator input.

Figure 30:
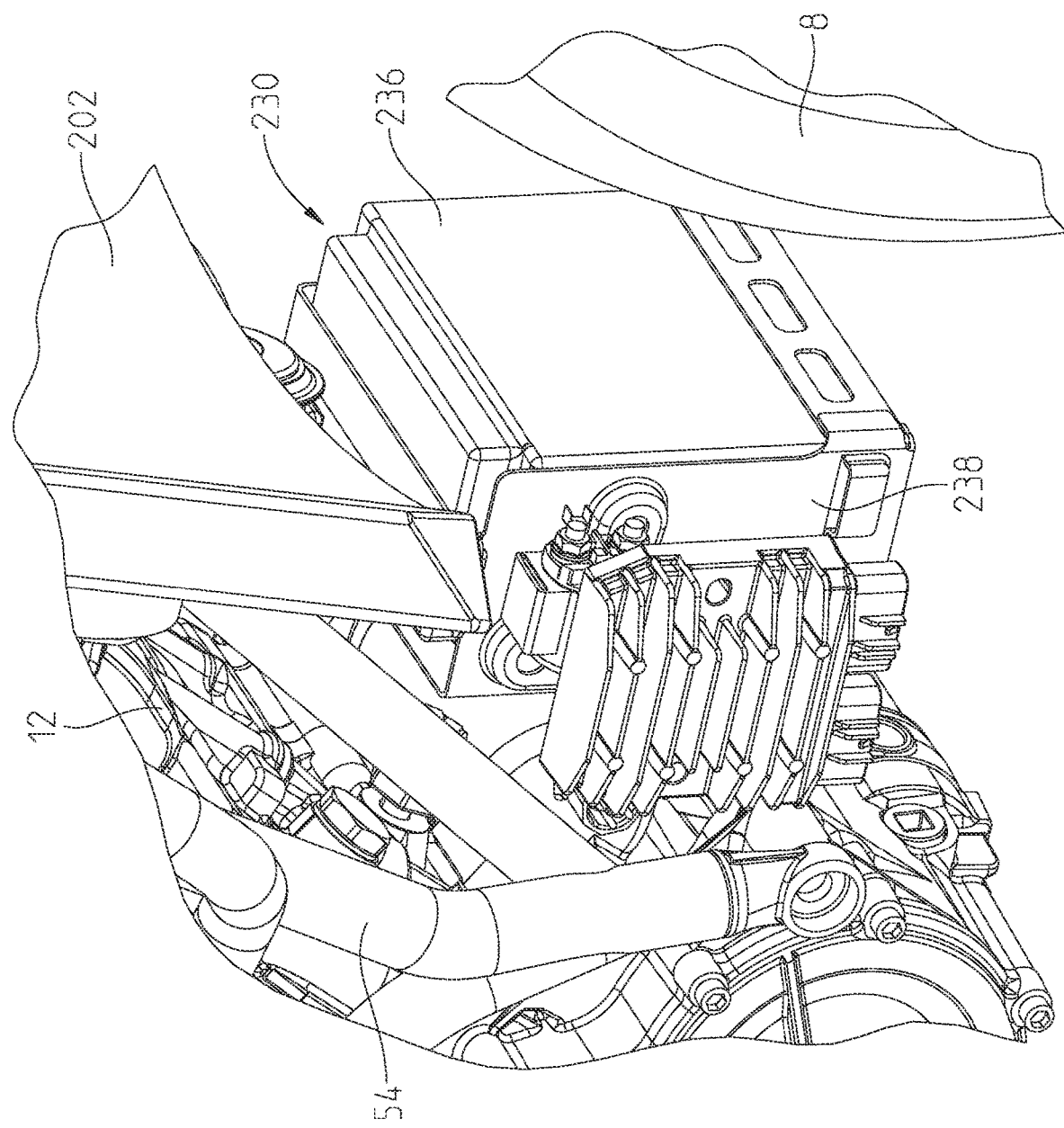
FIG. 30 is a front right perspective view of a battery compartment of the vehicle of FIG. 1.

As shown in FIG. 30, electrical assembly 230 also includes a battery 236 for vehicle 2 which is supported in a battery housing 238. Illustratively, battery 236 is positioned at a lower portion of vehicle 2 and, more particularly, is positioned rearward of front wheel 8 and below radiator 202. Battery 236 also is positioned within the profile of upstanding members 54 of main frame 42. By positioning battery 236 along a lower portion of vehicle 2, battery 236 contributes to lowering the center of gravity of vehicle 2.

Electrical assembly 230 and vehicle 2, in general, also may include various other components, features, and systems, as disclosed in U.S. Pat. No. 9,421,860, issued on Aug. 23, 2016, and entitled "TWO-WHEELED VEHICLE", the complete disclosure of which is expressly incorporated by reference herein. Additionally, other features and components of vehicle 2 may be disclosed in U.S. patent application Ser. No. 15/161,720, filed May 23, 2016, and entitled "DISPLAY SYSTEMS AND METHODS FOR A RECREATIONAL VEHICLE", the complete disclosure of which is expressly incorporated by reference herein.

Referring to FIGS. 31-36, vehicle 2 further includes an air intake assembly 240 positioned above battery 236 and laterally inward from ECU 232 of electrical assembly 230. Air intake assembly 240 includes an airbox 242 supported by main frame 42 and generally positioned between upper and lower longitudinally-extending members 46, 48 along longitudinal centerline L (FIG. 1). Air intake assembly 240 also includes intake tubes or conduits 244 which extend forwardly of airbox 242 toward triple clamp 26 (FIG. 1) and are configured to flow air from forward of vehicle 2 into airbox 242. Intake tubes 244 may be tapered and of a venturi-style to attenuate or decrease noise at airbox 242.

Airbox 242 includes an upper housing portion 246 which is pivotally or hingedly coupled to a lower housing portion 248. In this way, upper housing portion 246 may be opened or moved to expose the internal volume of airbox 242 for servicing or replacing components therein. For example, airbox 242 supports an internal filter 252 and upper housing portion 246 may be moved to access filter 252 for cleaning or replacing. Filter 252 is configured to filter particulate matter from the air flowing into airbox 242 through intake tubes 244 before the air flows into engine 12 through torque tubes 250. Torque tubes 250 flow filtered air within airbox 242 into the throttle bodies of engine 12 to provide combustion air to first and second cylinders 30, 32.

Referring still to FIGS. 31-36, vehicle 2 also includes a fuel tank 260 positioned rearwardly of airbox 242. Illustratively, fuel tank 260 is longitudinally spaced apart from steering assembly 16 by airbox 242. More particularly, gripping surfaces 18 of steering assembly 16 are positioned longitudinally forward of fuel tank 260 and are positioned directly vertically above a portion of airbox 242.

Fuel tank 260 is fluidly coupled to engine 12 and provides fuel that mixes with the combustion air from airbox 242 for operation of engine 12. In one embodiment, fuel tank 260 may be blow-molded from a polymeric material. Fuel tank 260 extends between a forward end 262 adjacent a rear portion of airbox 242 and a rearward end 264 positioned adjacent a rear portion of seat 28 (FIG. 3) along longitudinal centerline L (FIG. 1). In this way, the operator generally sits above fuel tank 260, rather than positioning fuel tank 260 forward of the operator. Fuel tank 260 also extends vertically between an upper surface 266 and a lower surface 268 and, illustratively, upper surface 266 of forward and rearward ends 262, 264 is positioned at a greater vertical distance from ground surface G (FIG. 3) than upper surface 266 at a center portion 270 of fuel tank 260. In this way, fuel tank 260 generally defines a semi-circular or "U" shape. In one embodiment, fuel tank 260 has a 13-L capacity.

Figure 36:
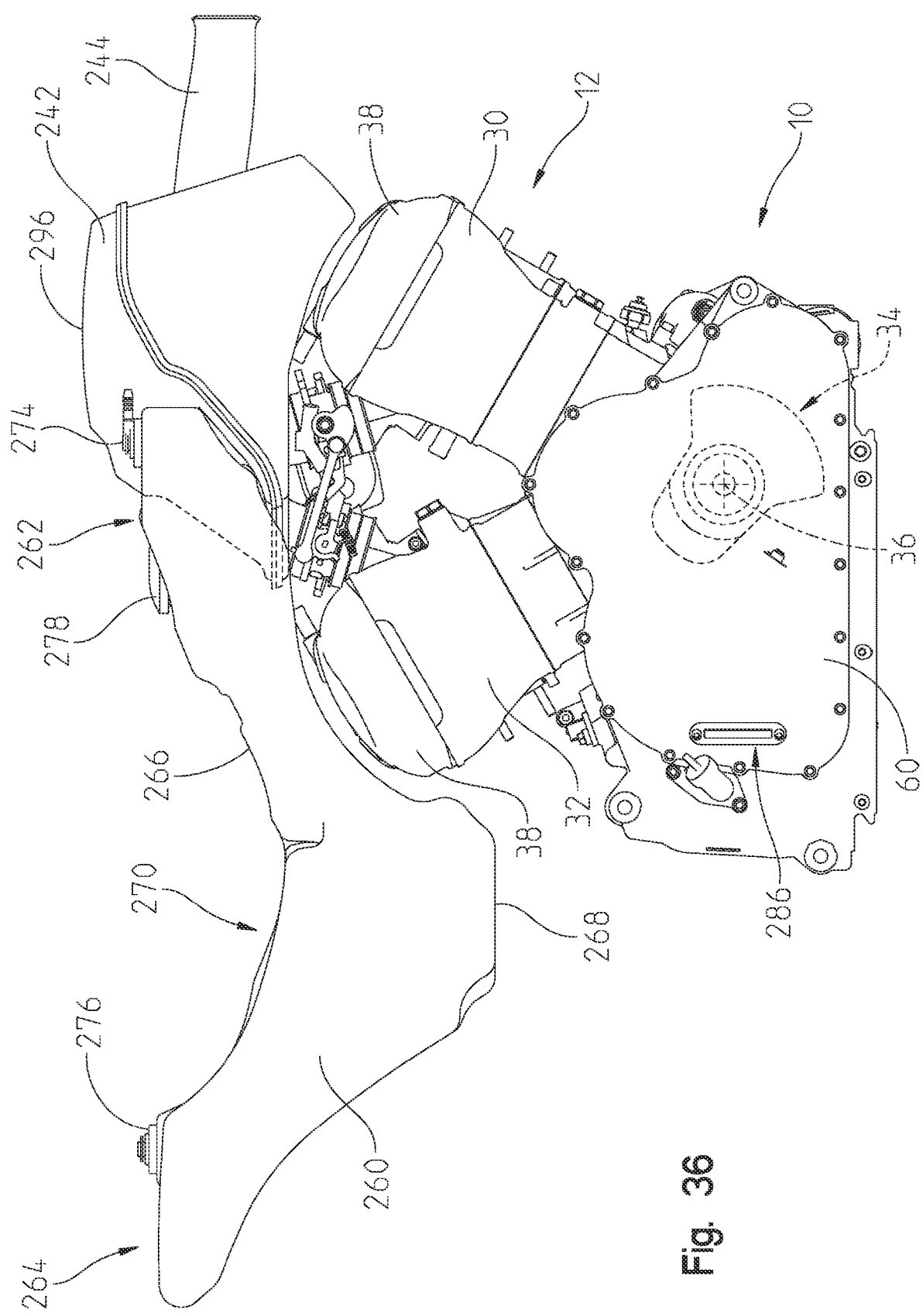
FIG. 36 is a right side view of the fuel tank, the air intake assembly, and the engine of the vehicle of FIG. 1.

Fuel tank 260 includes a fuel pump 272 positioned at center portion 270. Because fuel pump 272 is positioned at center portion 270 and, therefore, is positioned lower on vehicle 2 than forward and rearward ends 262, 264 of fuel tank 260, fuel tank 260 includes a first vent 274 at forward end 262 to vent air or vapor within fuel tank at forward end 262 and a second vent 276 at rearward end 264 to vent air or vapor that flows toward rearward end 264. Fuel tank 260 also includes a fill cap 278 positioned at forward end 262. By positioning fill cap 278 at forward end 262 of fuel tank 260, fill cap 278 is positioned forward of seat 28 (FIG. 3) for easy access for the operator to add fuel to fuel tank 260. However, in alternative embodiments, fuel fill cap 278 may be positioned at rearward end 264 of fuel tank 260 or any position longitudinally intermediate forward and rearward ends 262, 264. As shown in FIG. 36, fuel pump 272 is positioned lower on vehicle 2 than fill cap 278.

Fuel tank 260 is coupled to frame assembly 40 and, more particularly, is coupled to a frame member 280 which is coupled to intermediate frame portion 64 and is positioned above a portion of rear frame 44, as shown best in FIG. 3. Frame member 280 may be comprised of a metallic material, for example aluminum, and may be formed through a casting process. In one embodiment, frame member 280 may be comprised of multiple components coupled together or may be formed as a single component. Frame member 280 is configured to receive lower surface 268 of fuel tank at rear end 264 and generally extend upwardly toward upper surface 266. Because frame member 280 is formed through a casting process and does not define tubular frame members, frame member 280 does not interfere with the overall volume of fuel tank 260, thereby allowing fuel tank 260 to be as large as possible on vehicle 2. Additionally, the casting process allows frame member 280 to be formed into a shape compatible with fuel tank 260, thereby also preventing frame member 280 from interfering with the desired shape and size of fuel tank 260. Forward end 262 of fuel tank 260 is configured to extend forwardly from frame member 280. Brackets 282, 284 may configured to extend over a portion of upper surface 266 of fuel tank 260 and couple with frame member 280 and main frame 42 to secure fuel tank 260 to frame assembly 40.

Referring to FIGS. 3 and 36, fuel tank 260 is generally positioned below seat 28, however, forward end 262 of fuel tank 260 extends forwardly of seat 28 to allow access to fill cap 278. Additionally, forward end 262 of fuel tank 260 generally extends longitudinally forward of a rear end of airbox 242 such that forward end 262 longitudinally overlaps the rear end of airbox 242 at a position above crankshaft 34. As such, forward end 262 of fuel tank 260 is positioned directly vertically above crankshaft 34 and rotation axis 36. However, fuel tank 260 is positioned rearward of first cylinder 30 and only extends over second cylinder 32. As such, airbox 242 is able to singularly occupy the volume on vehicle 2 forward of fuel tank 260 and vertically above first cylinder 30. In this way, airbox 242 has sufficient internal volume to flow the quantity of air necessary for combustion into engine 12. And, because airbox 242 and fuel tank 260 are not both positioned at the forward position on vehicle 2 above first cylinder 30, the overall width of vehicle 2 may be reduced given that fuel tank 260 and airbox 242 are not laterally overlapped at such a position.

Additionally, fuel tank 260 has sufficient fuel for powertrain assembly 10 because the length of fuel tank 260 extends from a position above crankshaft 34 to the rear end of seat 28 and a position over a portion of rear wheel 9 (FIG. 3). Also, upper surface 266 of fuel tank 260 is positioned closer to ground surface G (FIG. 3) than an upper surface 296 of airbox 242 (FIG. 36) but lower surface 268 of fuel tank 260 extends to a position closer to ground surface G than cylinder heads 38 of engine 12. As such, the vertical volume of fuel tank 260, in combination with the longitudinal length of fuel tank 260, provides sufficient internal space for the fuel quantity needed for engine 12.

Referring still to FIGS. 3 and 36, a longitudinal length between front wheel rotational axis 290 and rear wheel rotational axis 292 defines the wheel base of vehicle 2 and a midpoint 294 of the wheel base defines a vertically-extending centerline V of vehicle 2. Midpoint 294 and vertically-extending centerline V are equidistant between front wheel rotational axis 290 and rear wheel rotational axis 292. Vertically-extending centerline V perpendicularly intersects longitudinally-extending centerline L. In order to provide vehicle 2 with an overall smaller configuration than conventional touring or cruiser-style motorcycles, the configuration and positioning of fuel tank 260, airbox 242, seat 28, frame assembly 40, powertrain assembly 10, and electrical assembly 230 may be defined relative to midpoint 294 and/or vertically-extending centerline V. For example, the forward portion of fuel tank 260, including forward end 262, is generally aligned and intersected with vertically-extending centerline V while airbox 242 and battery 236 are both positioned forward of vertically-extending centerline V. Illustratively, battery 236 is positioned vertically below airbox 242 and is positioned lower on vehicle 2 than lower surface 268 of fuel tank 260. Battery 236 also is positioned forward of fuel tank 260. Additionally, ABS module 234 (FIG. 14) is positioned rearward of vertically-extending centerline V and below lower surface 268 of fuel tank 260 at a positioned longitudinally intermediate forward and rearward ends 262, 264 of fuel tank 260. As is also shown, fill cap 278 of fuel tank 260 is generally intersected by vertically-extending centerline V. With this overall configuration of vehicle 2, additional space is provided on vehicle 2 for the size of airbox 242 and fuel tank 260 because electrical components, such as battery 236, and other components of vehicle 2 are positioned away from airbox 242 and fuel tank 260. Additionally, the overall size of vehicle 2, including the lateral width between the right and left sides of vehicle 2, may be decreased by positioning fuel tank 260 generally rearward of airbox 242 and coupling various components of electrical assembly 230 at different locations on vehicle 2.

Figure 37:
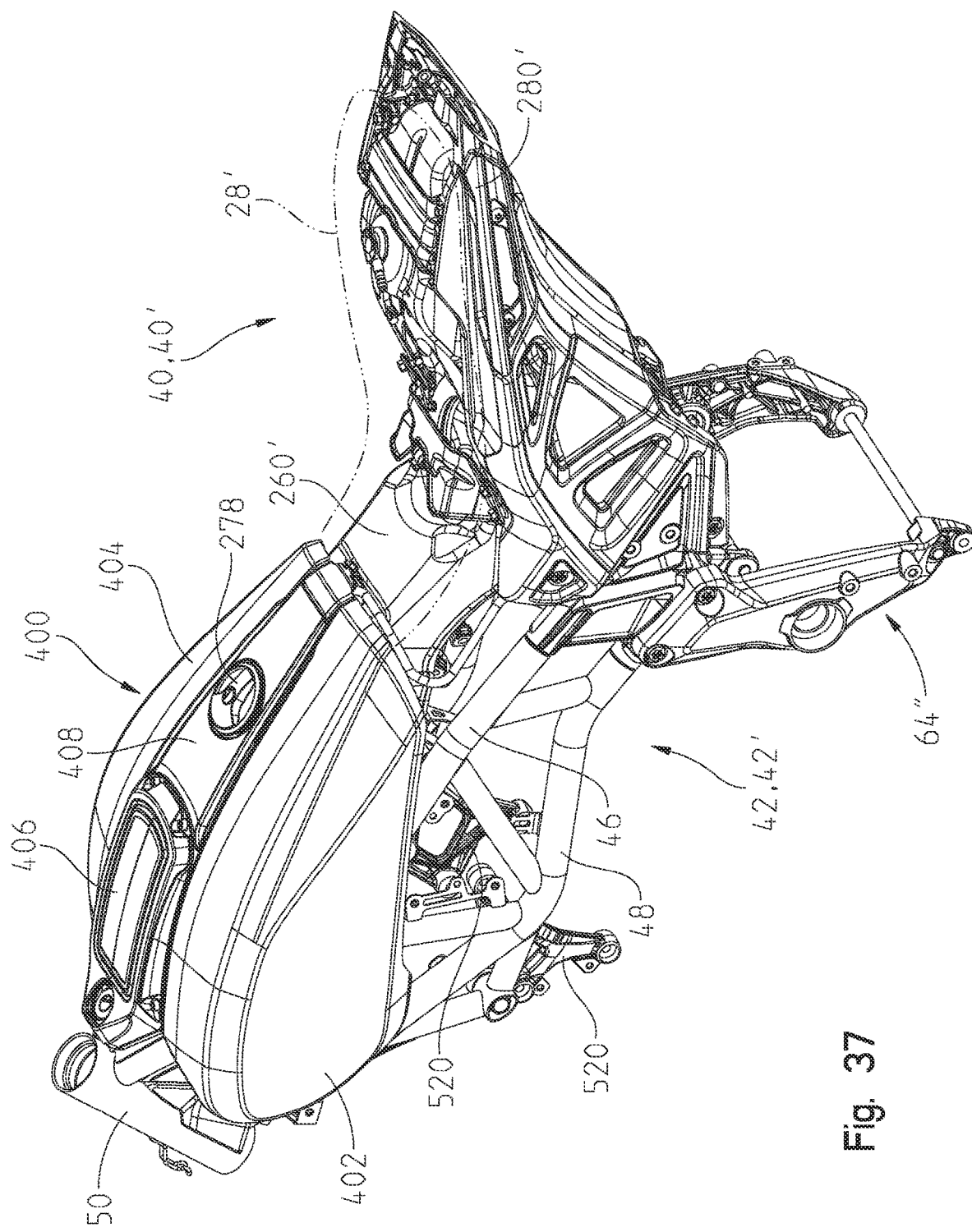
FIG. 37 is a rear left perspective view of a plurality of body panels supported on the frame assembly.
Figure 38:
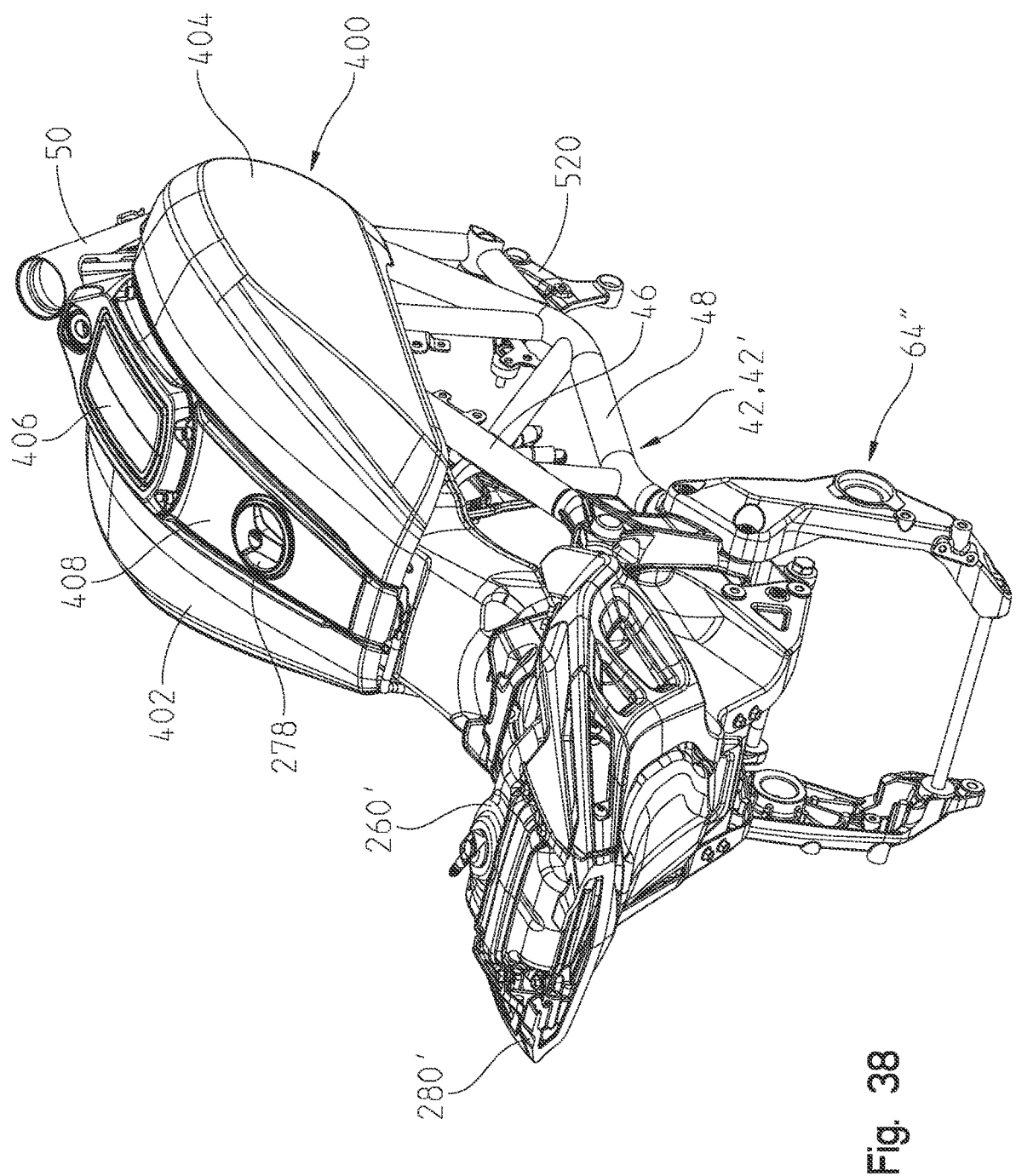
FIG. 38 is a rear right perspective view of the plurality of body panels of FIG. 37.
Figure 39:
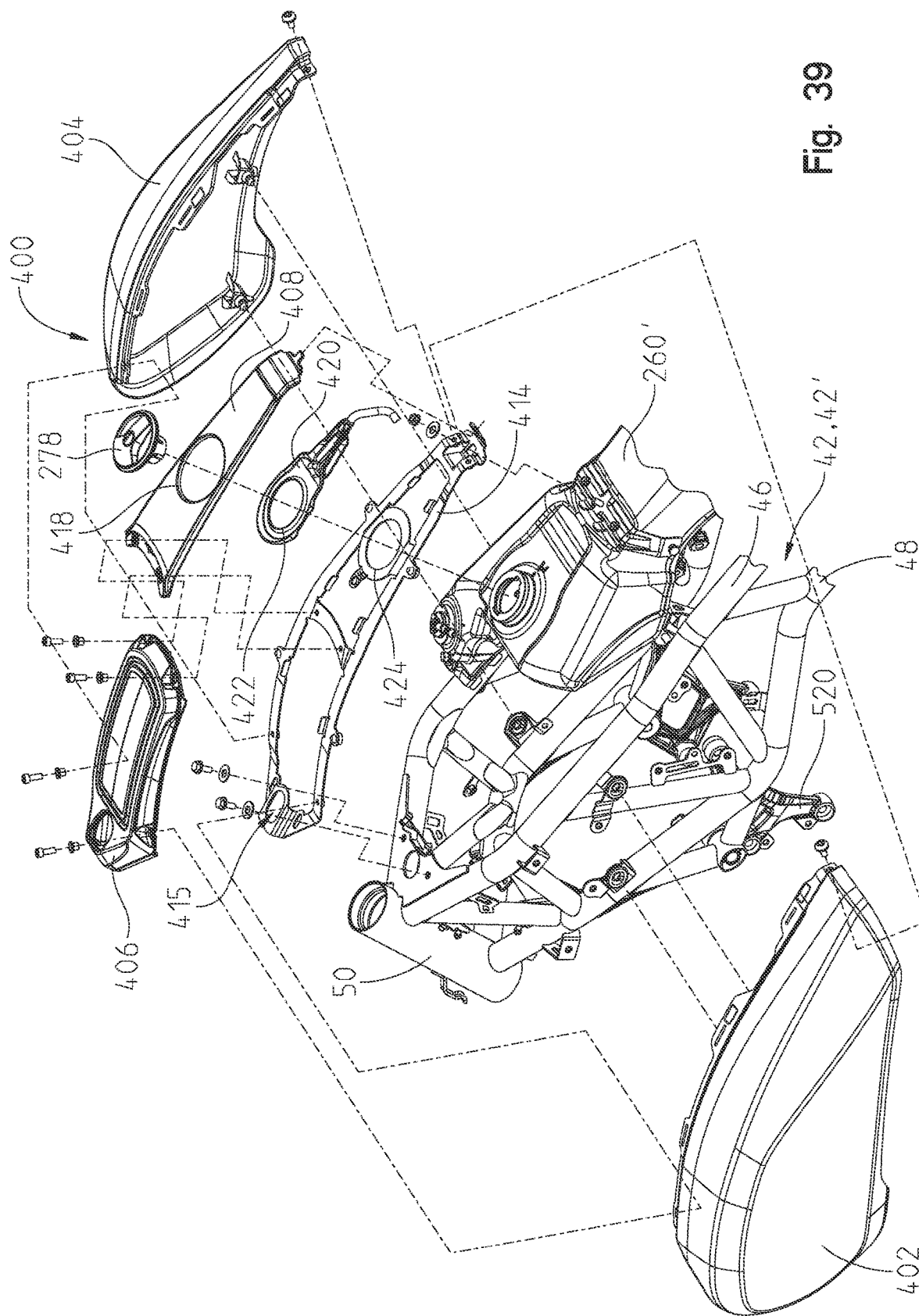
FIG. 39 is an exploded view of the plurality of body panels of FIG. 37.
Figure 40:
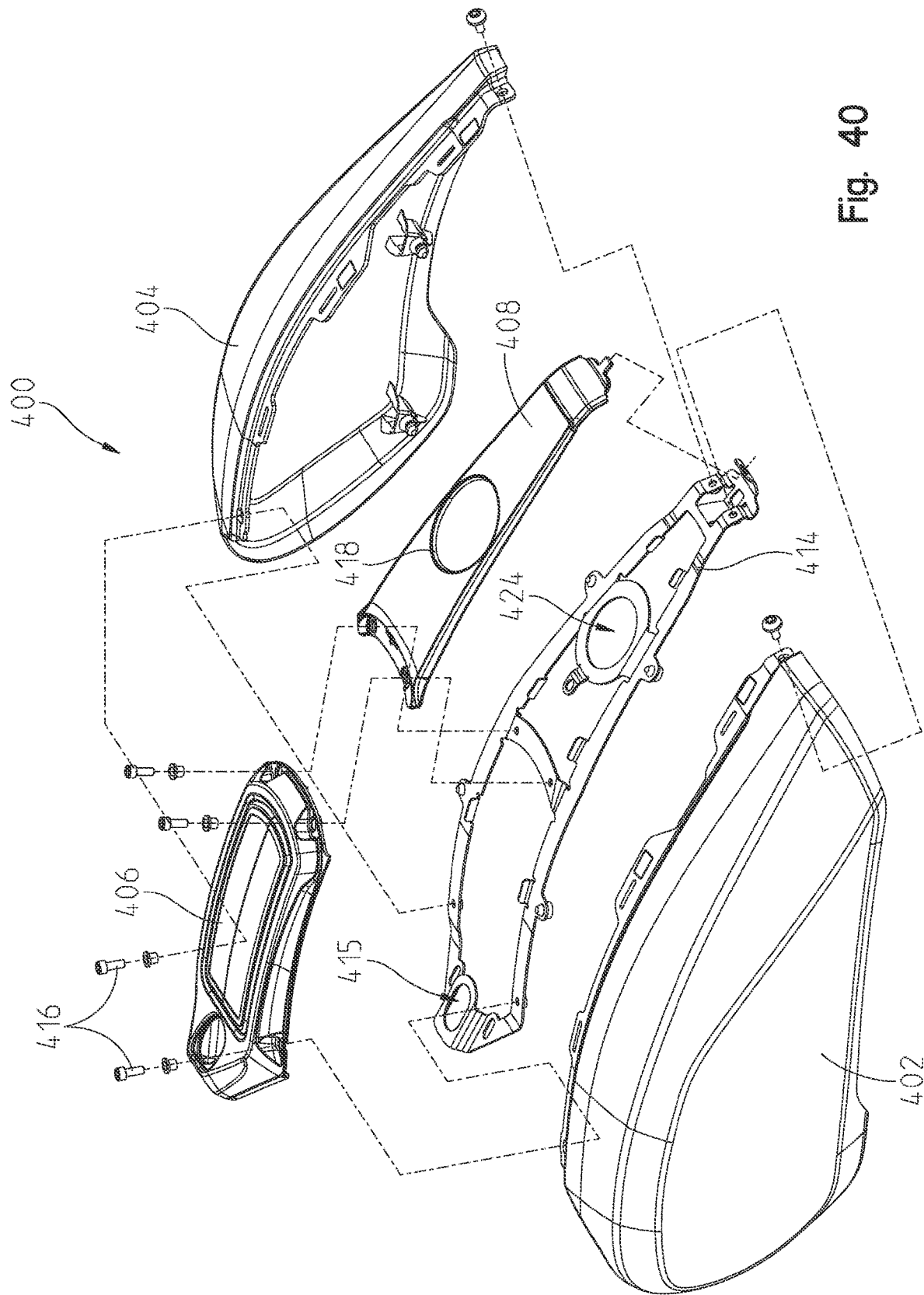
FIG. 40 is a further exploded view of the plurality of body panels of FIG. 39.

Referring now to FIGS. 37-42, frame assembly 40, 40' may be configured to support a plurality of body panels 400 for vehicle 2. Body panels 400 may be comprised of a polymeric and/or metallic material and, illustratively, at least a portion of body panels 400 are supported on main frame 42, 42' at a position adjacent head tube 50. In one embodiment, body panels 400 include at least a first body panel 402, a second body panel 404, a third body panel 406, and a fourth body panel 408. First and second body panels 402, 404 define laterally outer body panels which extend outwardly from main frame 42, 42' and, illustratively, are supported on at least upper longitudinally-extending members 46. As shown in FIGS. 37 and 38, first and second body panels 402, 404 may extend from a position rearward of head tube 50 to a position approximately adjacent a forward portion of a seat 28' of vehicle 2.

Figure 31:
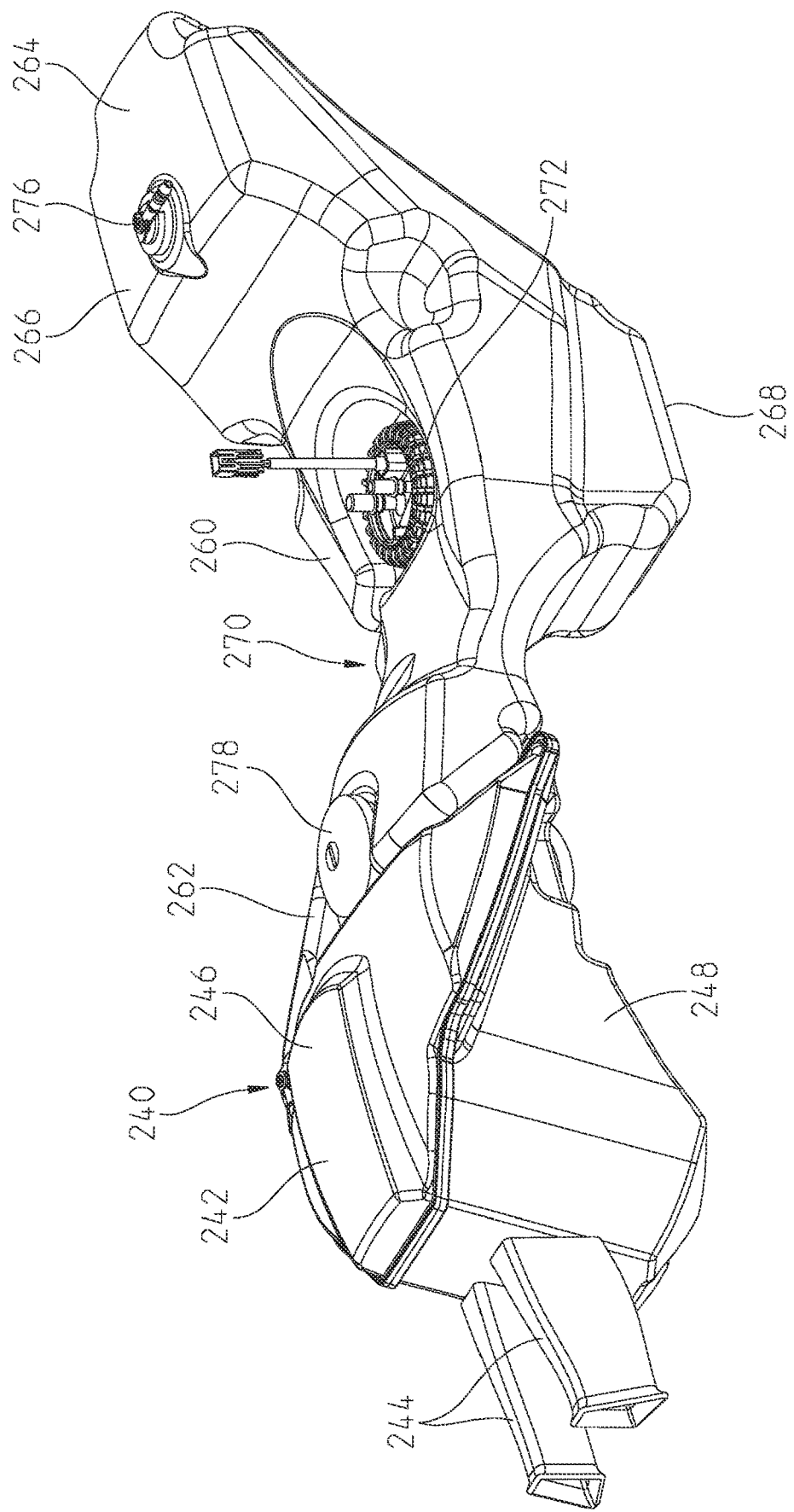
FIG. 31 is an exploded view of a fuel tank and an air intake assembly of the vehicle of FIG. 1.

As shown in FIGS. 37-42, third and fourth body panels 406, 408 are configured to be positioned generally intermediate first and second body panels 402, 404 and extend along longitudinal centerline L. In one embodiment, third and fourth body panels 406, 408 define upper or outer cover members for supporting and/or concealing various other components of vehicle 2. More particularly, third body panel 406 is configured to extend upwardly from first and second body panels 402, 404 and is configured to conceal at least a portion of an air filter assembly 412 (FIG. 41), which may be fluidly coupled to airbox 242 or is a component of airbox 242 of air intake assembly 240 (FIG. 31). A brace 414 may be provided, as shown best in FIG. 41, to couple body panels 400 to main frame 42, 42' generally around air filter assembly 412. Illustratively, air filter assembly 412 is configured to extend upwardly and into third body panel 406 while being retained laterally intermediate upper longitudinally-extending members 46. Brace 414 may be coupled to third body panel 406, upper longitudinally-extending members 46, and/or first and second body panels 402, 404 with fasteners 416.

Referring still to FIGS. 37-42, fourth body panel 408 may be configured as an upper or outer cover member for fuel fill cap 278. Illustratively, fourth body panel 408 may be positioned longitudinally intermediate third body panel 406 and a forward portion of seat 28' (FIG. 37). Fourth body panel 408 is positioned over brace 414 and includes an opening 418 configured to correspond to fuel fill cap 278. Additionally, a fuel component 420, such as a catch member for any spilled fuel, may be positioned below a portion of fourth body panel 408 and have an opening 422 also configured to align with opening 418 and fuel fill cap 278. Fuel component 420 is positioned vertically intermediate brace 414 and fourth body panel 408 and opening 422 thereof is aligned with opening 418 of fourth body panel 408 and an opening 424 of brace 414. Fuel fill cap 278 is configured to be supported on fourth body panel 408 and at least a portion of fuel fill cap 278 extends through openings 418, 422, 424 in order to couple with a portion of an alternative fuel tank 260' for vehicle 2 (FIG. 1).

Figure 41:
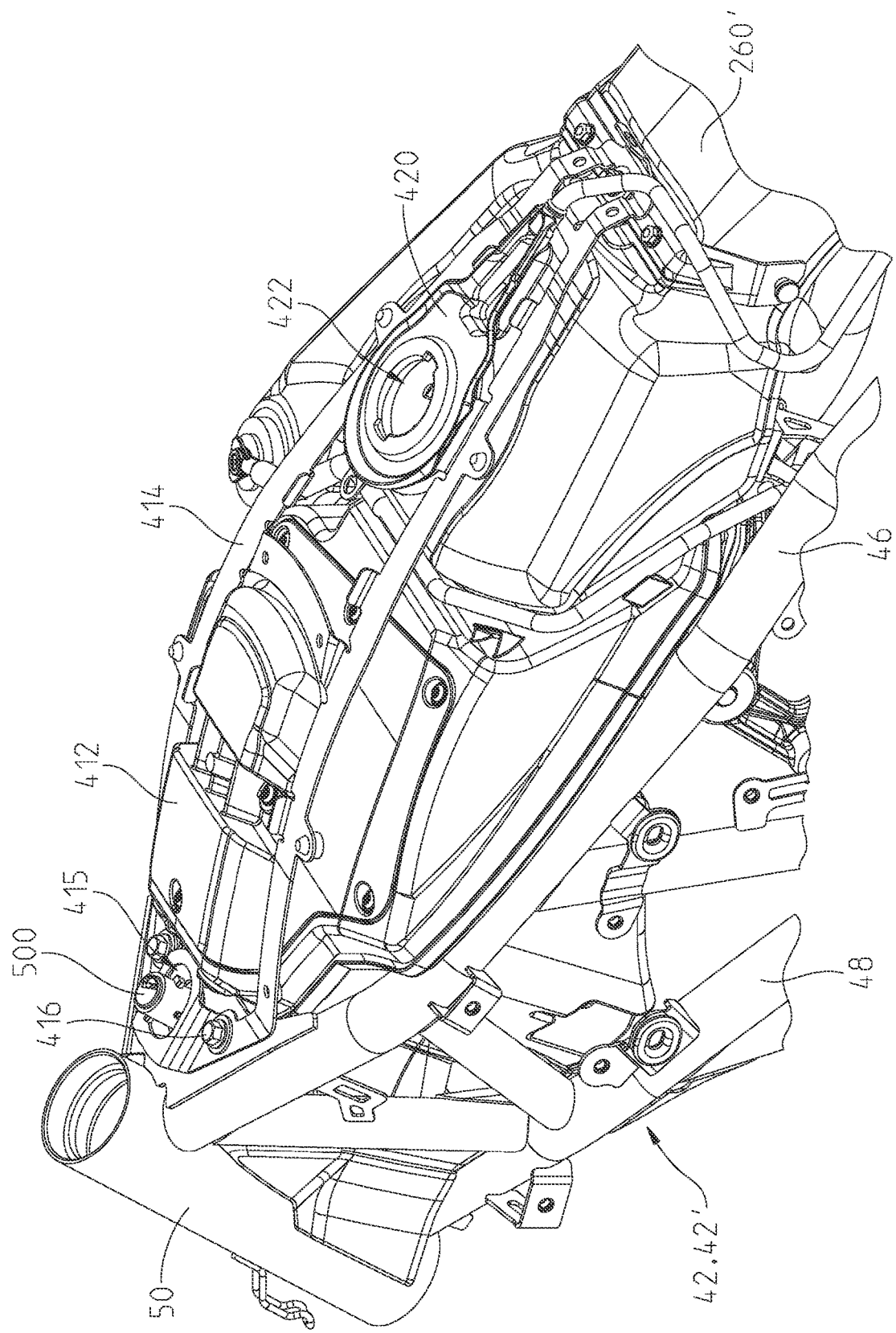
FIG. 41 is a left perspective view of a portion of the plurality of body panels of FIG. 39.
Figure 42:
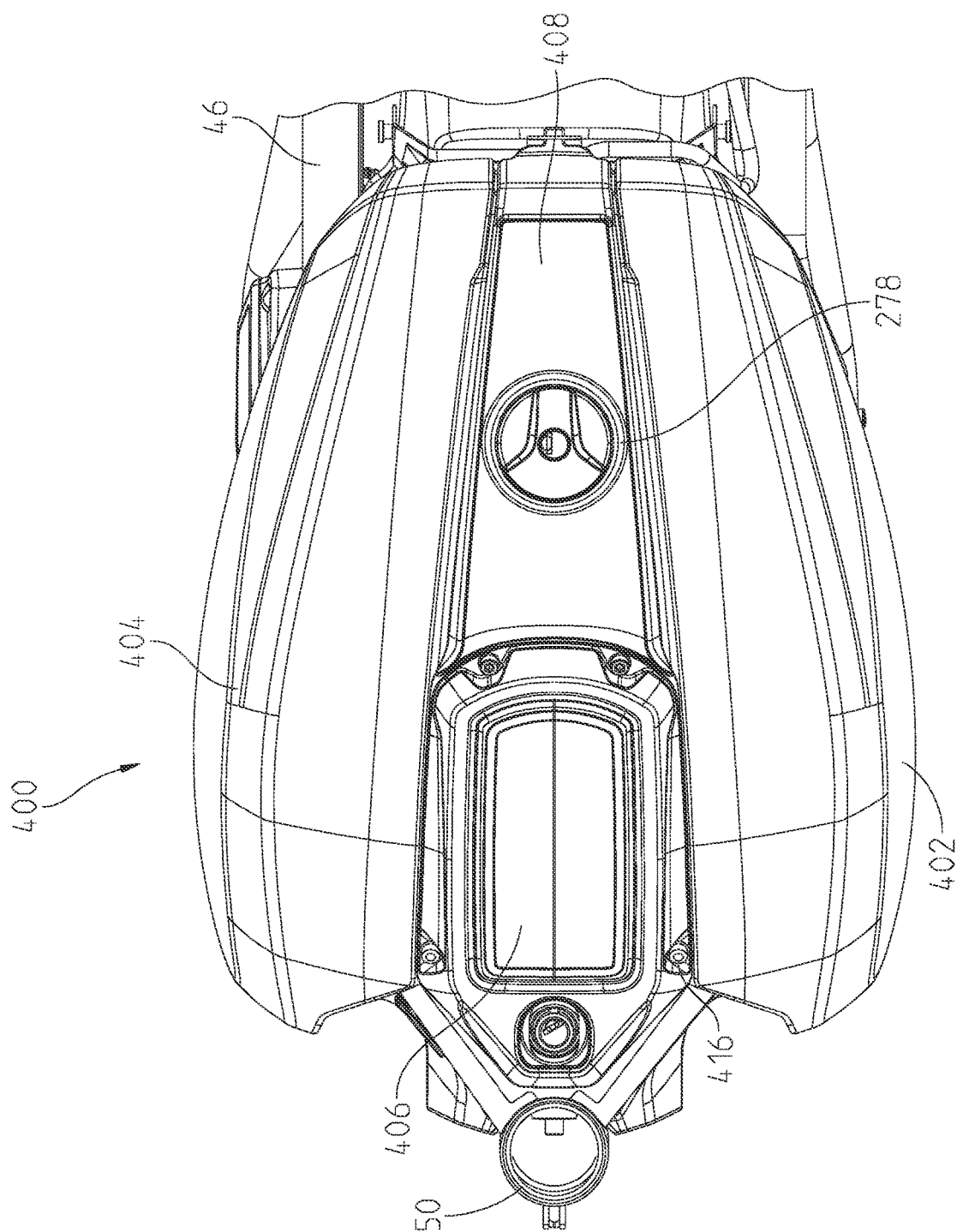
FIG. 42 is a top view of the plurality of body panels of FIG. 37.

The combination of fuel component 420, brace 414, and brace 414 allows for tolerances in the location of fuel fill cap 278. In particular, because fuel tank 260' may be a blow molded component, a small variation of approximately 4-5 mm may position or appear to position fuel fill cap 278 off center and not aligned with longitudinal centerline L (FIG. 1). As such, brace 414 minimizes any gaps between opening 418 of fourth body panel 408 and fuel fill cap 278 to maintain alignment of fuel fill cap 278 along longitudinal centerline L. Additionally, brace 414 is configured with an opening 415 positioned around a location 500 for an ignition of vehicle 2, as shown in FIG. 41, which allows brace 414 to pivot about location 500 for the ignition for proper coupling and alignment of body panels 400. And, opening 424 helps to align fuel fill cap 278 along longitudinal centerline L while other portions of intermediate brace 414 are configured to align and support various body panels 400. If various portions of body panels 400 are changed by the user, brace 414 allows new panels to continue to be centered about fuel fill cap 278 and along longitudinal centerline L. In this way, if the body panels are moved forwardly or rearwardly, fuel fill cap 278 is configured to move with the body panels.

Figure 32:
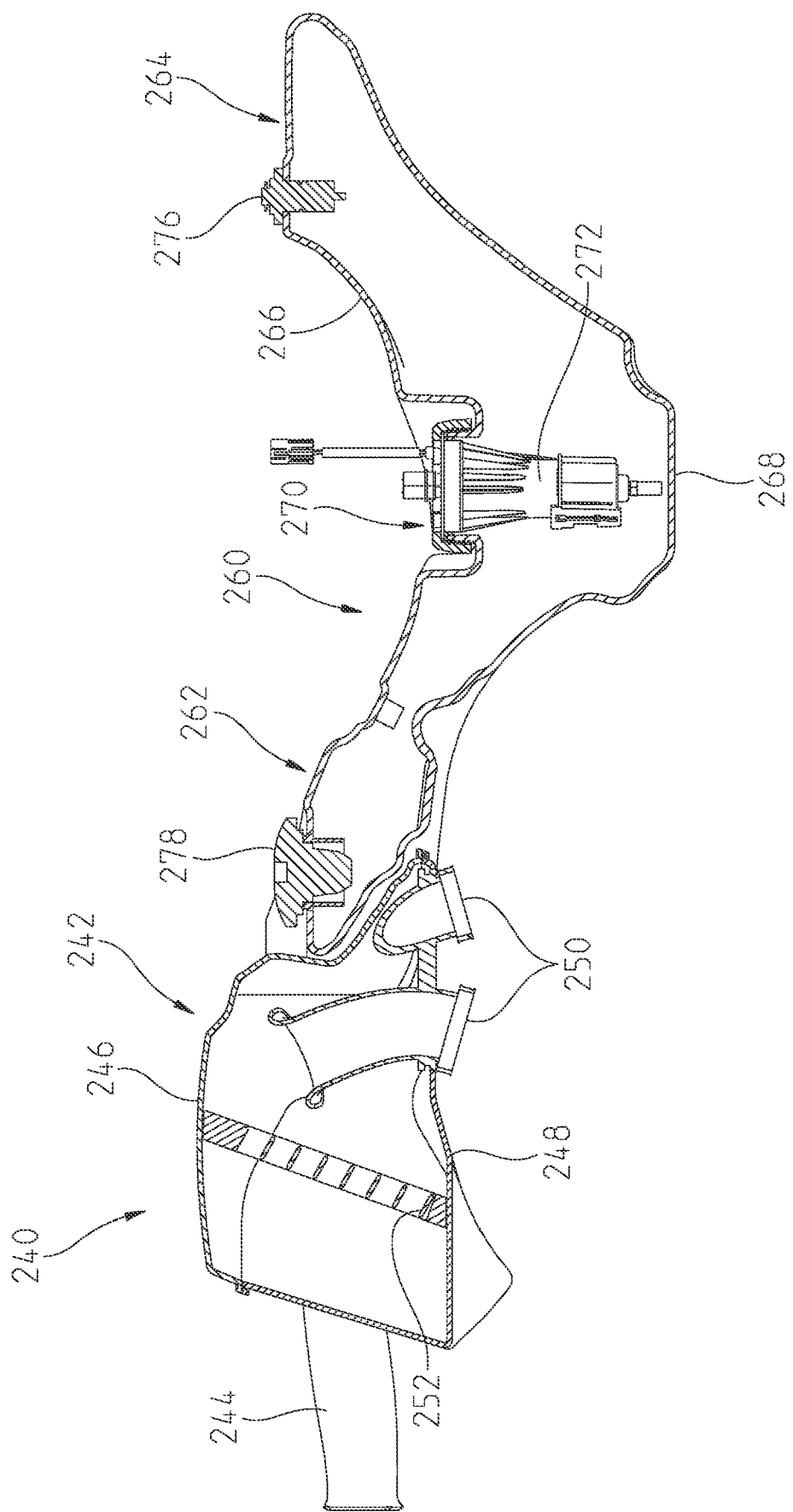
FIG. 32 is a cross-sectional view of the air intake assembly and fuel tank of FIG. 31.
Figure 33:
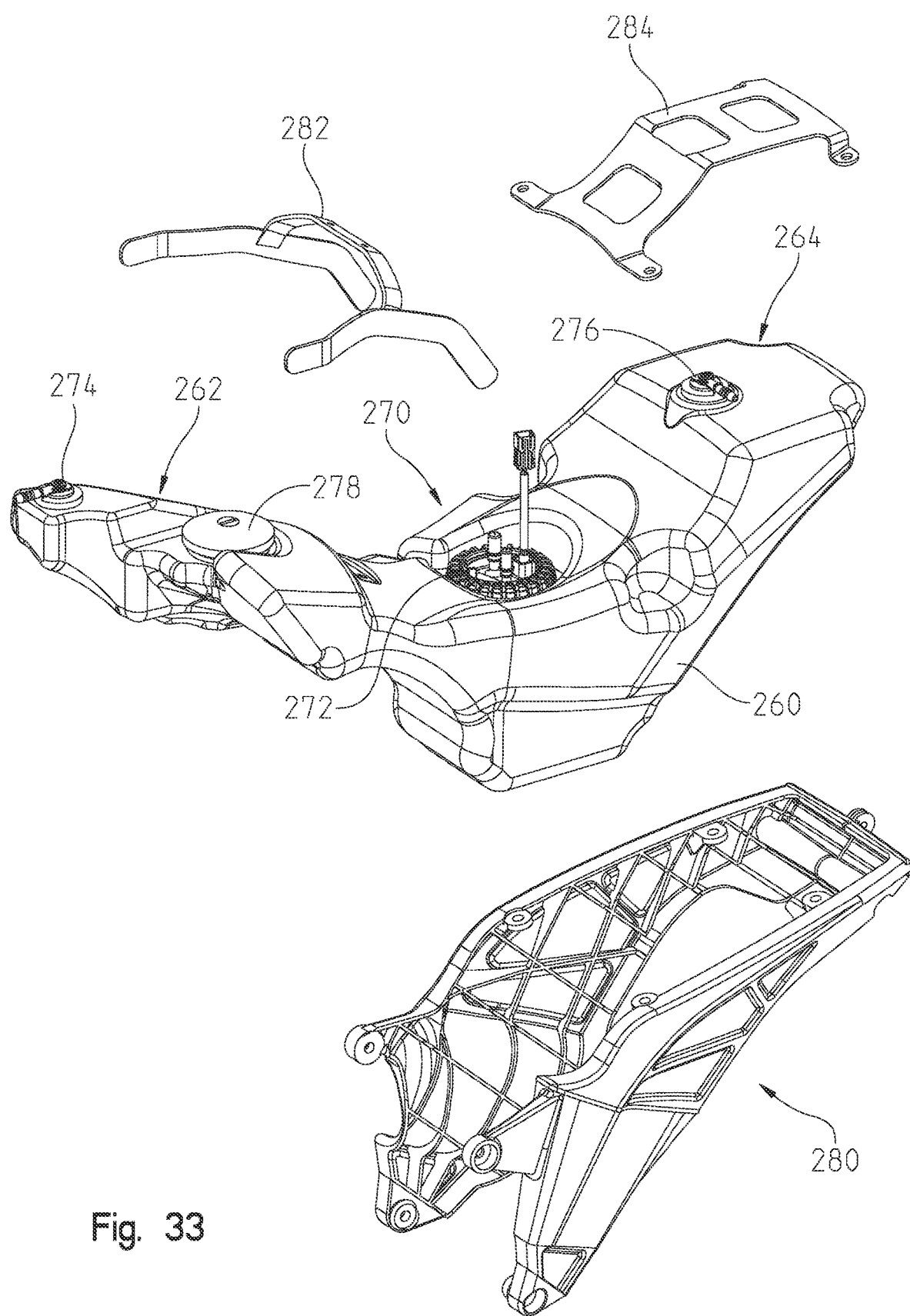
FIG. 33 is a front exploded view the fuel tank of FIG. 31 and a portion of the frame assembly.
Figure 34:
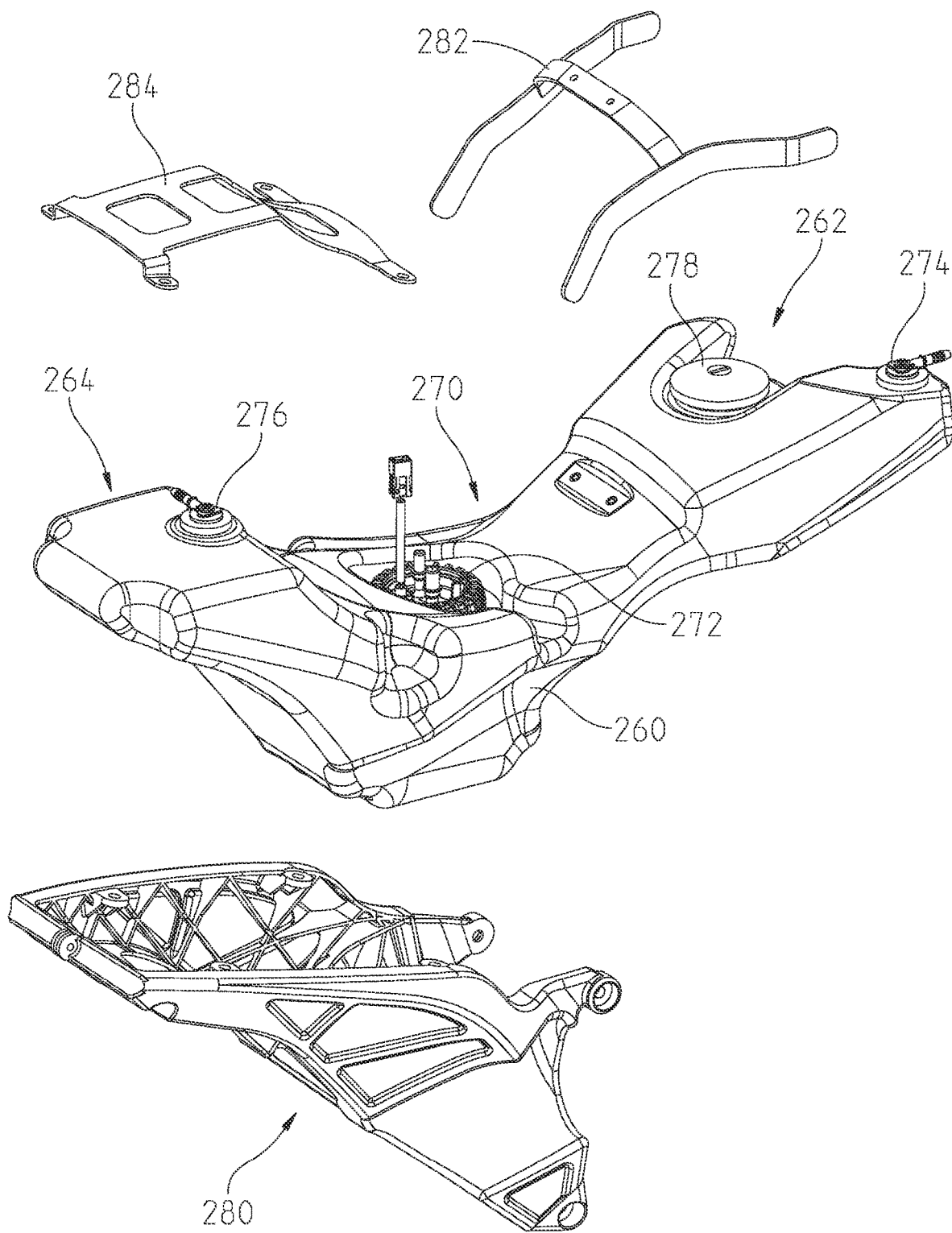
FIG. 34 is a rear exploded view of the fuel tank and the portion of the frame assembly of FIG. 33.
Figure 35:
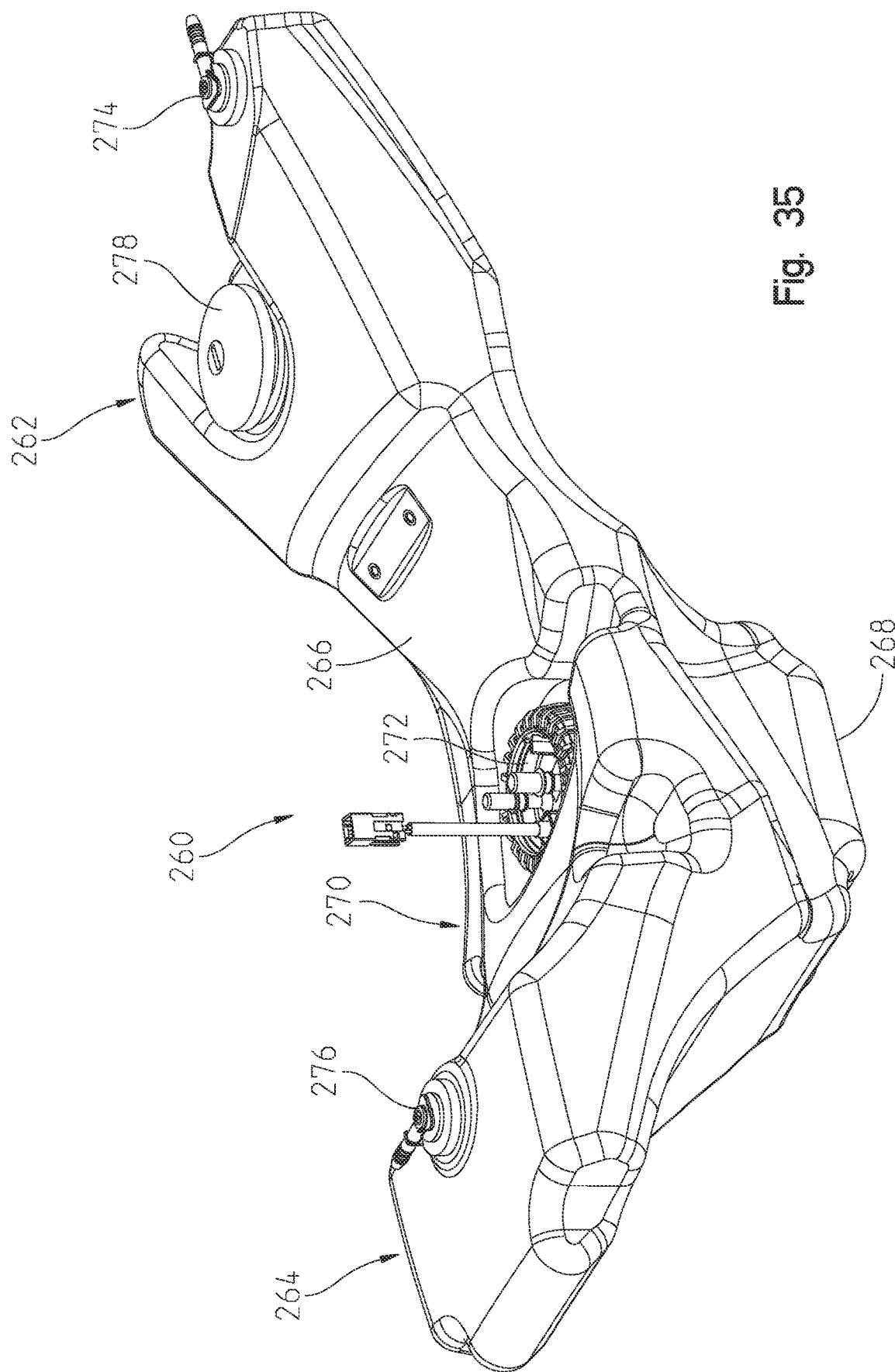
FIG. 35 is a rear right perspective view of the fuel tank of FIG. 31.
Figure 43:
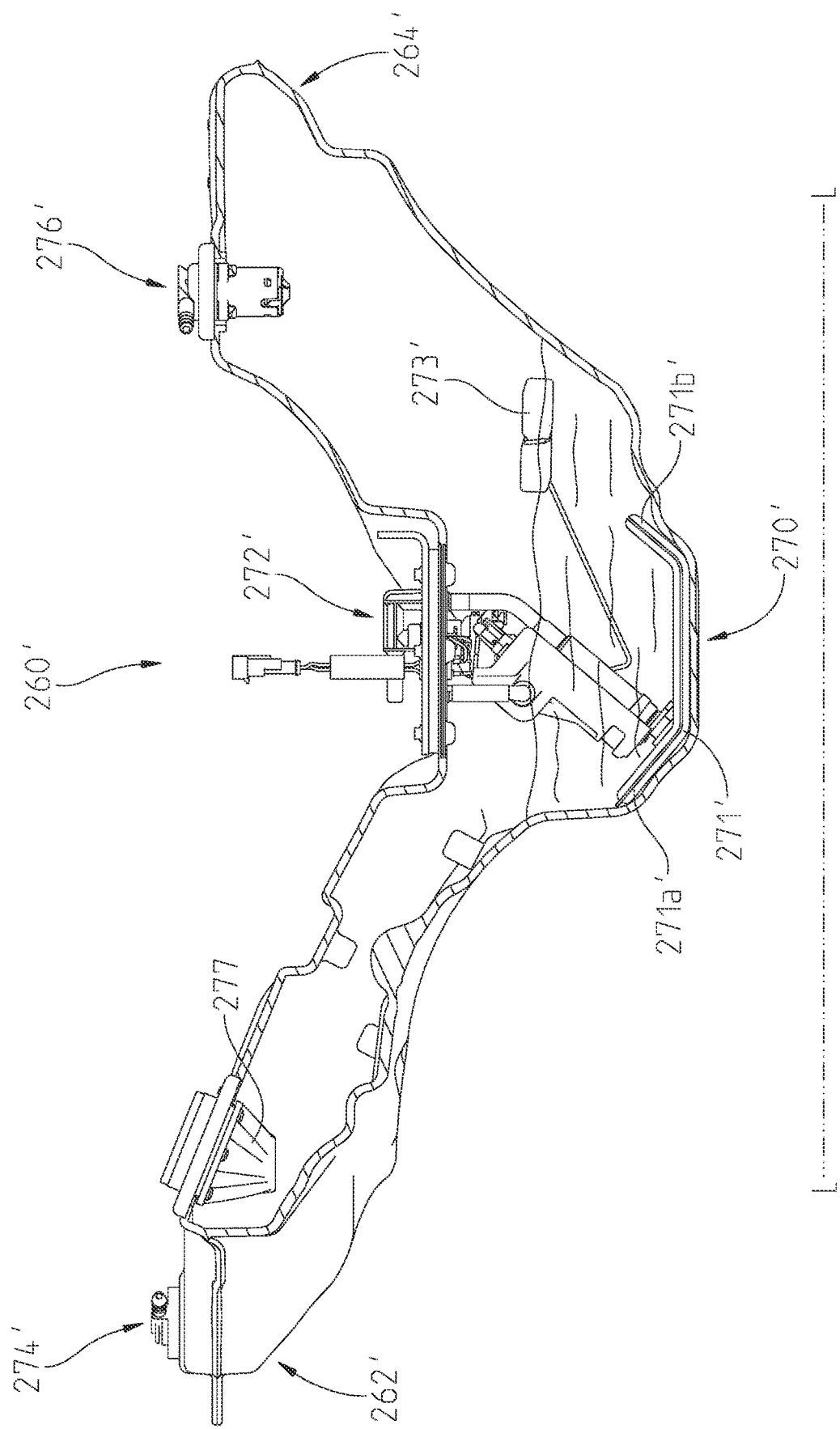
FIG. 43 is a cross-sectional view of an alternative embodiment fuel tank of the vehicle of FIG. 1.
Figure 44:
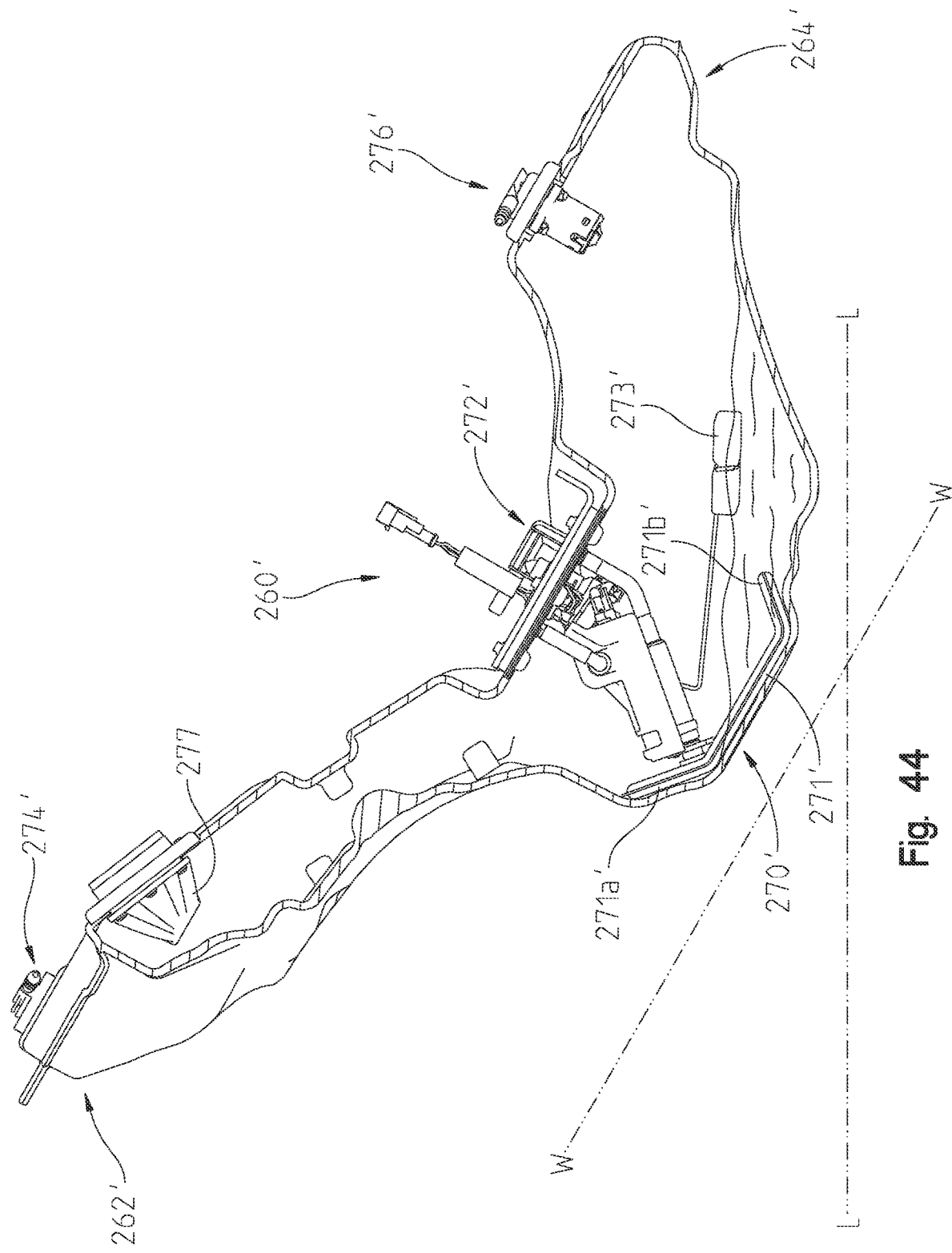
FIG. 44 is another cross-sectional view of the fuel tank of FIG. 43 when the vehicle is a wheelie scenario.

Referring now to FIGS. 43 and 44, fuel tank 260' is an alternative embodiment of fuel tank 260 of FIG. 32. Fuel tank 260' extends along longitudinal centerline L of vehicle 2 (FIG. 1) and may be at least partially concealed by body panels 400, seat 28', and/or any other component of vehicle 2. In this way, the operator generally sits above fuel tank 260', rather than positioning fuel tank 260' forward of the operator. In one embodiment, fuel tank 260' is positioned rearwardly of air filter assembly 412. As with fuel tank 260 of FIG. 32, fuel tank 260' generally defines a semi-circular or "U" shape.

Fuel tank 260' includes a fuel pump 272' positioned at a center portion 270'. Because fuel pump 272' is positioned at center portion 270' and, therefore, is positioned lower on vehicle 2 than forward and rearward ends 262', 264' of fuel tank 260', fuel tank 260' includes a first vent or valve 274' at forward end 262' to vent air or vapor within fuel tank at forward end 262' and a second vent or breather member 276' at rearward end 264' to vent air or vapor that flows toward rearward end 264'. In this way, vents 274', 276' are configured to allow fuel vapor to vent when fuel tank 260' is being filled with liquid fuel but, also, the raised locations of vents 274', 276' at forward and rearward ends 262', 264' decreases the likelihood of fuel leaking from fuel tank 260' in the event of a roll-over situation. More particularly, a spring mechanism within vents 274', 276' closes or otherwise shuts off when a lean angle of vehicle 2 exceeds a predetermined value.

Fuel tank 260' also includes a fill tube 277' configured to receive fuel fill cap 278 positioned at forward end 262'. By positioning fill cap 278 at forward end 262' of fuel tank 260', fill cap 278 is positioned forward of seat 28' (FIG. 37) for easy access for the operator to add fuel to fuel tank 260'. However, in alternative embodiments, fuel fill cap 278 may be positioned at rearward end 264' of fuel tank 260' or at any position longitudinally intermediate forward and rearward ends 262', 264'.

As shown best in FIG. 44, fuel pump 272' is angled relative to a vertical axis which perpendicularly intersects longitudinal centerline L (FIG. 1). The angled configuration of fuel pump 272' allows fuel pump 272' to be positioned at a desired location/orientation on vehicle 2 while still allowing for the necessary clearances and packaging space for other vehicle components. A fuel pick-up 271' is positioned along the lowermost surface of fuel tank 260' and is configured with a forward angled portion 271a' and a rearward angled portion 271b'. Additionally, with this configuration of angling fuel pump 272' and portions of fuel pick-up 271', fuel tank 260' also includes a fuel float 273' extends rearwardly therefrom and may be elevated within fuel tank 260' relative to a lower extent of fuel pump 272'. The configuration of fuel pump 272', fuel pick-up 271', fuel float 273', and the shape of fuel tank 260' allow fuel to continue to flow to engine 12 (FIG. 1) even if vehicle 2 is in a wheelie scenario. More particularly, as vehicle 2 is angled upwardly along a line W-W, which is angled relative to longitudinal centerline L and the vertical axis perpendicularly intersecting longitudinal centerline L, for example when vehicle 2 is in a wheelie scenario, at least rearward angled portion 271b' of fuel pick-up 271' and fuel float 273' are oriented to receive fuel that flows rearwardly within fuel tank 260'. In this way, the fuel system of FIGS. 43 and 44 is configured to allow fuel to flow into fuel pump 272' during a wheelie scenario, thereby allowing engine performance and vehicle stability to be maintained in such situations.

Figure 45:
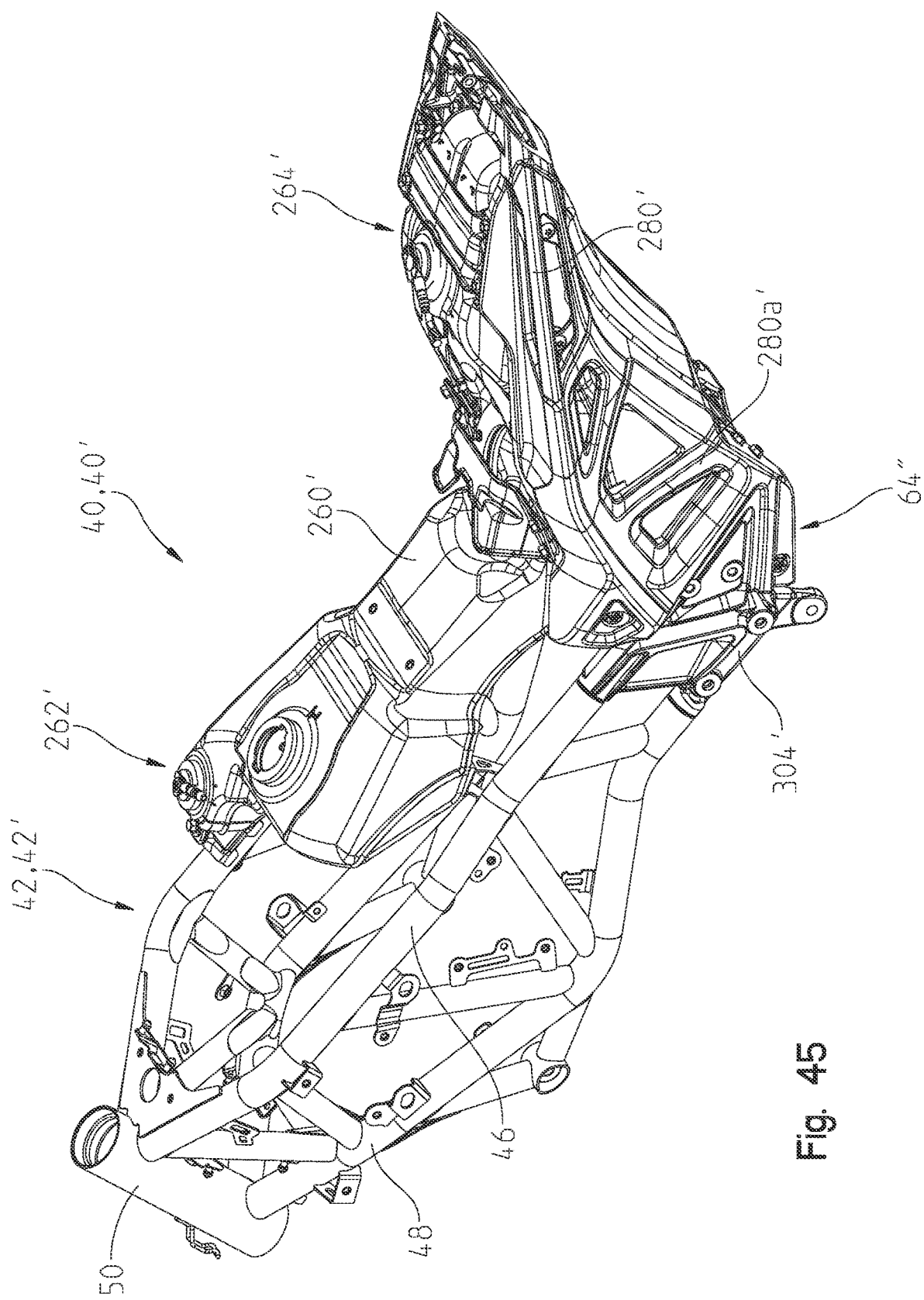
FIG. 45 is a rear left perspective view of the fuel tank supported on the frame assembly of FIG. 37 and the frame assembly includes a rear frame assembly.
Figure 46:
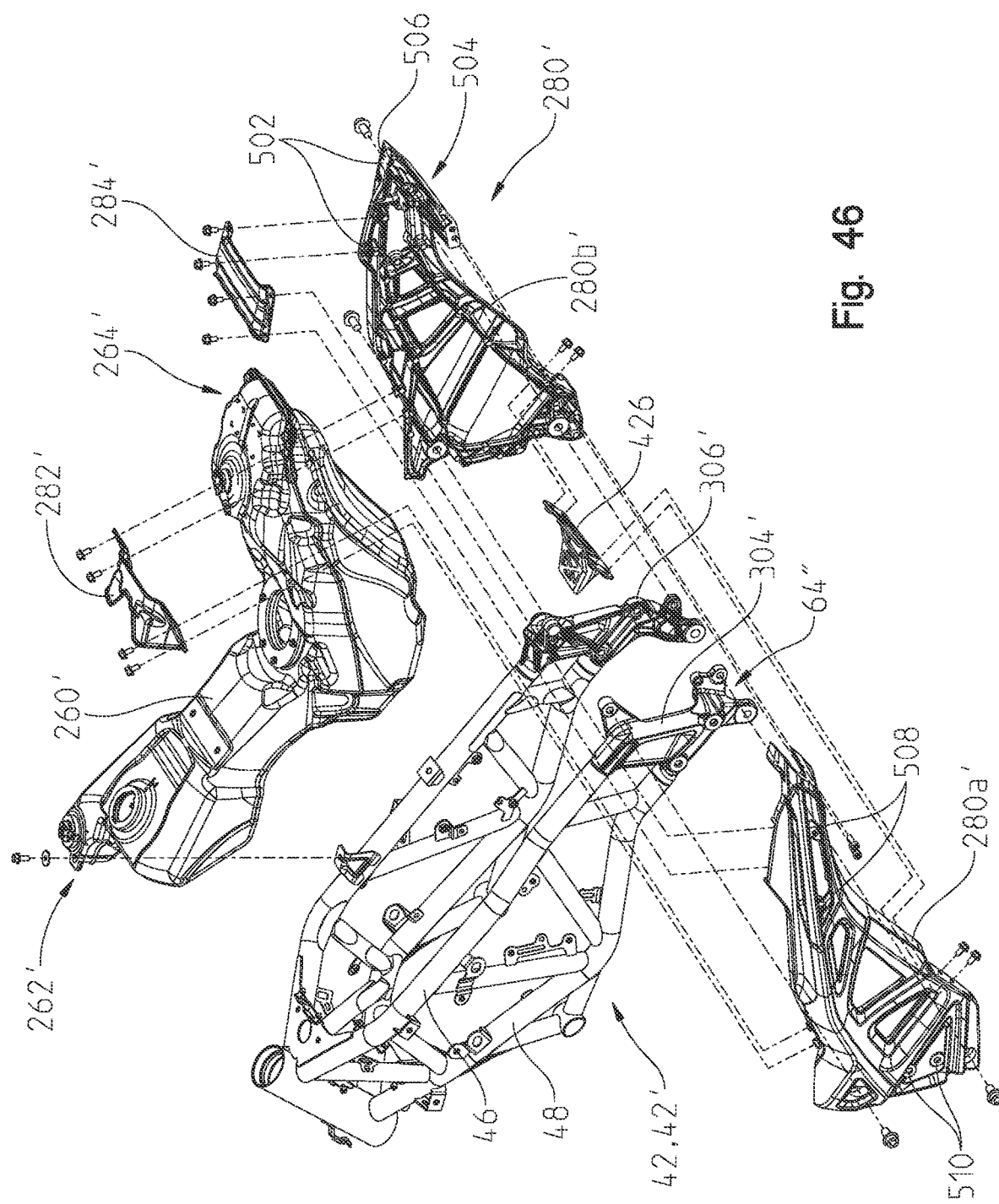
FIG. 46 is an exploded view of the frame assembly and the fuel tank of FIG. 45.

Referring to FIGS. 45 and 46, fuel tank 260' is coupled to frame assembly 40, 40' and, more particularly, is coupled to a frame member 280' which is coupled to an intermediate frame portion 64' and is positioned above a portion of rear frame 44', as shown best in FIGS. 45 and 46. Frame member 280' may be comprised of a metallic material, for example aluminum, and may be formed through a casting process. In one embodiment, frame member 280' may be comprised of multiple components coupled together or may be formed as a single component. Because frame member 280' is formed through a casting process and does not define tubular frame members, frame member 280' does not interfere with the overall volume of fuel tank 260,' thereby allowing fuel tank 260' to be as large as possible on vehicle 2. Additionally, the casting process allows frame member 280' to be formed into a shape compatible with fuel tank 260', thereby also preventing frame member 280' from interfering with the desired shape and size of fuel tank 260'.

The configuration of frame member 280' also allows for frame member 280' to support other components of vehicle 2, such as seat 28', passenger handles, passenger foot support, and/or a taillight, thereby reducing the number of components required to support these various components and/or accessories on vehicle 2. For example, as shown in FIG. 46, tabs 502 on frame member 280' may be configured to support at least a portion of seat 28'. Additionally, a rearward portion 504 of frame member 280' may be configured to support a taillight of vehicle 2. Additionally, a mounting member 506 may be configured to support at least a portion of fuel tank 260' on frame member 280'. Also, frame member 280' includes mounting bores 508 for supporting a passenger handle and mounting bores 510 for supporting a passenger foot peg or foot support. Additional mounting members or bores may be included on any portion of frame member 280' for receiving other components and/or accessories of vehicle 2.

Frame member 280' includes a first portion 280a' and a second portion 280b' which, illustratively, are removably coupled together with convention fasteners. However, in one embodiment, first and second portions 280a', 280b' may be integrally formed together. As shown in FIG. 46, a support member 426 may be configured to couple together first and second portions 280a', 280b' with convention fasteners.

Forward end 262' of fuel tank 260' is configured to extend forwardly from frame member 280', however, rearward end 264' of fuel tank 260 is configured to be supported by frame member 280'. First and second portions 280a', 280b' are configured to flank rearward end 264' of fuel tank 260' and are coupled thereto through at least one bracket. For example, as shown in FIGS. 45 and 46, frame member 280' is coupled to fuel tank 260' through a first bracket 282' and a second bracket 284' using convention fasteners. Brackets 282', 284' may configured to extend over a portion of upper surface 266' of fuel tank 260 and couple with frame member 280' to secure fuel tank 260 to frame assembly 40, 40'.

Figure 51:
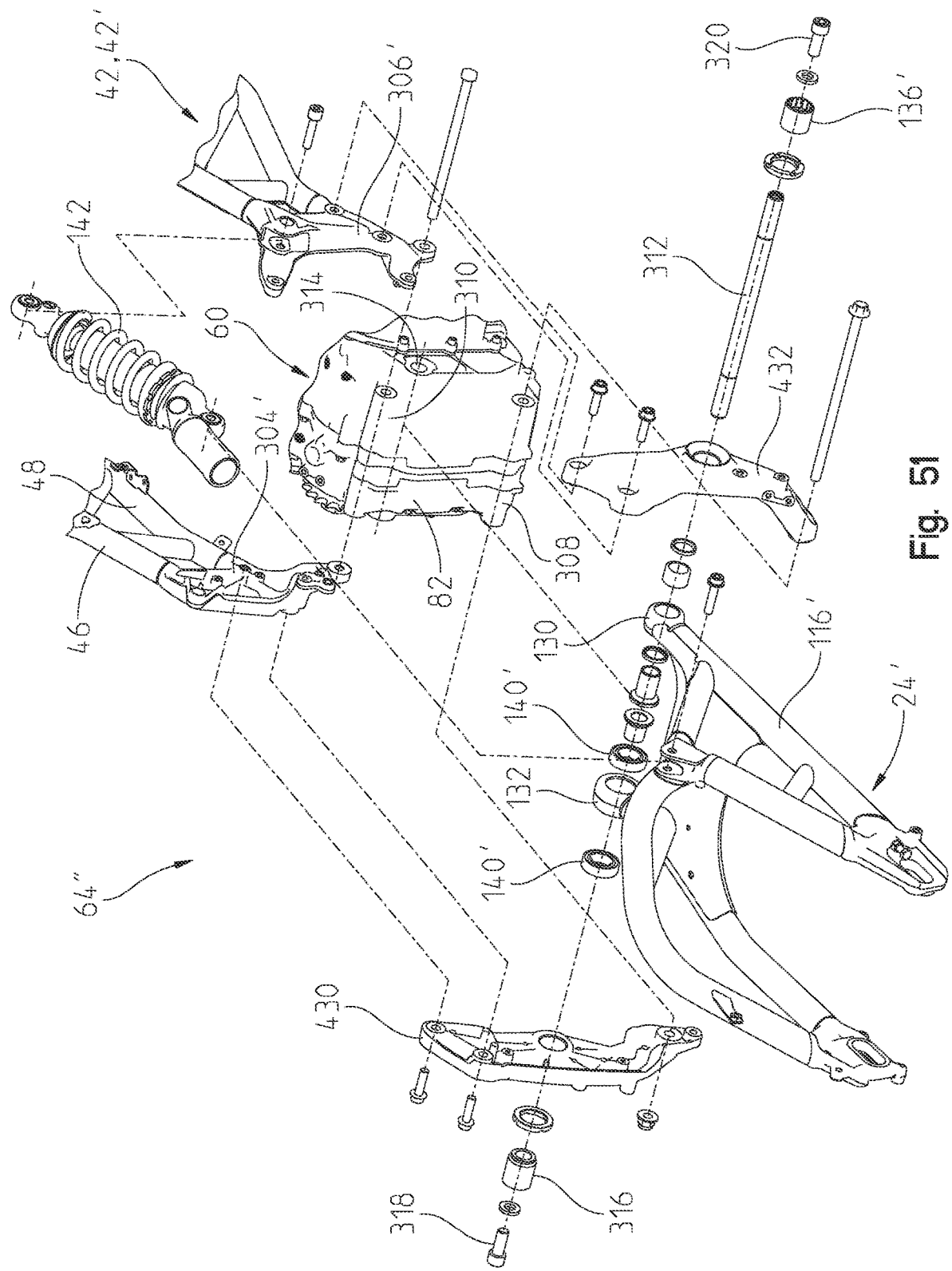
FIG. 51 is an exploded view of the rear suspension assembly and the frame assembly of FIG. 49.

Referring still to FIGS. 37, 39, 45, and 46, frame assembly 40, 40' includes intermediate frame portion 64" which is removably coupled to main frame 42, 42' and frame member 280'. Intermediate frame portion 64" includes first and second members 304', 306' coupled to the rear ends of upper and lower longitudinally-extending members 46, 48. First and second members 304', 306' are configured to couple with rear end 82 of crankcase 60 at position 310 (FIG. 51). First and second members 304', 306' also may be configured with mounting bores or mounting members 512 (FIG. 49) which are configured to support other components of vehicle 2, such as a yaw sensor, a bracket for a portion of the brake system (e.g., an ABS bracket), and/or brake lines. Additionally, because shock absorber 142 of rear suspension assembly 24' is offset from longitudinal centerline L, shock absorber 142 may be coupled to a portion of second frame member 306'. In this way, first and second frame members 303', 306' are configured to couple with main frame 42, 42', frame member 280', engine 12, a portion of rear suspension assembly 24', and various other components of vehicle 2.

Additionally, main frame 42, 42' is configured to couple with at least first cylinder 30 of engine 12 with conventional fasteners, such as bolts 428. Illustratively, main frame 42, 42' includes head mounting brackets 520 coupled to upper longitudinally-extending members 46 and/or lower longitudinally-extending members 48 and configured to couple with cylinder 30 at a position below valve cover 39. In particular, head mounting brackets 520 may be coupled to a portion of cylinder head 39 at a position vertically intermediate valve cover 39 and cylinder 37. Head mounting brackets 520 are configured to transfer loads from frame assembly 40, 40' to engine 12. In one embodiment, head mounting brackets 520 are comprised of forged aluminum.

As shown in FIGS. 47-51, body panels 400 may include side panels 430, 432 configured to couple with first and second members 304', 306', respectively. Side panels 430, 432 are positioned laterally outward of respective first and second members 304', 306' and are positioned generally rearward of upper and lower longitudinally-extending members 46, 48. Side panels 430, 432 may be comprised of a polymeric and/or metallic material.

Figure 49:
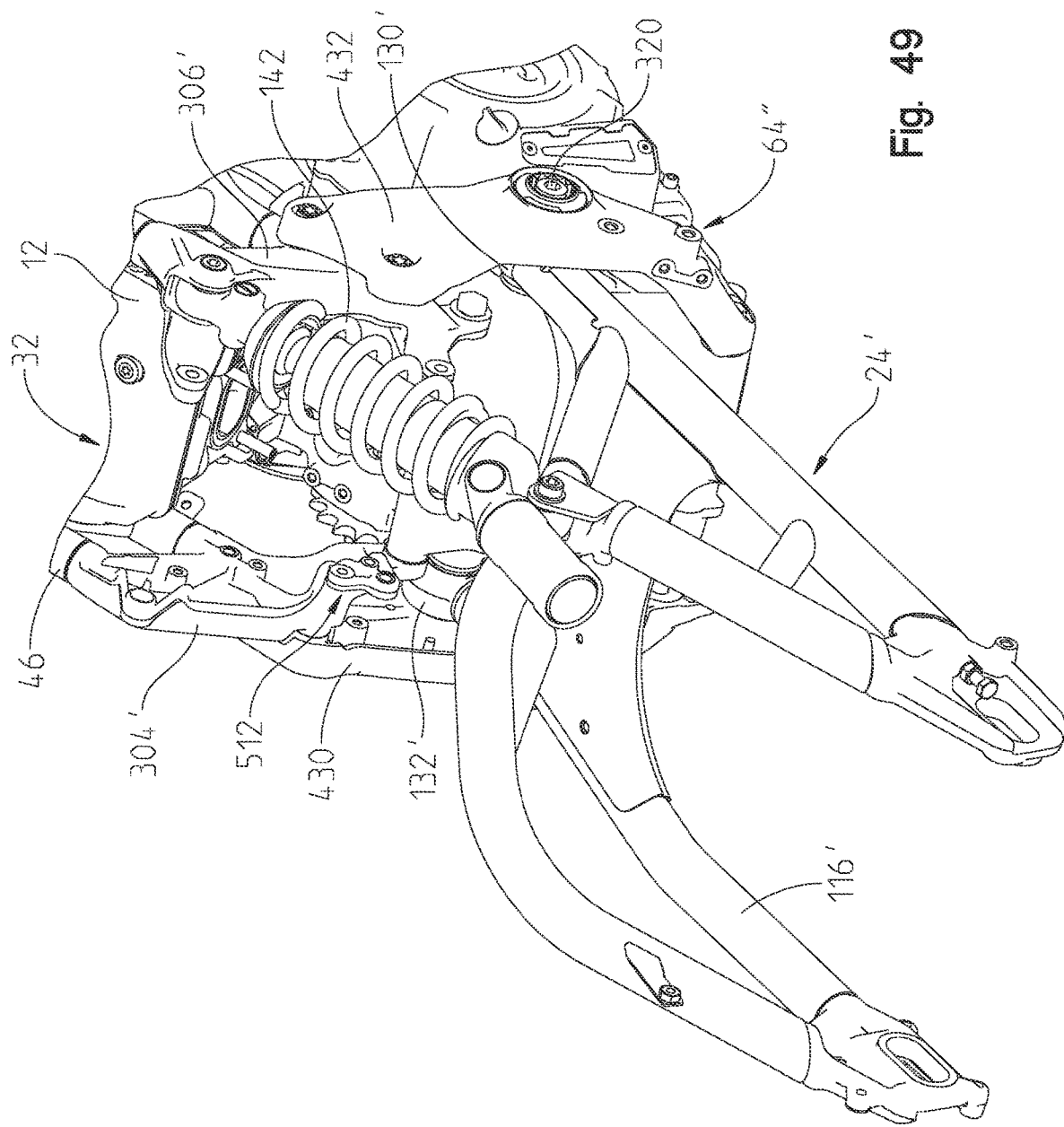
FIG. 49 is a rear right perspective view of a rear suspension assembly operably coupled to the frame assembly of FIG. 37.
Figure 50:
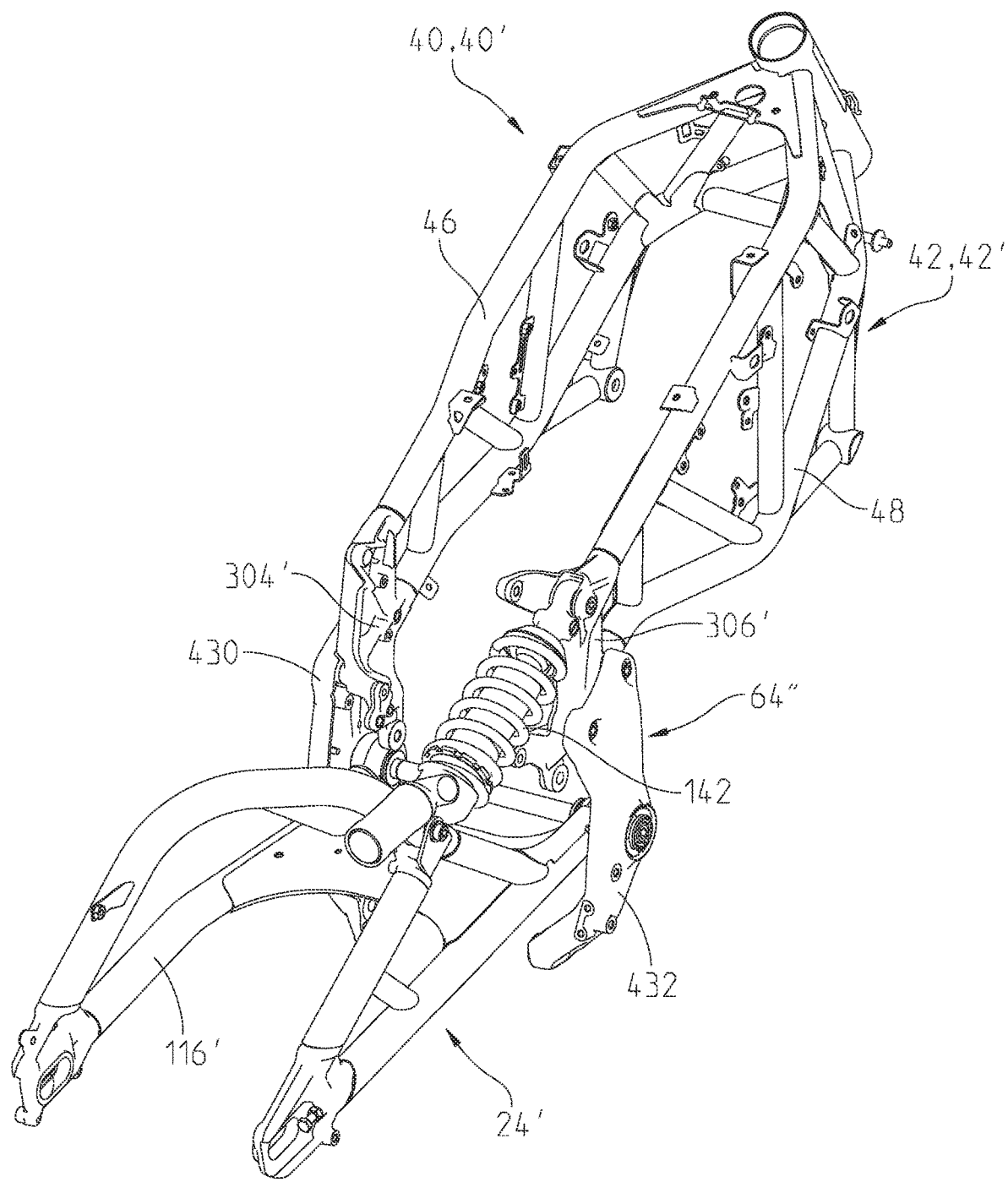
FIG. 50 is another rear right perspective view of the rear suspension assembly operably coupled to the frame assembly of FIG. 37.

Additionally, rear suspension assembly 24' also is configured to couple with side panels 430, 432 and crankcase 60 at portion 310. In one embodiment, rear suspension assembly 24' also may be configured to couple with first and second members 304', 306'. More particularly, and as shown in FIGS. 49-51, swing arm 116' of rear suspension assembly 24' includes pivot axle 312 configured to continuously extend through rear end 82 of crankcase 60 such that the left side of pivot axle 312 is positioned within a mounting member 132' of swing arm 116' and the right side of pivot axle 312 is positioned within a mounting member 130' of swing arm 116', as also disclosed herein with respect to FIGS. 18-20. In this way, pivot axle 312 extends continuously through crankcase 60 rather than being positioned rearward of crankcase 60 or laterally outward of crankcase 60. Rear end 82 of crankcase 60 includes channel 314 configured to receive pivot axle 312, as shown in FIG. 51.

Figure 52A:
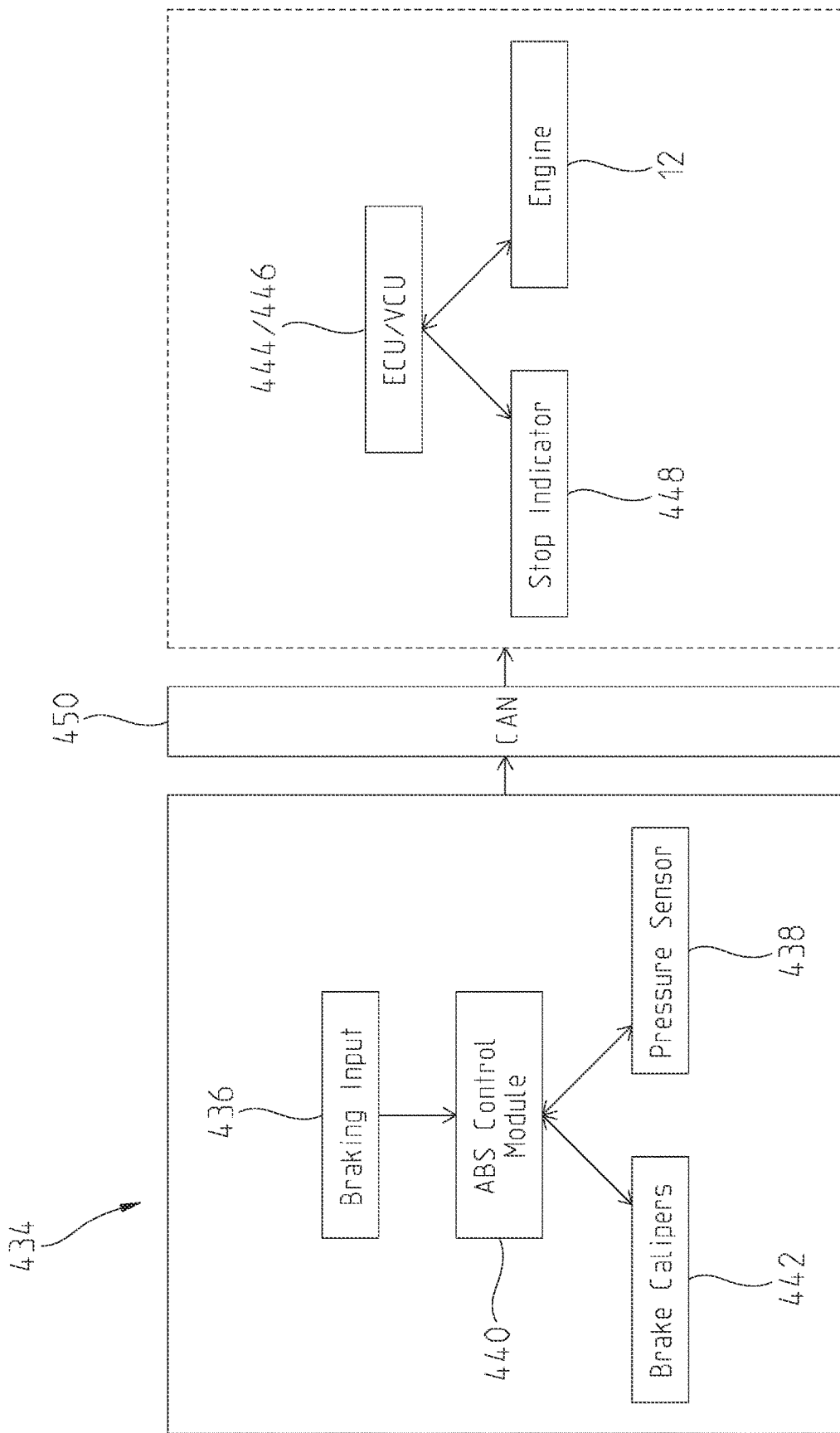
FIG. 52A is a schematic view of a braking system of the vehicle of FIG. 1.
Figure 52B:
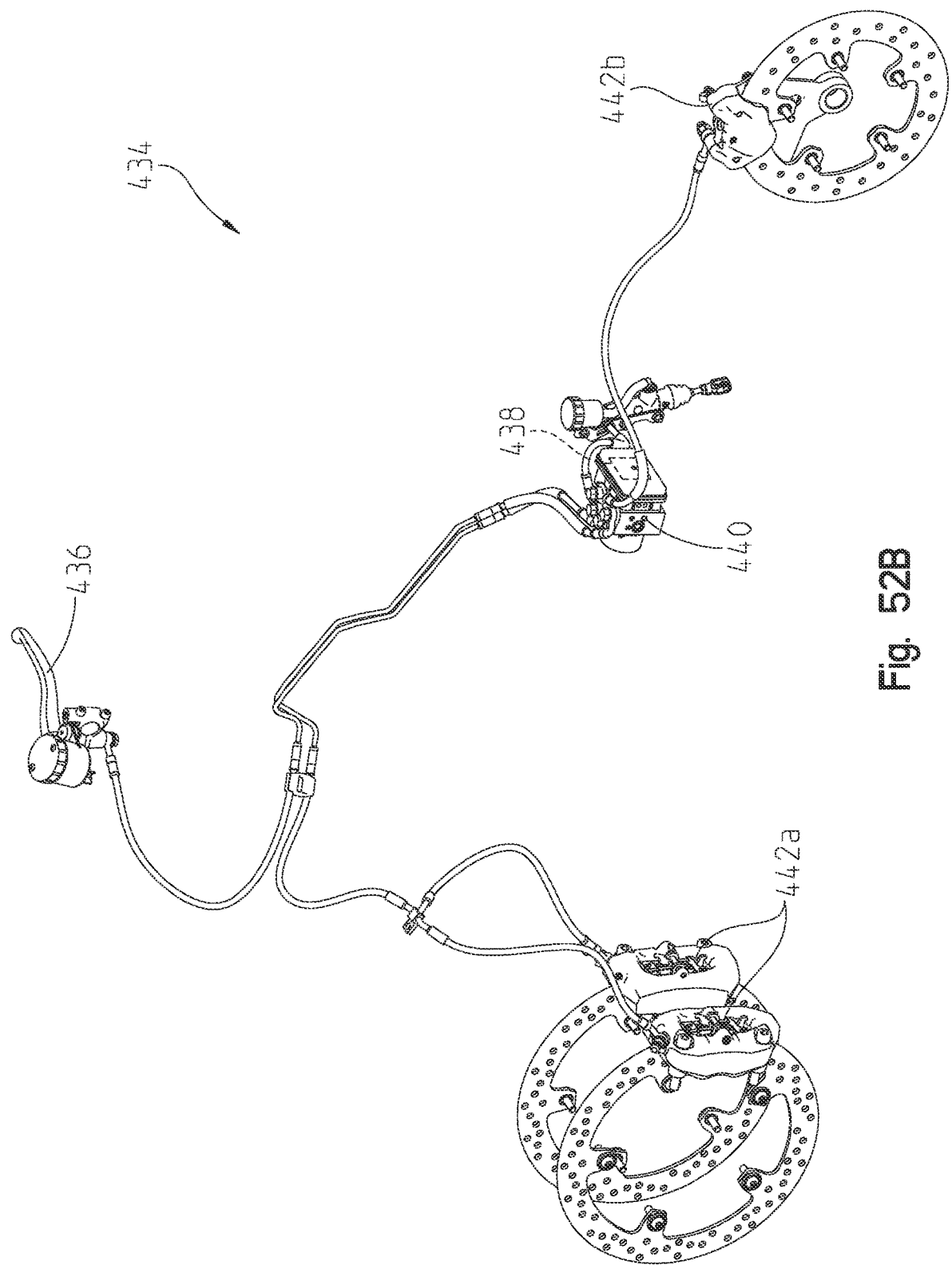
FIG. 52B is a left perspective view of the braking assembly of FIG. 52A.

Referring to FIGS. 52A and 52B, a braking control system 434 of vehicle 2 is disclosed. As shown in FIG. 52A, braking control system 434 includes a braking input 436 which may be actuated by the user of vehicle 2, an anti-lock system ("ABS") control module 440 electrically coupled to braking input 436, a pressure sensor 438 electrically coupled to ABS control module 440, and brake calipers 442 for front and/or rear wheels 8, 9 which also is electrically and/or fluidly coupled to ABS control module 440. Braking control system 434 may be configured as a portion of the overall electrical system for vehicle 2 or may be a separate control system therefrom. In one embodiment, braking control system 434 is electrically coupled to an engine control unit ("ECU") 444 and/or a vehicle control unit ("VCU") 446 through a CAN network 450 or other vehicle communications network. ECU 444 and/or VCU 446 may be electrically coupled to a stop indicator 448 and engine 12, as disclosed further herein.

Referring to FIG. 52B, braking control system 434 of vehicle 2 includes braking input 436 as a brake lever or other actuator which may be operated by the user's hand or foot. Illustratively, braking input 436 is defined as a hand-operated lever positioned adjacent to and/or coupled with a portion of steering assembly 16 (FIG. 1). Braking input 436 is electrically and/or fluidly coupled to ABS control module 440 to provide a braking input signal or other indicator thereto for activation of brake calipers 442. More particularly, ABS control module 440 receives an input from braking input 436 that a braking force or pressure is needed. Pressure sensor 438 may be positioned within or operably coupled to a portion of ABS control module 440 and is configured to receive the braking input signal or other indicator transmitted through braking input 436. With the braking information applied by the user, including an indication of the desired braking pressure to be applied, as transmitted from braking input 436, ABS control module 440 transmits signals, hydraulic fluid, and/or any other mechanism for providing an input to brake calipers 442, specifically brake calipers 442a of front wheel 8 and/or brake caliper 442b of rear wheel 9 (FIG. 1). Illustratively, pressure sensor 438 is operably coupled to only front wheel 8 and rear wheel 9 utilizes a separate pressure sensor which need not be part of ABS control module 440; however, in alternative embodiments pressure sensor 438 may be operably coupled to front and/or rear wheels 8, 9.

In the embodiment of pressure sensor 438 positioned or contained within ABS control module 440, pressure sensor 438 is integrated into a large system or component, rather than as a stand-alone component. Such an embodiment may result in a lower likelihood of failure of pressure sensor 438 and/or the overall braking control system 434. Additionally, ABS control module 440 includes diagnostic and other sensing elements that are configured to determine if a malfunction in pressure sensor 438 has occurred and alert the user of such malfunction. Also, with pressure sensor 438 contained within ABS control module 440, no additional wires or connections are needed for operation of pressure sensor 438, thereby decreasing the likelihood of failure due to failed or damaged wires or connections.

Referring still to FIGS. 52A and 52B, the indication of the desired brake pressure transmitted from braking input 436 to pressure sensor 438 also may be transmitted to ECU 444 and/or VCU 446 through CAN network 450. With the brake pressure information, ECU 444 and/or VCU 446 may be configured to actuate an action within engine 12 and/or stop indicator 448. For example, if vehicle 2 is operating under a cruise control feature, ECU 444/VCU 446 may be configured to decrease the throttle input to engine 12 and disengage the cruise control feature to slow the speed of vehicle 2 in response to a braking pressure transmitted from pressure sensor 438. Additionally, ECU 444/VCU 446 also may be configured to actuate stop indicator 448, such as a brake light or any other stop indicator on vehicle 2, in response to a braking pressure transmitted from pressure sensor 438.

Figure 47:
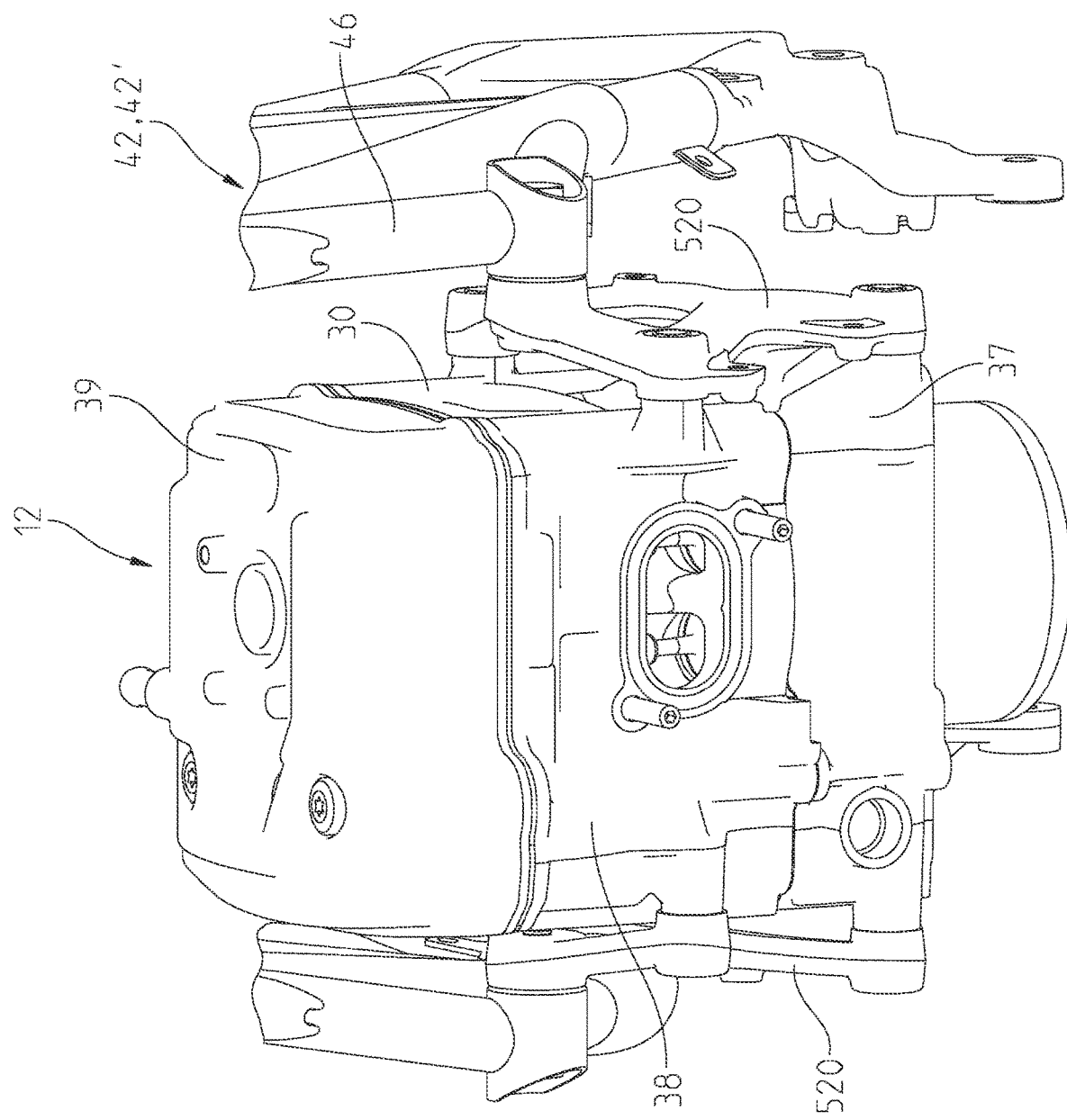
FIG. 47 is a front perspective view of a cylinder of the engine of the vehicle of FIG. 1 coupled to a portion of the frame assembly of FIG. 37.
Figure 48:
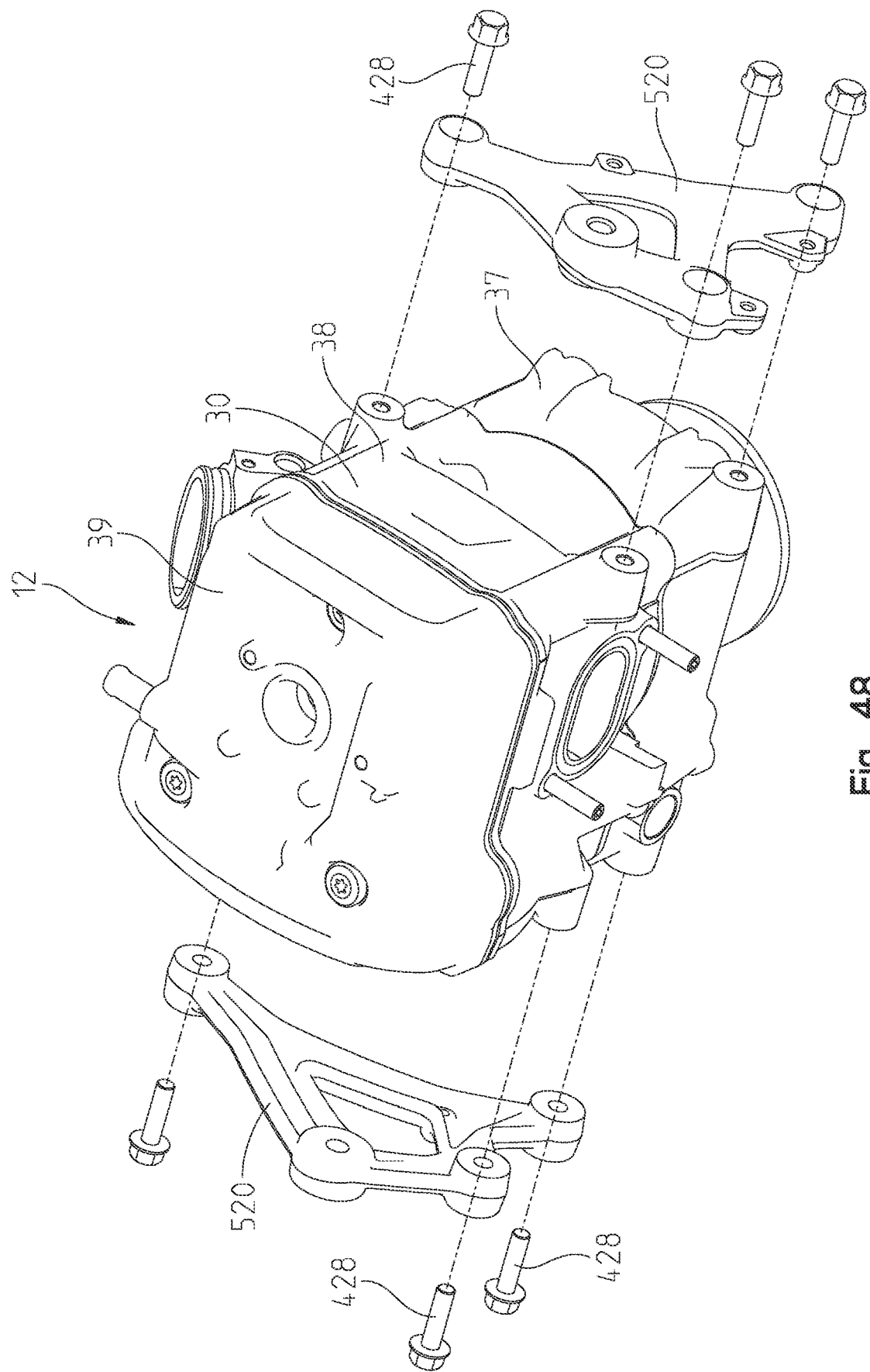
FIG. 48 is an exploded view of the portion of the engine and the portion of the frame assembly of FIG. 47.

Referring now to FIGS. 53-58, an electric box or housing 238' is disclosed and may be defined as a battery housing for supporting battery 236 therein. Illustrative battery 236 may be positioned at a lower portion of vehicle 2 and, more particularly, is positioned rearward of front wheel 8 and below radiator 202 and also is positioned generally forward of engine 12. Battery 236 also is positioned within the profile of upstanding members 54 of main frame 42 (FIG. 4). And, while battery 236 may be positioned within the profile of upstanding members 54, electric housing 238' and battery 236 may be coupled directly to engine 12 through head mounting brackets 520 (FIG. 47). By positioning battery 236 along a lower portion of vehicle 2, battery 236 contributes to lowering the center of gravity of vehicle 2.

As shown in FIGS. 53-58, electrical housing 238' includes a forward cover member 460 and a rearward compartment 462 removably coupled with forward cover member 460. Forward cover member 460 is configured as an aesthetic and protective shield for battery 236 such that forward cover member 460 may be impact resistant to debris propelled rearwardly by front wheel 8.

Figure 53:
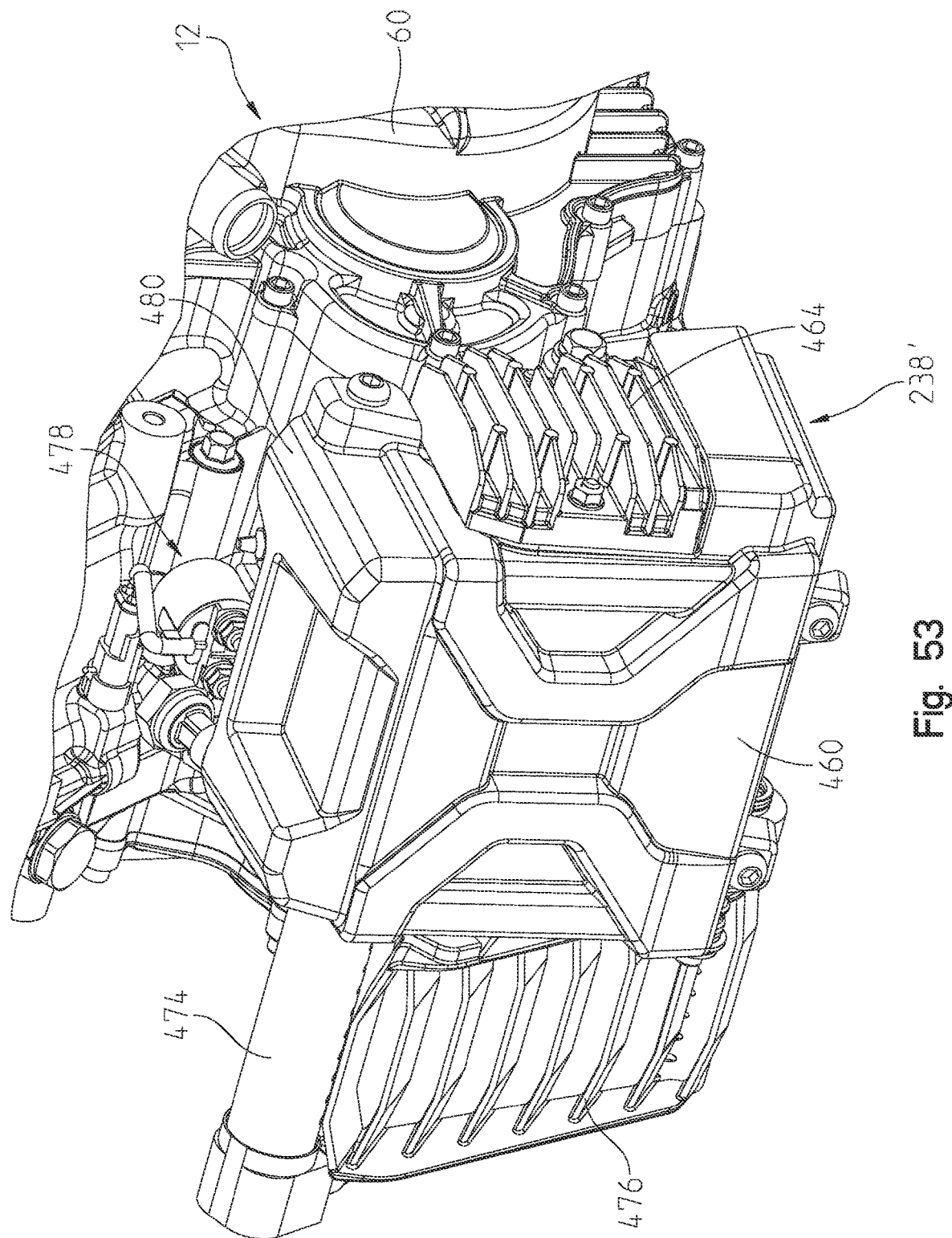
FIG. 53 is a front left perspective view of an alternative embodiment electrical box of the vehicle of FIG. 1 which is configured to support at least a battery therein.
Figure 54:
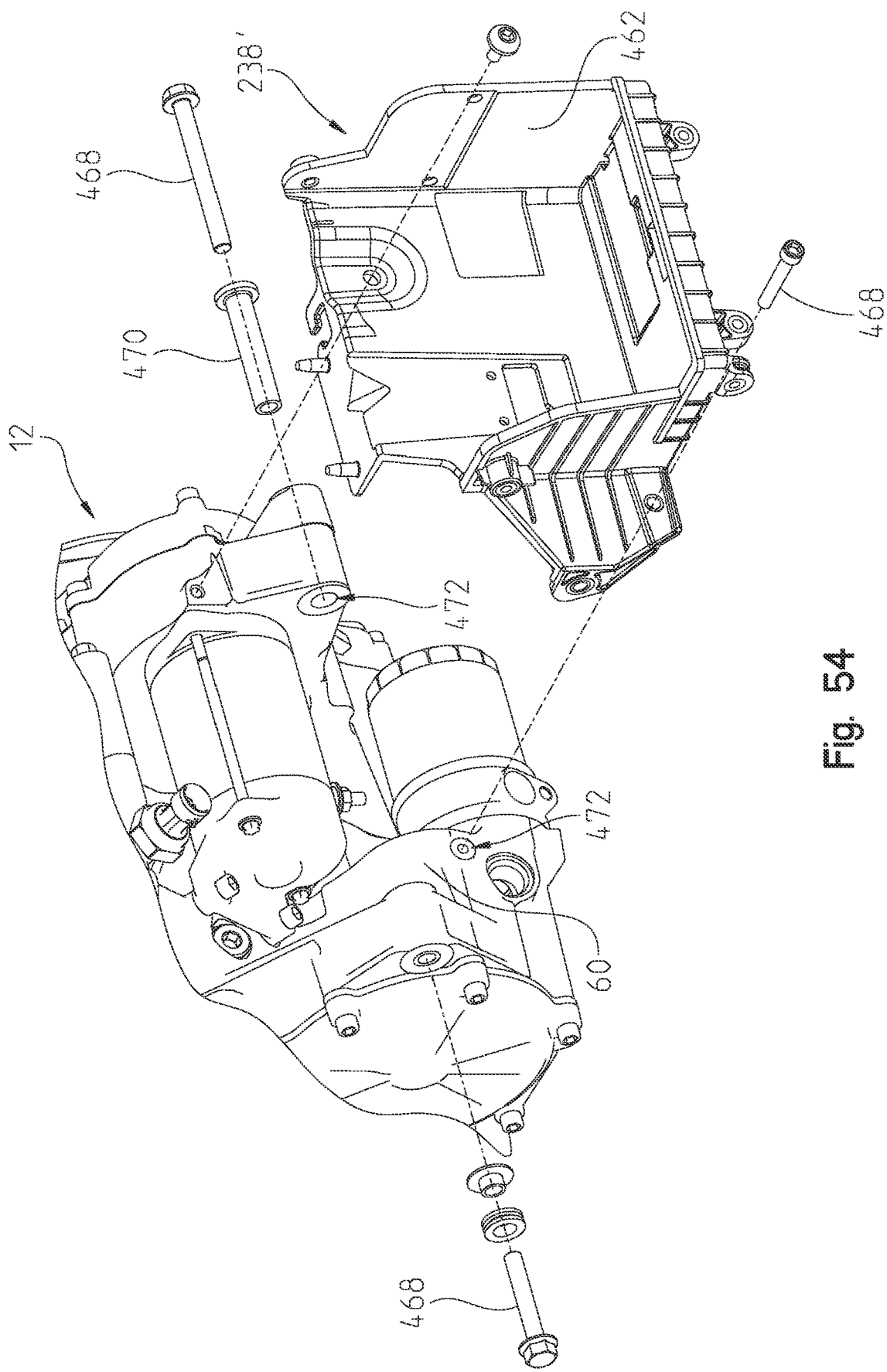
FIG. 54 is an exploded view of the electrical box of FIG. 53.
Figure 55:
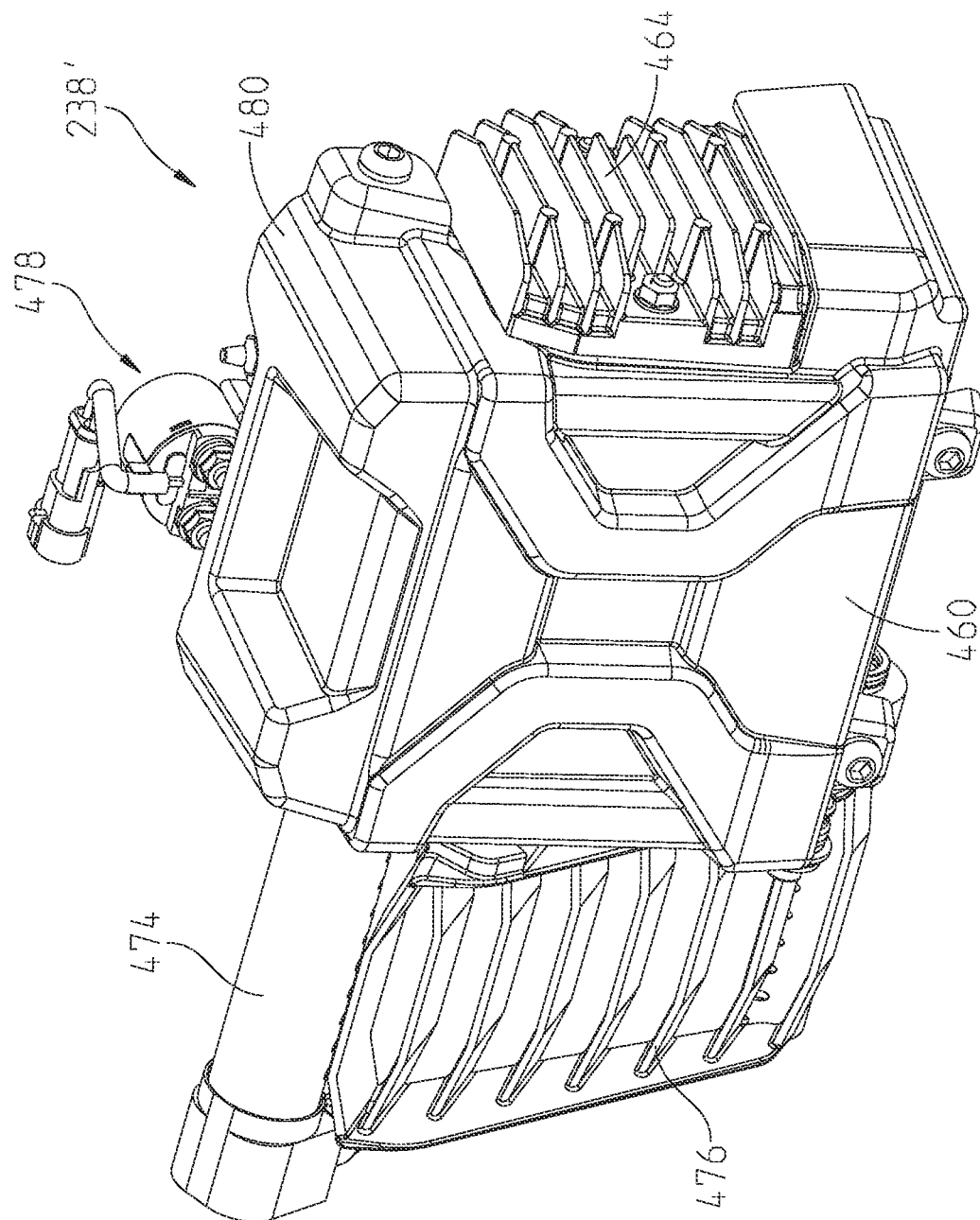
FIG. 55 is a front left perspective view of the electrical box of FIG. 53.
Figure 56:
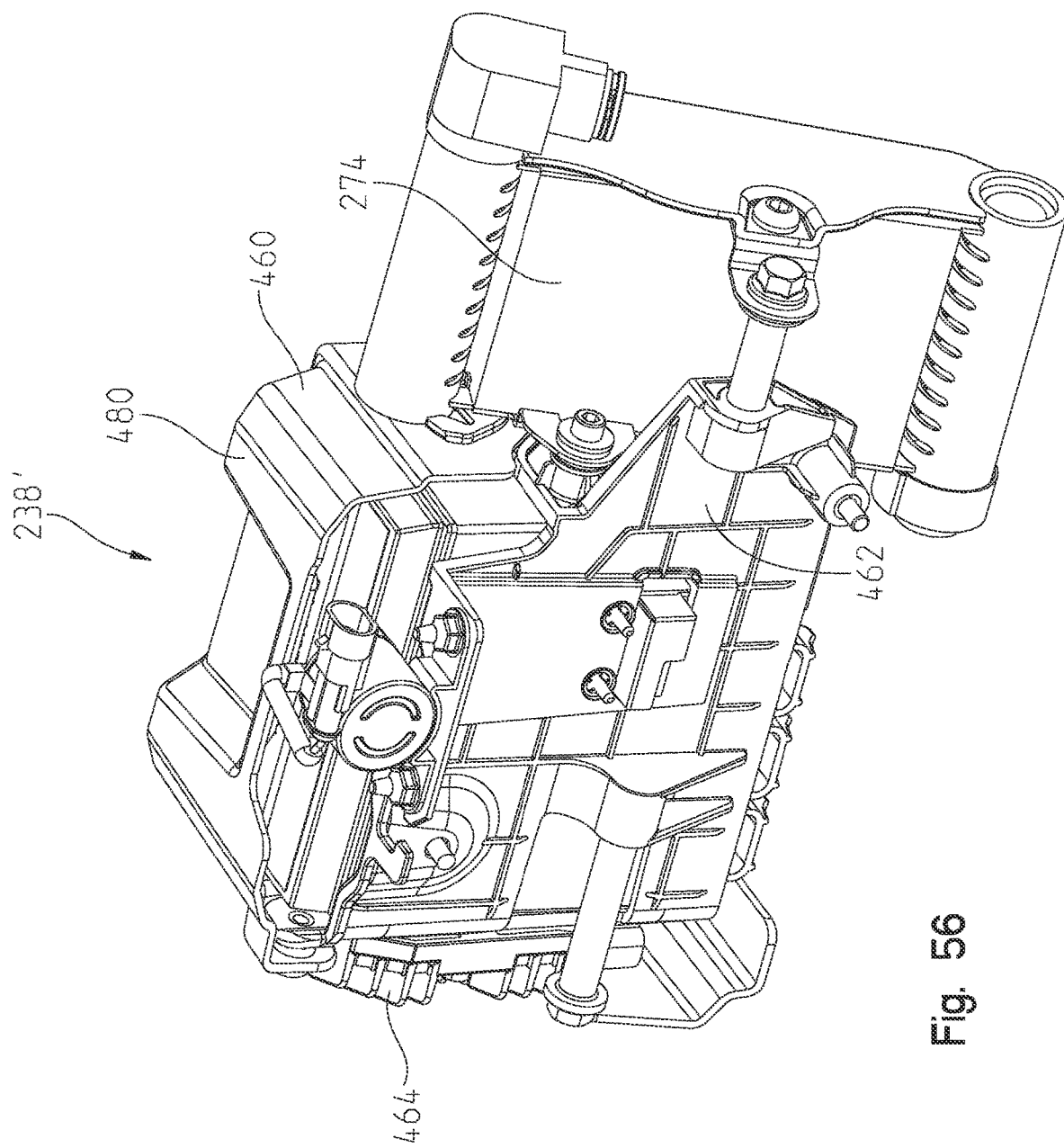
FIG. 56 is a rear right perspective view of the electrical box of FIG. 55.
Figure 57:
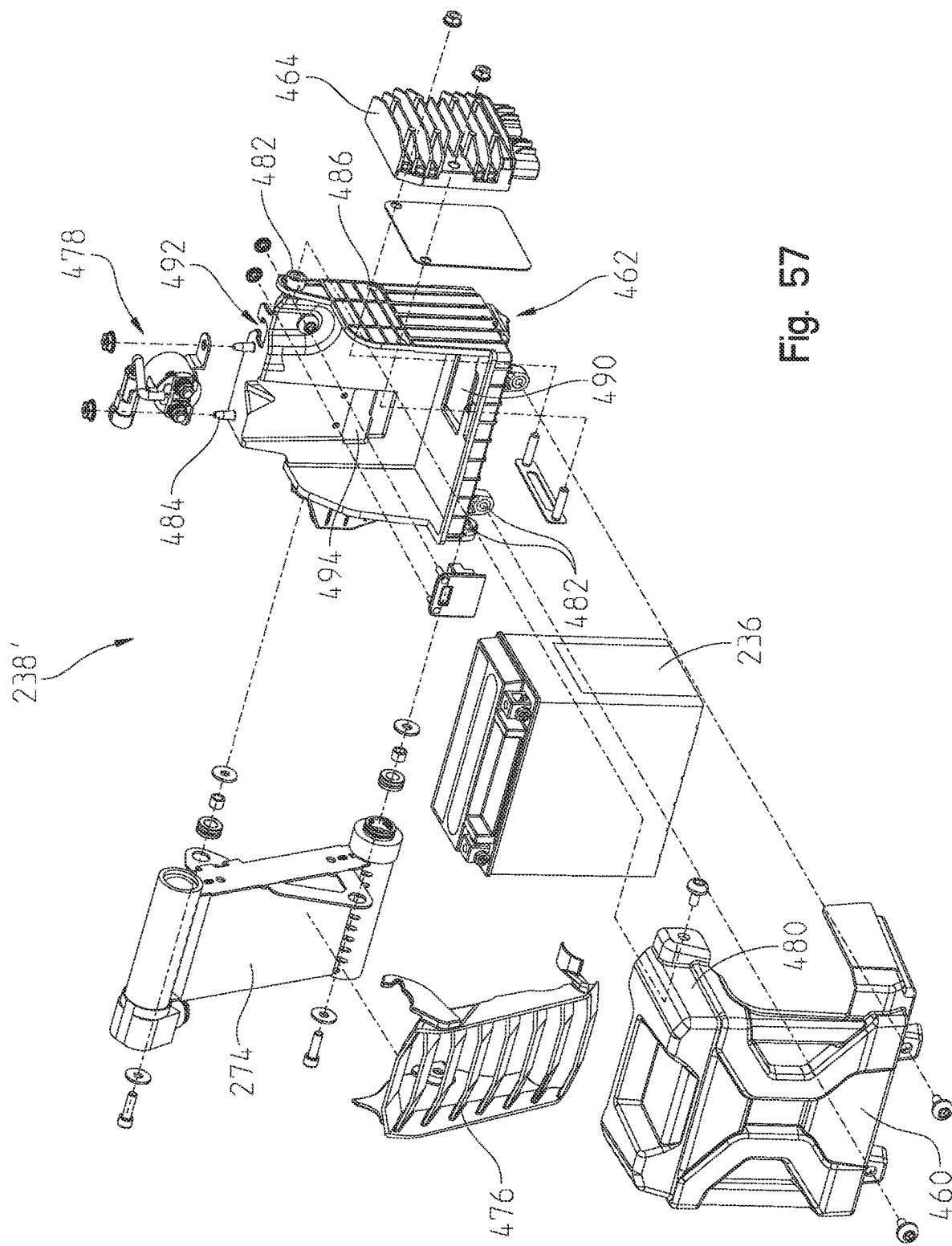
FIG. 57 is a front exploded view of the electrical box of FIG. 55 including a battery.
Figure 58:
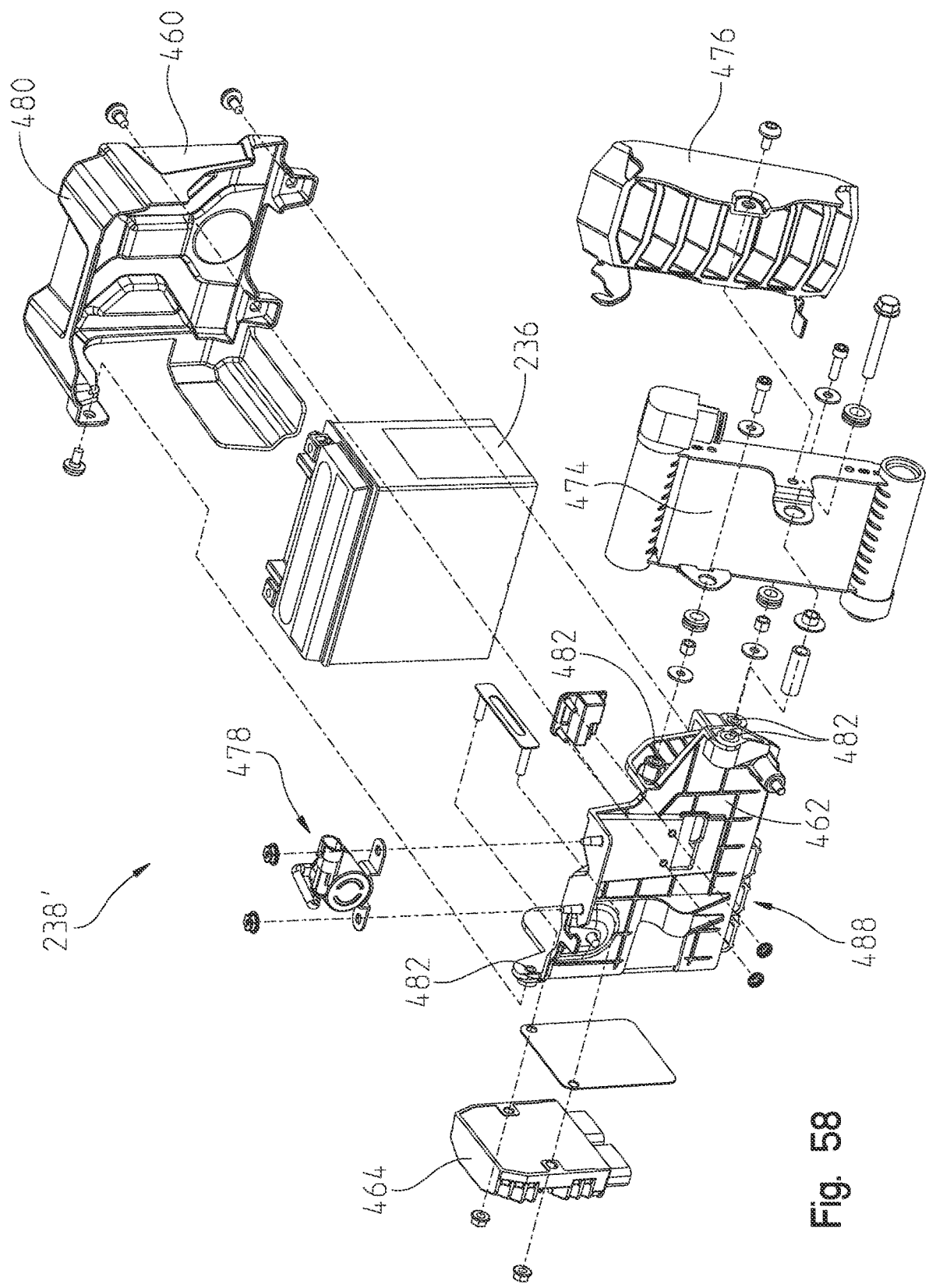
FIG. 58 is a rear exploded view of the electrical box and battery of FIG. 57.

As shown best in FIGS. 53 and 54, rearward compartment 462 is removably coupled to a portion of engine 12 with convention fasteners, such as bolts 468 and a busing 470. Bolts 468 and busing 470 are configured to be received within at least one channel 472 of crankcase 60 of engine 12. Channel 472 may be positioned adjacent a starter motor and/or an oil filter of engine 12. Additionally, at least rearward compartment 462 may include a plurality of mounting bores or members 482 configured as in-molded threaded inserts and/or compression limiters for coupling with forward cover member 460, crankcase 60, and/or other components of vehicle 2, as shown best in FIGS. 57 and 58.

In addition to supporting battery 236 on vehicle 2, electrical housing 238' is configured to support various other components of vehicle 2, thereby reducing the number of parts and components necessary for the operation of vehicle 2. For example, as shown in FIGS. 53-58, electrical housing 238' is configured to support an oil cooler 474 positioned laterally outward of rearward compartment 462. Oil cooler 474 may be supported on crankcase 60 of engine 12 and/or rearward compartment 462 with any type of conventional and removable fastener. A vent or louver cover 476 may be positioned forward of oil cooler 474 to direct ambient air into oil cooler 474 to reduce the temperature of the fluid flowing therein.

Additionally, electrical housing 238' is configured to support various other electrical components 478, which may include, but is not limited to, fuse mounts, voltage regulator mounts, various sensors (e.g., a tip-over sensor), and/or a starter solenoid. More particularly, at least one of mounting bores 482 is configured to couple oil cooler 474 to rearward compartment 462. Additionally, forward cover member 460 and/or rearward compartment 462 includes mounting members 484 for supporting a starter solenoid thereon, a mounting member 492 for supporting a wire harness thereon, mounting bores 486 for supporting a voltage regulator 464 thereon, a mounting bore or opening 494 for supporting a tip-over sensor thereon, a mounting member or bore 490 configured as a water drain, and support members 488 configured as fuse ports. Again, the ability to use electrical housing 238' as a mechanism for mounting various other components of vehicle 2 allows for efficient packaging of such components, shorter electrical connections to battery 236 and/or a wire harness electrically coupled to battery 236, and an overall reduction of components, such as mounting members and the like, to support such sensors, fuses, etc. on vehicle 2.

In one embodiment, at least a portion of electrical housing 238' is comprised of a polymeric material (e.g., glass filled polypropylene). Additionally, at least forward cover member 460 of electrical housing 238' may include a sheet molding compound ("SMC") configured to be any (or all) of a heat shield, a battery retention member, a cosmetic cover, and/or a battery strap. For example, an upper portion 480 of forward cover member 460 may be configured as a SMC component for battery retention, heat shielding, and a cosmetic cover to conceal battery 236.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A two-wheeled vehicle, comprising:
a frame assembly having a front end and a rear end extending along a longitudinally-extending centerline;
a plurality of body panels removably coupled to the frame assembly;
a front ground-engaging member operably coupled to the front end of the frame assembly at a front rotational axis;
a rear ground-engaging member operably coupled to the rear end of the frame assembly at a rear rotational axis;
an engine supported by the frame and operably coupled to at least one of the front ground-engaging member and the rear ground-engaging member;
a seat supported on the frame and configured to support at least an operator of the vehicle; and
a fuel tank having a fuel fill cap, and wherein at least one of the plurality of body panels is removably coupled to the frame assembly and the fuel tank at a position adjacent the fuel fill cap, wherein at least one of the plurality of body panels comprises a tank-alignment brace.

2. The two-wheeled vehicle of claim 1, wherein the at least one of the plurality of body panels includes a first body panel positioned to a first lateral side of the fuel tank and a second body panel positioned to a second lateral side of the fuel tank.

3. The two-wheeled vehicle of claim 2, wherein the plurality of body panels includes a support member configured to receive the fuel fill cap, and the support member is positioned to contact a portion of the frame assembly and receive the first and second body panels.

4. The two-wheeled vehicle of claim 1, wherein the tank-alignment brace is removably coupled to the frame assembly.

5. The two-wheeled vehicle of claim 4, wherein the tank-alignment brace is positioned centered along the longitudinally-extending centerline.

6. The two-wheeled vehicle of claim 5, wherein one panel of the plurality of body panels has an opening for the fuel fill cap to extend therethrough.

7. The two-wheeled vehicle of claim 6, wherein the tank-alignment brace is coupled to the fuel tank at a position adjacent the fuel fill cap.

8. The two-wheeled vehicle of claim 7, wherein the tank-alignment brace is configured to minimize a gap between the fuel fill cap and the opening of the one panel to maintain the alignment of the fuel tank having a position centered about the longitudinally-extending centerline.

9. The two-wheeled vehicle of claim 8, wherein a catch member for spilled fuel positioned below the one panel.

10. The two-wheeled vehicle of claim 9, wherein the catch member is positioned vertically intermediate the tank-alignment brace and the one body panel.

11. The two-wheeled vehicle of claim 10, wherein the catch member is aligned with the opening and an opening of the tank alignment brace.

12. The two-wheeled vehicle of claim 11, wherein the tank-alignment brace is configured to minimizes gaps between the opening and the fuel fill cap to maintain alignment of the fuel fill cap along a longitudinal centerline.

13. The two-wheeled vehicle of claim 12, wherein the tank-alignment brace includes an opening configured to accommodate an ignition.

14. The two-wheeled vehicle of claim 13, wherein the tank-alignment brace is operable to pivot about a position of the ignition.

15. A two-wheeled vehicle, comprising:
a frame assembly having a front end and a rear end extending along a longitudinally-extending centerline;
a plurality of body panels removably coupled to the frame assembly, at least one of the plurality of body panels including a tank-alignment brace;
a front ground-engaging member operably coupled to the front end of the frame assembly at a front rotational axis;

a rear ground-engaging member operably coupled to the rear end of the frame assembly at a rear rotational axis;

an engine supported by the frame and operably coupled to at least one of the front ground-engaging member and the rear ground-engaging member; and a fuel tank, wherein at least one of the plurality of body panels is removably coupled to the frame assembly and the fuel tank via the tank-alignment brace.

16. The two-wheeled vehicle of claim 15, wherein the tank-alignment brace is removably coupled to the frame assembly.

17. The two-wheeled vehicle of claim 16, wherein the tank-alignment brace is positioned centered along the longitudinally-extending centerline.

18. The two-wheeled vehicle of claim 17, wherein the fuel tank includes a fuel fill cap and wherein one panel of the plurality of body panels has an opening for the fuel fill cap to extend therethrough.

19. The two-wheeled vehicle of claim 18, wherein the tank-alignment brace is coupled to the fuel tank at a position adjacent the fuel fill cap.

\* \* \* \* \*